(12) United States Patent
Yoshida et al.

(10) Patent No.: US 10,338,277 B2
(45) Date of Patent: Jul. 2, 2019

(54) POLARIZING PLATE PROTECTIVE FILM, POLARIZING PLATE, AND DISPLAY

(71) Applicant: FUJIFILM Corporation, Tokyo (JP)

(72) Inventors: Aiko Yoshida, Kanagawa (JP); Naoya Shimoju, Kanagawa (JP); Naoki Sano, Kanagawa (JP); Nobutaka Fukagawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 519 days.

(21) Appl. No.: 14/969,443

(22) Filed: Dec. 15, 2015

(65) Prior Publication Data

US 2016/0178809 A1    Jun. 23, 2016

(30) Foreign Application Priority Data

Dec. 17, 2014    (JP) .................................. 2014-254996

(51) Int. Cl.
| | |
|---|---|
| *G02B 1/14* | (2015.01) |
| *G02B 5/30* | (2006.01) |
| *G02F 1/1335* | (2006.01) |

(52) U.S. Cl.
CPC ............... *G02B 1/14* (2015.01); *G02B 5/305* (2013.01); *G02F 1/133528* (2013.01); *G02F 2201/50* (2013.01)

(58) Field of Classification Search
None
See application file for complete search history.

(56) References Cited

U.S. PATENT DOCUMENTS

| | | | | | |
|---|---|---|---|---|---|
| 2,695,318 | A | * | 11/1954 | Thiele | .................. C07C 205/34 |
| | | | | | 556/482 |
| 2,739,972 | A | * | 3/1956 | Abbott | ..................... C08K 5/06 |
| | | | | | 106/169.13 |

(Continued)

FOREIGN PATENT DOCUMENTS

| | | |
|---|---|---|
| JP | 2008-007780 A | 1/2008 |
| JP | 2011-022567 A | 2/2011 |

*Primary Examiner* — Rachel Kahn
(74) *Attorney, Agent, or Firm* — Edwards Neils, LLC; Jean C. Edwards, Esq.

(57) ABSTRACT

A polarizing plate protective film containing a compound represented by formula (I); a polarizing plate; and a display:

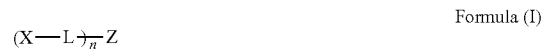

Formula (I)

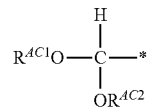

Formula (I-A-1)

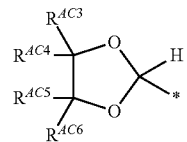

Formula (I-A-2)

in formula (I), X represents a group of formula (I-A-1) or (I-A-2), L represents a single bond or a divalent linking group, Z represents an n-valent linking group, and n repre- (Continued)

sents an integer of 2 or more; however, when n is 2, the case where L and Z each are simultaneously a single bond is excluded:
in formulae (I-A-1) and (I-A-2), $R^{AC1}$ and $R^{AC2}$ each independently represent an alkyl, cycloalkyl, aryl, or acyl group; however, the case where $R^{AC1}$ and $R^{AC2}$ bond to each other to form a ring is excluded; $R^{AC3}$ to $R^{AC6}$ each independently represent a hydrogen atom, or an alkyl, cycloalkyl, aryl, acyl, alkoxy, or alkoxycarbonyl group; and an asterisk (*) represents a bonding hand to form a bonding with L.

9 Claims, 1 Drawing Sheet

(56) References Cited

U.S. PATENT DOCUMENTS

| | | | | |
|---|---|---|---|---|
| 4,405,816 | A * | 9/1983 | Skaletz | C25B 3/02 |
| | | | | 205/456 |
| 5,238,781 | A * | 8/1993 | Schadeli | G03F 7/0045 |
| | | | | 430/270.1 |
| 2001/0034419 | A1 * | 10/2001 | Kanayama | C08L 69/00 |
| | | | | 525/439 |
| 2013/0189449 | A1 * | 7/2013 | Fukagawa | C09K 19/52 |
| | | | | 428/1.33 |

* cited by examiner

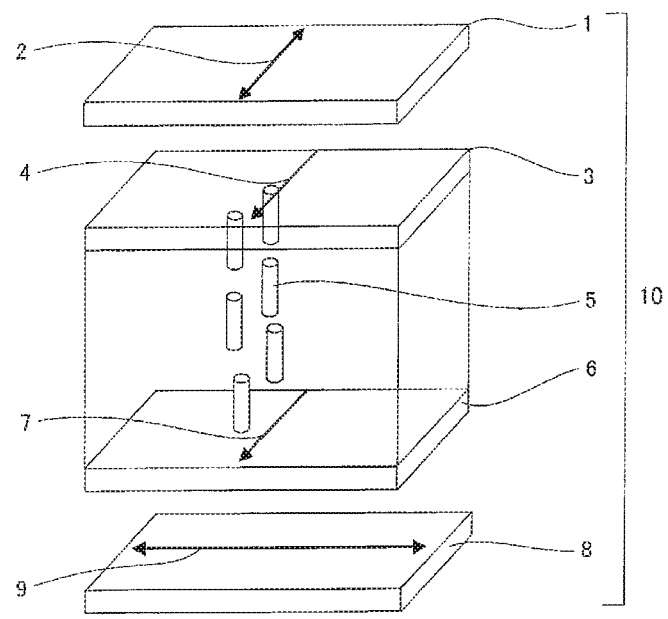

POLARIZING PLATE PROTECTIVE FILM, POLARIZING PLATE, AND DISPLAY

CROSS-REFERENCE TO RELATED APPLICATION

The present application claims priority under 35 U.S.C. § 119 (a) to Japanese Patent Application No. 2014-254996 filed in Japan on Dec. 17, 2014. The above application is hereby expressly incorporated by reference, in its entirety, into the present application.

TECHNICAL FIELD

The present invention relates to a polarizing plate protective film, a polarizing plate, and a display.

BACKGROUND ART

A liquid crystal display is regarded as a space-saving image display having only limited power consumption, and applications thereof are extending year after year. In addition to markets in which high-definition images are required, such as televisions, accordingly as markets are expanding in applications of so-called mobile devices, such as mobile phones and tablet-type personal computers, needs for achieving thickness reduction are much further growing.

A basic configuration of the liquid crystal display is formed of, in which polarizing plates are provided on each side of a liquid crystal cell. The polarizing plate plays a role of transmitting only light on a plane of polarization in a fixed direction, and performance of the liquid crystal display is significantly influenced depending on the performance of the polarizing plate. The polarizing plate generally has a configuration of laminating: a polarizer formed, for example, of a polyvinyl alcohol film on which iodine or/and a dye is/are adsorbed and oriented; and transparent protective films (polarizing plate protective film) laminated on each side of front and back faces of the polarizer.

In the polarizing plate, display performance is deteriorated as caused by heat, hygrothermal condition or ultraviolet ray, in use for a long period of time. Deterioration of the display performance is mainly caused by degradation of the polarizer constituting the polarizing plate, and in association with achievement of thickness reduction, the polarizing plate is further apt to degrade.

On the other hand, the polarizing plate protective film has a means of: adding an ultraviolet absorber to the polarizing plate protective film, against display performance deterioration due to ultraviolet ray. However, although further improvement is required, against degradation of the polarizer as caused by heat or hygrothermal condition, in association with achievement of thickness reduction, no effective means that can meet such a need is provided in the current situation.

In Patent Literature 1, a proposal is made on a crosslinking agent as an additive to be added to a polarizing plate protective film. This is for crosslinking a cellulose ester film to improve adhesion with the polarizer, and not for improving durability of the polarizing plate. Moreover, in a phase difference film, a proposal is made (see Patent Literature 2) on incorporating a gelling agent, such as a condensate between sorbitol and propionaldehyde or benzaldehyde, into a cellulose ester film.

CITATION LIST

Patent Literature

Patent Literature 1: JP-A-2008-7780 ("JP-A" means unexamined published Japanese patent application)
Patent Literature 2: JP-A-2011-22567

TECHNICAL PROBLEM

The present invention has been made in view of the situation as described above.

Therefore, the present invention is contemplated for improving durability of a polarizing plate under hygrothermal condition, to prevent polarization performance deterioration.

In particular, the present invention is contemplated for providing: a polarizing plate protective film that can inhibit polarization performance deterioration under hygrothermal condition; a polarizing plate and a display using such a polarizing plate protective film.

Solution to Problem

The inventors of the present invention analyzed causes by which a polarizer is degraded under hygrothermal condition, and found that physical properties of a resin constituting the polarizer change. In particular, it has been estimated that the change in the physical properties of the resin concerns lowering of a degree of crosslinking of the crosslinked resin, to cause progress in crystallization of the resin.

Therefore, from a viewpoint of inhibiting the change in the physical properties of the resin, particularly, the crystallization of the resin, the inventors of the present invention have studied various means and materials for allowing diffusion movement from the polarizing plate protective film to the polarizer, under hygrothermal condition.

As a result, the inventors of the present invention have found that a specific compound is effective, and thus have attained the present invention, based on this finding.

According to the present invention, there is provided the following means:

(1) A polarizing plate protective film containing a compound represented by formula (I):

Formula (I)

wherein, in formula (I), X represents a group represented by any of formulae (I-A-1) and (I-A-2); L represents a single bond or a divalent linking group; n represents an integer of 2 or more; when n is 2, Z represents a single bond or a divalent linking group; and when n is 3 or more, Z represents an n-valent linking group; however, when n is 2, the case where L and Z each are simultaneously a single bond is excluded:

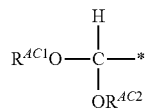

Formula (I-A-1)

-continued

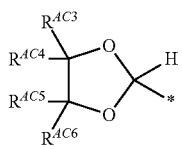

Formula (I-A-2)

wherein, in formulae (I-A-1) and (I-A-2), $R^{AC1}$ and $R^{AC2}$ each independently represent an alkyl group, a cycloalkyl group, an aryl group, or an acyl group; however, the case where $R^{AC1}$ and $R^{AC2}$ bond to each other to form a ring is excluded; $R^{AC3}$ to $R^{AC6}$ each independently represent a hydrogen atom, an alkyl group, a cycloalkyl group, an aryl group, an acyl group, an alkoxy group, or an alkoxycarbonyl group; at least two of $R^{AC3}$ to $R^{AC6}$ may bond to each other, to form a ring; and an asterisk (*) represents a bonding hand to bond with L.

(2) The polarizing plate protective film described in the item (1), wherein the compound represented by formula (I) has at least one benzene ring.

(3) The polarizing plate protective film described in the item (1) or (2), wherein the compound represented by formula (I) is represented by any one of formulae (II-1) to (II-5):

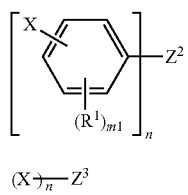

Formula (II-1)

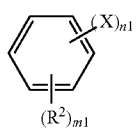

Formula (II-2)

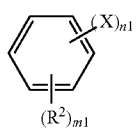

Formula (II-3)

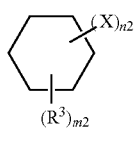

Formula (II-4)

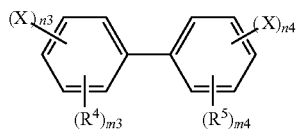

Formula (II-5)

wherein, in formulae (II-1) to (II-5), X and n have the same meaning as the X and n of formula (I); when n is 2, $Z^2$ represents a divalent linking group; when n is 3 or more, $Z^2$ represents an n-valent chain hydrocarbon group; when n is 2, $Z^3$ represents a divalent alkylene group; when n is 3 or more, $Z^3$ represents an n-valent chain hydrocarbon group; however, the case where $Z^3$ has a ring structure is excluded; $R^1$ to $R^5$ each independently represent a substituent; n1 and n2 each independently represent an integer of 2 to 6; n3 and n4 each independently represent an integer of 1 to 5; m1, m3, and m4 each independently represent an integer of 0 to 4; m2 represents an integer of 0 to 10.

(4) The polarizing plate protective film described in any one of the items (1) to (3), wherein the compound has 2 to 4 pieces of X, and wherein the total number of carbon atoms in component parts other than X in the compound is 40 or less.

(5) The polarizing plate protective film described in any one of the items (1) to (4), wherein the smallest number of atoms comprised in the linking group between any two of X's is 20 or less.

(6) The polarizing plate protective film described in the item (1) or (2), wherein Z is a single bond, or any one or combination of —O—, —S—, —SO—, —SO$_2$—, —C(=O)—, —OC(=O)—, —C(R$^{11}$)(R$^{12}$)—, >C<, (—OCH$_2$CH$_2$)$_2$C(CH$_2$CH$_2$O—)$_2$, >C(R$^3$)—, >N—, or —N(Ra)—, in which $R^{11}$ to $R^{13}$ each independently represent a hydrogen atom, an alkyl group, or an aryl group, and in which Ra represents a hydrogen atom, an alkyl group, an aryl group, or an acyl group.

(7) The polarizing plate protective film described in any one of the items (1) to (6), wherein the polarizing plate protective film contains a cellulose acylate.

(8) A polarizing plate, having the polarizing plate protective film described in any one of the items (1) to (7), on each side or one side of a polarizer.

(9) The polarizing plate described in the item (8), containing a compound represented by formula (A) in at least one polarizing plate protective film, with the polarizing plate protective films being provided on each side or one side of the polarizer:

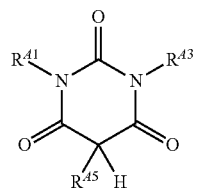

Formula (A)

wherein, in formula (A), $R^{41}$ and $R^{43}$ each independently represent a hydrogen atom, an alkyl group, a cycloalkyl group, an alkenyl group, or an aromatic group; the alkyl group, the cycloalkyl group, the alkenyl group, and the aromatic group may have a substituent; and $R^{45}$ represents a hydrogen atom or a substituent.

(10) A display containing at least one polarizing plate described in the item (8) or (9).

Herein, in this specification, a numerical range expressed by using "to" denotes a range including numerical values indicated before and after the "to" as the minimum value and the maximum value of the range.

Herein, in this specification, unless otherwise specified, a group, which is able to have a substituent (for example, a group having an alkyl moiety, an aryl moiety, or a heterocyclic moiety), may have a substituent. For example, the alkyl group is an alkyl group which may have a substituent, and the aryl group or the aromatic group is an aryl group or an aromatic group each of which may have a substituent.

In addition, in the case where any atom has at least two substituents and the case where the adjacent bonded atoms each have a substituent, these substituents may bond to each other, to form a ring.

Moreover, in the case where a plurality of groups represented by the same symbol are present and the case where a plurality of groups represented by the same symbol are present as a result of a plurality of repeating's, these may be the same as or different from each other.

In this specification, when a plurality of substituents or linking groups (hereinafter, referred to as "substituents or the like") are simultaneously or alternatively defined, respective substituents or the like, may be the same as or different from each other.

In addition, when a specific group is not identified by simply stating "a substituent," "may have a substituent," or the like, unless otherwise specified, a substituent S is referred to. In a similar manner, also in the case of the specific group, unless otherwise specified, a specific group corresponding to the substituent S is referred to.

Advantageous Effects of Invention

According to the present invention, durability of the polarizing plate under hygrothermal condition has been improved, for becoming possible to prevent polarization performance deterioration.

As a result, the polarizing plate protective film can be provided, in which the polarization performance deterioration under hygrothermal condition can be inhibited. Such a polarizing plate protective film has allowed improvement in the durability of the polarizing plate under hygrothermal condition, even with achievement of thickness reduction of the polarizer or the polarizing plate protective film, and allowed provision of the polarizing plate and the display excellent in durability under hygrothermal condition.

Furthermore, the compound to be used in the present invention has only limited adverse affection in performance that has been required so far, such as difficulty in causing bleeding-out or difficulty in occurring haze.

Other and further features and advantages of the invention will appear more fully from the following description, appropriately referring to the accompanying drawings.

BRIEF DESCRIPTION OF THE DRAWING

FIG. 1 is one example of a schematic cross-sectional view showing an example of an embodiment of a polarizing plate of the present invention.

DETAILED DESCRIPTION OF THE INVENTION

Hereinafter, the present invention is described in detail referring to the embodiments.

«Polarizing Plate Protective Film»

The polarizing plate protective film may be in any aspect, either an aspect of a monolayer or an aspect of a laminate of a plurality of layers.

In the case where the polarizing plate protective film is the laminate (layered product) having at least two layers, a double-layered structure or a triple-layered structure is preferable, and a triple-layered structure is more preferable. In the case of a triple-layered structure, it is preferable to have one layer of a core layer (that is, it is the-thickest layer, and it is also referred to as the base layer hereinafter), and a skin layer A and a skin layer B, which sandwich the core layer. Among these, in the present invention, the triple-layered structure formed of: skin layer B/core layer/skin layer A, is preferred. The skin layer B is a layer brought into contact with the metal support, and the skin layer A is a layer at the interface with the air on the side opposite to the metal support, when the polarizing plate protective film is produced by the solvent casting method. It is noted that, generally, both the skin layer A and the skin layer B are also referred to as a skin layer (or a surface layer).

The polarizing plate protective film of the present invention contains at least the compound represented by formula (I).

Hereinafter, first, the present invention is described from the compound represented by formula (I).

<Compound Represented by Formula (I)>

A polarizing plate protective film is formed by sticking and laminating on each side or one side of a polarizer, and the compound represented by formula (I) is contained in the polarizing plate protective film adjacent to the polarizer, and durability of the polarizer (also referred to as polarizing plate durability), particularly durability under hygrothermal condition, can be improved.

The inventors of the present invention have finally found that a resin constituting the polarizer swells under hygrothermal condition, and then physical properties of the resin change. As a cause of this change, it is estimated that a degree of crosslinking of the crosslinked resin is lowered, and the lowering of the degree of crosslinking is caused by reduction of a crosslinking agent.

In particular, when the resin constituting the polarizer is a polyvinyl alcohol, an effect of improving the durability of the polarizer due to the compound represented by formula (I) is excellent. Thus, the following mechanism is estimated.

That is to say, a polyvinyl alcohol is ordinarily crosslinked with boric acid. If the polyvinyl alcohol causes a change in the physical properties under hygrothermal condition, a polyvinyl alcohol/iodine complex is partially broken down, to cause degradation of the polarizer. On the other hand, if boric acid in the crosslinking agent is decreased, the polyvinyl alcohol is crystallized.

Herein, it is considered that the compound represented by formula (I) existing in the polarizing plate protective film is diffused from the polarizing plate protective film under hygrothermal condition, to move to the polarizer, thereby for inhibiting the change in the physical properties of the polyvinyl alcohol, for example, crystallization of the polyvinyl alcohol due to partial breakdown of boric acid crosslinking due to reduction of boric acid.

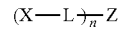

Formula (I)

In formula (I), X represents a group represented by any of formulae (I-A-1) and (I-A-2), L represents a single bond or a divalent linking group, and n represents an integer of 2 or more. When n is 2, Z represents a single bond or a divalent linking group, and when n is 3 or more, Z represents an n-valent linking group. However, when n is 2, the case where L and Z are simultaneously a single bond is excluded.

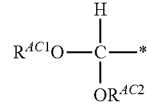

Formula (I-A-1)

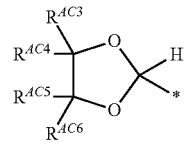

Formula (I-A-2)

In formulae (I-A-1) and (I-A-2), $R^{AC1}$ and $R^{AC2}$ each independently represent an alkyl group, a cycloalkyl group, an aryl group, or an acyl group. However, the case where $R^{AC1}$ and $R^{AC2}$ bond to each other to form a ring is excluded. $R^{AC3}$ to $R^{AC6}$ each independently represent a hydrogen atom, an alkyl group, a cycloalkyl group, an aryl group, an acyl group, an alkoxy group, or an alkoxycarbonyl group. Further, at least two of $R^{AC3}$ to $R^{AC6}$ may bond to each other, to form a ring. An asterisk (*) represents a bonding hand to bond with L.

In formula (I), X represents a group represented by formula (I-A-1) or (I-A-2).

An alkyl group in $R^{AC1}$ to $R^{AC6}$ may be any of a straight chain and a branched chain, and the number of carbon atoms is preferably 1 to 12, and more preferably 1 to 8. For example, it can be mentioned: methyl, ethyl, n-propyl, isopropyl, n-butyl, isobutyl, s-butyl, t-butyl, n-hexyl, n-octyl, 2-ethylhexyl, n-decyl, n-dodecyl, benzyl, and phenoxyethyl.

The cycloalkyl group in $R^{AC1}$ to $R^{AC6}$ is preferably that having from 3 to 12 carbon atoms, more preferably from 5 to 12 carbon atoms, and further preferably from 5 to 8 carbon atoms. Specific examples include cyclopropyl, cyclopentyl, and cyclohexyl; and cyclopentyl and cyclohexyl are preferred.

The aryl group in $R^{AC1}$ to $R^{AC6}$ is preferably that having from 6 to 20 carbon atoms, more preferably from 6 to 16 carbon atoms, and further preferably from 6 to 12 carbon atoms. Specific examples include phenyl, and naphthyl; and a phenyl group that may have a substituent is preferred.

The acyl group in $R^{AC1}$ to $R^{AC6}$ is preferably that having from 2 to 20 carbon atoms. The acyl group may be any of an alkylcarbonyl group, an alkenylcarbonyl group, a cycloalkylcarbonyl group, a cycloalkenylcarbonyl group, an arylcarbonyl group, or a heterocyclic carbonyl group. Specific examples include acetyl, propionyl, butyryl, isobutyryl, valeryl, isovaleryl, pivaloyl, benzoyl, naphthoyl, acryloyl, nicotinoyl, cyclopropylcarbonyl, and cyclohexylcarbonyl.

Among the acyl group, an alkylcarbonyl group, and an arylcarbonyl group are preferred.

The alkoxy group in $R^{AC3}$ to $R^{AC6}$ is preferably that having from 1 to 20 carbon atoms, more preferably from 2 to 16 carbon atoms. Specific examples include methoxy, ethoxy, isopropoxy, hexyloxy, and 2-ethylhexyloxy.

The alkoxycarbonyl group in $R^{AC3}$ to $R^{AC6}$ is preferably that having from 2 to 12 carbon atoms, more preferably from 2 to 8 carbon atoms, and further preferably from 2 to 6 carbon atoms. Specific examples include methoxycarbonyl, ethoxycarbonyl, isopropoxycarbonyl, n-butoxycarbonyl, t-butoxycarbonyl, 2-ethylhexyloxycarbonyl, and benzyloxycarbonyl.

The alkyl group, the cycloalkyl group, the aryl group, and the acyl group in $R^{AC1}$ to $R^{AC6}$; and the alkoxy group and the alkoxycarbonyl group in $R^{AC3}$ to $R^{AC6}$, may further have a substituent. Examples of such a substituent include those exemplified as the substituent S described in below. Among such a substituent, any of alkyl group, cycloalkyl group, aryl group, alkoxy group, aryloxy group, alkylthio group, arylthio group, acyl group, alkoxycarbonyl group, carbamoyl group, sulfamoyl group, sulfonyl group, cyano group, halogen atom, and hydroxy group are preferred.

A ring formed by bonding of at least two of $R^{AC3}$ to $R^{AC6}$ to each other is preferably a 5- or 6-membered ring, and more preferably a cyclopentane ring or a cyclohexane ring. Further, $R^{AC4}$ and $R^{AC5}$ may preferably bond to each other, to form a ring.

A thus-formed ring may have a substituent. Examples of such a substituent include those exemplified as the substituent S.

$R^{AC1}$ and $R^{AC2}$ each are preferably an alkyl group or an acyl group, and more preferably an alkyl group.

$R^{AC3}$ to $R^{AC6}$ each are preferably a hydrogen atom, an alkyl group, an alkoxy group, or an alkoxycarbonyl group, and more preferably a hydrogen atom or an alkyl group.

Moreover, the case where all of $R^{AC3}$ to $R^{AC6}$ each are the hydrogen atom, the case where at least two thereof each is the hydrogen atom, or the case where all each are the alkyl group, is preferred.

L represents a single bond or a divalent linking group, and specific examples of the divalent linking group include an alkylene group, a cycloalkylene group, an arylene group, or a divalent heterocyclic group.

Among them, an arylene group or a divalent heterocyclic group is preferred, an arylene group or a heteroarylene group is further preferred, and an arylene group is still further preferred.

Examples of the arylene group include phenylene and naphtylene, and the phenylene is preferred. Moreover, as a heterocycle of the heteroarylene group, a hetero aromatic ring of a 5- or 6-membered ring in which a ring-constituting atom has a hetero atom selected from an oxygen atom, a sulfur atom and a nitrogen atom is preferred, and which may be condensed with a benzene ring. Specific examples include a furan ring, a thiazole ring, a pyrrole ring, and a pyridine ring.

The arylene group and the hetero ring may have a substituent. Examples of such a substituent include those exemplified as the substituent S.

n represents an integer of 2 or more, and is preferably 2 to 6, more preferably 2 to 4, and further preferably 2.

When n is 2, Z represents a single bond or a divalent linking group, and when n is 3 or more, Z represents an n-valent linking group, namely a trivalent or higher-valent linking group.

Examples of the divalent linking group include: —O—, —S—, —SO—, —SO$_2$—, —N(Ra)-, —OC(=O)—, —C(=O)O—, an alkylene group, —O-alkylene-O—, —O-(alkylene-O)l-O—, an arylene group, a heteroarylene group, —C(=O)O—Y—OC(=O)—, —OC(=O)—Y—C(=O)O—, and —OC(=O)—Y—OC(=O)—. Herein, Ra represents a hydrogen atom, an alkyl group, or an acyl group, l represents an integer of 1 to 10, and Y represents an alkylene group, a cycloalkylene group, an arylene group, or a divalent heterocyclic group. Herein, the alkylene group is also preferably —C($R^{11}$)($R^{12}$)—, in which $R^{11}$ and $R^{12}$ each independently represent a hydrogen atom, an alkyl group, or an aryl group.

Specific examples of the trivalent linking group include: >C($R^{13}$)—, >N—, a trivalent cycloalkyl group, a trivalent aryl group, and a trivalent heteroaryl group. Herein, $R^{13}$ represents a hydrogen atom, an alkyl group, or an aryl group.

Specific examples of the tetravalent linking group include: >C<, (—OCH$_2$CH$_2$)$_2$C(CH$_2$CH$_2$O—)$_2$, and a tetravalent arylene group.

The compound represented by formula (I) preferably has at least one benzene ring, and the number of benzene rings is preferably 1 to 4, more preferably 2 to 4, still more preferably 2 or 3, and particularly preferably 2.

The compound represented by formula (I) preferably has 2 to 4 pieces of X, more preferably 2 or 3 pieces thereof, and still more preferably, 2 pieces thereof, in the compound.

Moreover, in the compound represented by formula (I), the total number of carbon atoms in component parts other than X is preferably 40 or less, more preferably 6 to 40, and still more preferably 12 to 24. Among them, the case where n is 2 to 4 is particularly preferred.

When the total number of carbon atoms in the component parts other than X exceeds 40, the resultant compound becomes hard to diffuse into the polarizer.

In the compound represented by formula (I), the smallest number of atoms comprised in the linking group between any two of X's is preferably 20 or less, more preferably 2 to 20, still more preferably 6 to 20, and particularly preferably 8 to 20, between any of two of X's.

The smallest number of atoms comprised in the linking group between any two of X's is bonded means: for example, as described below, the number of the carbon atom counted from the first carbon atom with which —CH(OCH$_3$)$_2$ is bonded to the carbon atom with which the other —CH(OCH$_3$)$_2$ is bonded is 8 or 12 in the order from above, and accordingly the number of linking atoms is 8 and 12, respectively.

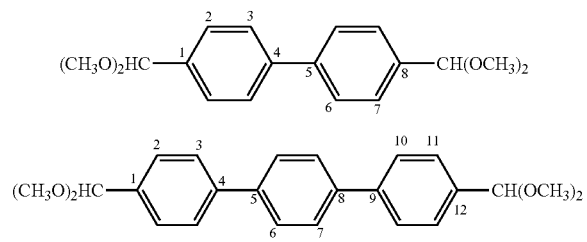

The compound represented by formula (I) is preferably a compound represented by any one of formulae (II-1) to (II-5).

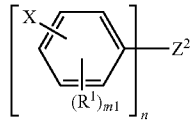

Formula (II-1)

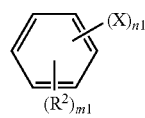

Formula (II-2)

Formula (II-3)

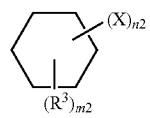

Formula (II-4)

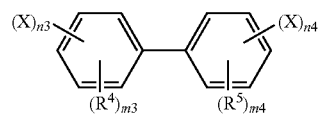

Formula (II-5)

In formulae (II-1) to (II-5), X and n have the same meaning as X and n in formula (I), and preferable ranges are also the same. When n is 2, $Z^2$ represents a divalent linking group, and when n is 3 or more, $Z^2$ represents an n-valent chain hydrocarbon group. When n is 2, $Z^3$ represents a divalent alkylene group, and when n is 3 or more, $Z^3$ represents an n-valent chain hydrocarbon group. However, the case where $Z^3$ has a ring structure is excluded. $R^1$ to $R^5$ each independently represent a substituent. n1 and n2 each independently represent an integer of 2 to 6. n3 and n4 each independently represent an integer of 1 to 5. m1, m3, and m4 each independently represent an integer of 0 to 4; m2 represents an integer of 0 to 10.

Examples of the substituent in $R^1$ to $R^5$ include those exemplified as the substituent S.

m1 to m4 each are preferably an integer of 0 to 2, more preferably 0 or 1, and further preferably 0.

In addition, when each of m1 to m4 is 2 or more, a plurality of substituents may bond to each other, to form a ring.

n1 and n2 each are preferably an integer of 2 to 4, and more preferably 2.

n3 and n4 each are preferably 1 or 2, and more preferably 1.

In formula (II-1), the case where $R^1$ and $Z^2$ each are an electron-withdrawing group to X is one of preferred aspects. The electron-withdrawing group is preferably a group having a Hammett equation a value of −0.10 or more, and more preferably 0 or more. Specific examples of a substituent having a positive σp value include: a halogen atom, such as fluorine (0.06), chlorine (0.30), bromine (0.27), and iodine (0.30); a group having carbonyl, such as —CHO (0.22), —COCH$_3$ (0.50), —COC$_6$H$_5$ (0.46), —CONH$_2$ (0.36), —COO— (0.30), —COOH, (0.41), —COOCH$_3$ (0.39), and —COOC$_2$H$_5$ (0.45); a group having sulfonyl or sulfinyl, such as —SOCH$_3$ (0.49), —SO$_2$CH$_3$ (0.72), —SO$_2$C$_6$H$_5$ (0.68), —SO$_2$CF$_3$ (0.93), —SO$_2$NH$_2$ (0.57), —SO$_2$OC$_6$H (0.23), —SO$_3$— (0.09), and —SO$_3$H (0.50); a nitrogen-containing substituent, such as —CN (0.66), —NO$_2$ (0.78), —N(CH$_3$)$_3^{3+}$ (0.82), and —N(CF$_3$)$_2$ (0.53); and a halogen atom-substituted alkyl group, such as —CCl$_3$ (0.46), —CH$_2$Cl (0.18), —CHCl$_2$ (0.32), and —CF$_3$ (0.54). Herein, a value within a parenthesis represents the σp value.

Hammett's σ value is described in, for example, C. Harsch et al, J. Med. Chem., 16, 1207 (1973), ibid., 20, 304 (1977), and Chem. Rev. 91, 165 (1991).

Hereinafter, preferred basic skeletons and preferred acetal moieties ($X^1$ to $X^4$) are shown.

In the present invention, all of the combinations are preferred.

Basic Skeletons

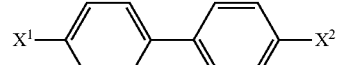

(1)

(2)

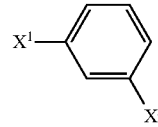

(3)

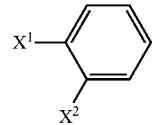

(4)

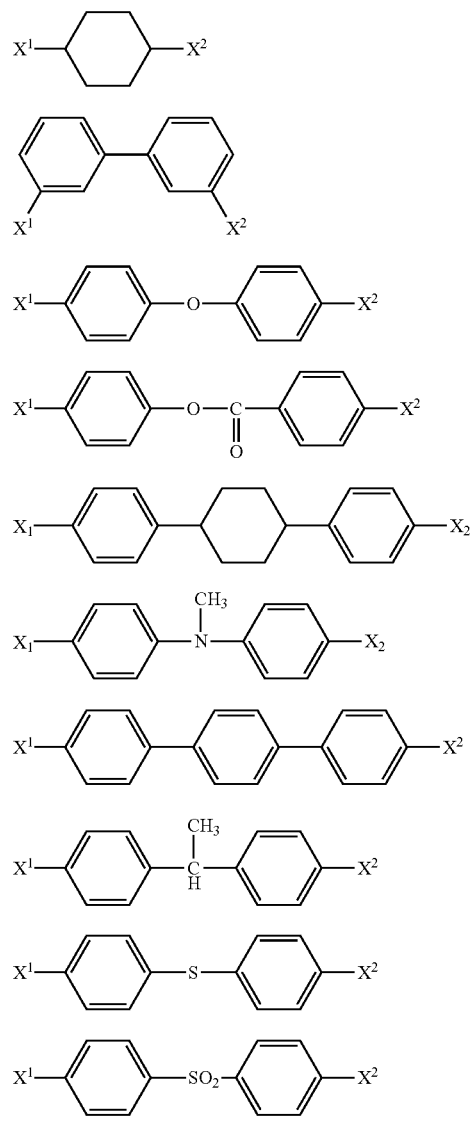
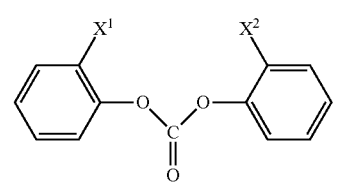
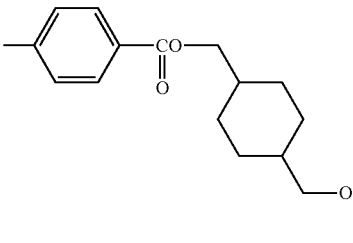
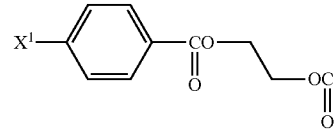
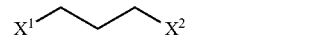
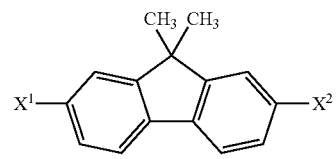
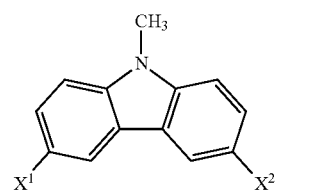
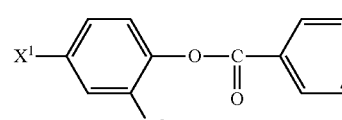
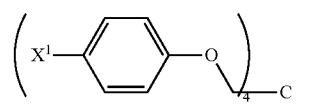

(27)
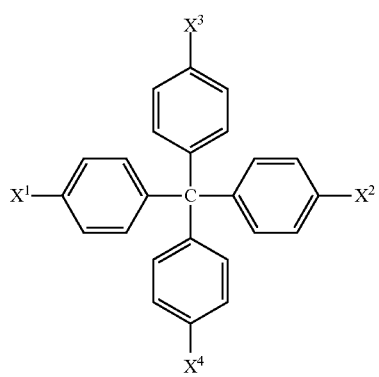
(28)
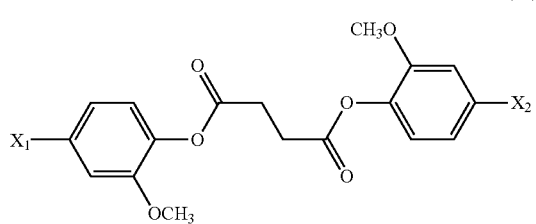
Acetal Moieties ($X^1$ to $X^4$)
(A-101-n)
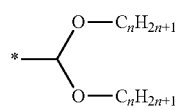
(A-102)
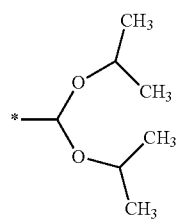
(A-103)
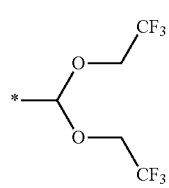
(A-104)
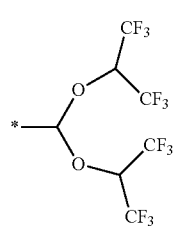
(A-105)
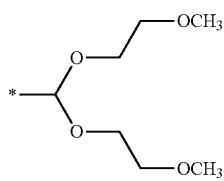
(A-106)
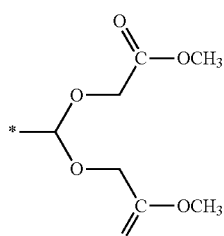
(A-107)
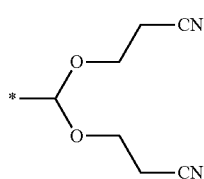
(A-108)
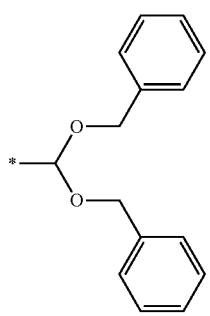
(A-201)
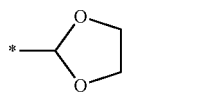
(A-202)
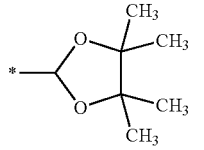
(A-203)
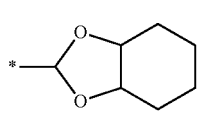
(A-204)
(A-205)
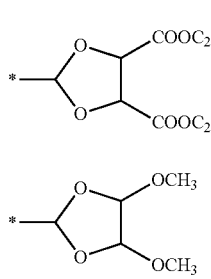

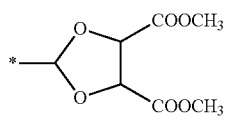
(A-206)

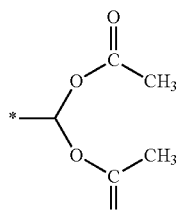
(A-301)

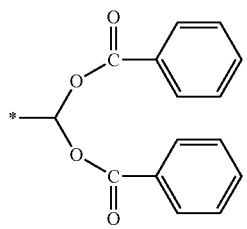
(A-302)

Herein, n in (A-101-n) described above means n in the formula, and (A-101-1) represents —CH(OCH$_3$)$_2$, for example. Moreover, an asterisk (*) represents a bonding hand to form a bonding with the basic skeleton.

Specific examples of the compound represented by formula (I) are shown below, but the present invention is not limited to those.

In addition, Tables 1 and 2 show specific examples in which the above-described basic skeletons and acetal moieties ($X^1$ to $X^4$) are made into tables.

TABLE 1

| Compound No. | Details of the skelton/moieties | | | | |
|---|---|---|---|---|---|
| | Basic skeleton | Acetal moieties | | | |
| | | $X^1$ | $X^2$ | $X^3$ | $X^4$ |
| D-1 | 1 | A-101-1 | A-101-1 | — | — |
| D-2 | 1 | A-107 | A-107 | — | — |
| D-3 | 1 | A-201 | A-201 | — | — |
| D-4 | 1 | A-202 | A-202 | — | — |
| D-5 | 1 | A-203 | A-203 | — | — |
| D-6 | 2 | A-101-1 | A-101-1 | — | — |
| D-7 | 2 | A-101-4 | A-101-4 | — | — |
| D-8 | 2 | A-202 | A-202 | — | — |
| D-9 | 2 | A-301 | A-301 | — | — |
| D-10 | 3 | A-101-1 | A-101-1 | — | — |
| D-11 | 3 | A-101-8 | A-101-8 | — | — |
| D-12 | 4 | A-101-1 | A-101-1 | — | — |
| D-13 | 4 | A-202 | A-202 | — | — |
| D-14 | 5 | A-101-1 | A-101-1 | — | — |
| D-15 | 6 | A-101-1 | A-101-1 | — | — |
| D-16 | 7 | A-101-1 | A-101-1 | — | — |
| D-17 | 8 | A-101-1 | A-101-1 | — | — |
| D-18 | 8 | A-102 | A-102 | — | — |
| D-19 | 8 | A-301 | A-301 | — | — |
| D-20 | 9 | A-103 | A-103 | — | — |
| D-21 | 10 | A-104 | A-104 | — | — |
| D-22 | 11 | A-105 | A-105 | — | — |
| D-23 | 12 | A-106 | A-106 | — | — |
| D-24 | 13 | A-107 | A-107 | — | — |
| D-25 | 14 | A-108 | A-108 | — | — |
| D-26 | 15 | A-101-1 | A-101-1 | — | — |
| D-27 | 16 | A-101-1 | A-101-1 | — | — |
| D-28 | 17 | A-101-1 | A-101-1 | — | — |

TABLE 1-continued

| Compound No. | Details of the skelton/moieties | | | | |
|---|---|---|---|---|---|
| | Basic skeleton | Acetal moieties | | | |
| | | $X^1$ | $X^2$ | $X^3$ | $X^4$ |
| D-29 | 18 | A-101-1 | A-101-1 | — | — |
| D-30 | 19 | A-101-1 | A-101-1 | — | — |
| D-31 | 20 | A-101-1 | A-101-1 | — | — |
| D-32 | 20 | A-302 | A-302 | — | — |
| D-33 | 21 | A-101-1 | A-101-1 | — | — |
| D-34 | 21 | A-106 | A-106 | — | — |
| D-35 | 21 | A-101-1 | A-107 | — | — |
| D-36 | 21 | A-108 | A-108 | — | — |
| D-37 | 21 | A-201 | A-201 | — | — |
| D-38 | 21 | A-204 | A-204 | — | — |
| D-39 | 21 | A-205 | A-205 | — | — |
| D-40 | 21 | A-206 | A-206 | — | — |

TABLE 2

| Compound No. | Details of the skelton/moieties | | | | |
|---|---|---|---|---|---|
| | Basic skeleton | Acetal moieties | | | |
| | | $X^1$ | $X^2$ | $X^3$ | $X^4$ |
| D-41 | 22 | A-101-1 | A-101-1 | — | — |
| D-42 | 22 | A-108 | A-108 | — | — |
| D-43 | 23 | A-101-1 | A-101-1 | — | — |
| D-44 | 24 | A-101-1 | A-101-1 | — | — |
| D-45 | 25 | A-101-1 | A-101-1 | A-101-1 | — |
| D-46 | 26 | A-101-1 | — | — | — |
| D-47 | 27 | A-101-1 | A-101-1 | A-101-1 | A-101-1 |
| D-48 | 28 | A-101-1 | A-101-1 | — | — |
| D-49 | 28 | A-101-1 | A-206 | — | — |
| D-50 | 28 | A-101-1 | A-107 | — | — |

Note:
'—' means not contained.

As the compound represented by formula (I) according to the present invention, a commercially available product may be obtained, or may be synthesized via any of known methods. For example, the compound can be synthesized via acetalization of a compound having a formyl group, according to an ordinary manner. The compound can be readily synthesized, by using a formyl compound having a substituent as a raw material, performing a general synthetic reaction, such as esterification, amidation, and alkylation, to obtain a formyl compound having any of various skeletons, and performing acetalization thereof. Moreover, the formyl compound as the raw material can be synthesized via oxidizing a corresponding alcohol, by using a general oxidizing agent, such as manganese dioxide.

The compound represented by formula (I) according to the present invention is preferably blended within the range of 0.1 to 30 parts by mass, more preferably within the range of 1 to 25 parts by mass, and still more preferably within the range of 1.5 to 20 parts by mass, to 100 parts by mass of the resin constituting the polarizing plate protective film.

Hereinafter, the substituent S is described in detail.
The substituent S includes the following substituents or atoms.

<Substituent S>

The substituent S include: alkyl groups (preferably those having from 1 to 20 carbon atoms, for example, methyl, ethyl, isopropyl, tert-butyl, pentyl, heptyl, 1-ethylpentyl, 2-ethylhexyl, benzyl, 2-ethoxyethyl, 1-carboxymethyl); alkenyl groups (preferably those having from 2 to 20 carbon atoms, for example, vinyl, allyl, oleyl); alkynyl groups (preferably those having from 2 to 20 carbon atoms, for example, ethynyl, 2-propynyl, 2-butynyl, phenylethynyl); cycloalkyl groups (preferably those having from 3 to 20 carbon atoms, for example, cyclopropyl, cyclopentyl, cyclohexyl, 4-methylcyclohexyl); aryl groups (preferably those having from 6 to 20 carbon atoms, for example, phenyl, 1-naphtyl, 4-methoxyphenyl, 2-chlorophenyl, 3-methylphenyl); heterocyclic groups (those preferably having from 0 to 20 carbon atoms and preferably having a ring-constituting heteroatom selected from an oxygen atom, a nitrogen atom or a sulfur atom, and those preferably having a 5- or 6-membered ring which may be condensed with a benzene ring or a hetero ring, and the ring may be a saturated ring, an unsaturated ring or an aromatic ring, for example, 2-pyridyl, 4-pyridyl, 2-imidazolyl, 2-benzoimidazolyl, 2-thiazolyl, 2-oxazolyl); alkoxy groups (preferably those having from 1 to 20 carbon atoms, for example, methoxy, ethoxy, isopropyloxy, benzyloxy); aryloxy groups (preferably those having from 6 to 20 carbon atoms, for example, phenoxy, 1-naphthyloxy, 3-methylphenoxy, 4-methoxyphenoxy);
alkylthio groups (preferably those having from 1 to 20 carbon atoms, for example, methylthio, ethylthio, isopropylthio, benzylthio); arylthio groups (preferably those having from 6 to 20 carbon atoms, for example, phenylthio, 1-naphtylthio, 3-methylphenylthio, 4-methoxyphenylthio); formyl group; acyl groups (those including an alkylcarbonyl group, an alkenylcarbonyl group, an arylcarbonyl group, and a heterocyclic carbonyl group, and preferably having 20 or less carbon atoms, for example, acetyl, pivaloyl, acryloyl, methacryloyl, benzoyl, nicotinoyl); alkoxycarbonyl groups (preferably those having from 2 to 20 carbon atoms, for example, ethoxycarbonyl, 2-ethylhexyloxycarbonyl); aryloxycarbonyl groups (preferably those having from 7 to 20 carbon atoms, for example, phenyloxycarbonyl, naphthyloxycarbonyl); amino groups (those including an amino group, an alkylamino group, an arylamino group, and a heterocyclic amino group, and preferably having from 0 to 20 carbon atoms, for example, amino, N,N-dimethylamino, N,N-diethylamino, N-ethylamino, anilino, 1-pyrrolidinyl, piperidino, morpholinyl); alkyl- or aryl-sulfonamido groups (preferably those having from 0 to 20 carbon atoms, for example, N,N-dimethylsulfonamido, N-phenylsulfonamido); sulfamoyl groups (preferably those having from 0 to 20 carbon atoms, and preferably an —SO$_2$NH$_2$ or alkyl- or aryl-sulfamoyl group, for example, N,N-dimethylsulfamoyl, N-phenylsulfamoyl); acyloxy groups (preferably those having from 1 to 20 carbon atoms, for example, acetyloxy, benzoyloxy); carbamoyl groups (preferably those having from 1 to 20 carbon atoms, and preferably a —C(=O)NH$_2$ or alkyl- or aryl-carbamoyl group, for example, N,N-dimethylcarbamoyl, N-phenylcarbamoyl);
acylamino groups (preferably those having from 1 to 20 carbon atoms, for example, acetylamino, acryloylamino, benzoylamino, nicotine amido); thioacyl groups, alkoxythiocarbonyl groups, aryloxythiocarbonyl groups, and thiocarbamoyl groups; (those preferred range and specific examples including ones different in only the case where C(=O) moieties in acyl groups, alkoxycarbonyl groups, aryloxycarbonyl groups, and carbamoyl groups corresponding thereto are substituted with (C=S)); silyl groups (preferably those having from 3 to 20 carbon atoms, more preferably a silyl group substituted with an alkoxy or aryloxy, further preferably a trialkoxysilyl group, for example, trimethoxysilyl, triethoxysilyl); halogen atoms (for example, fluorine atom, chlorine atom, bromine atom, iodine atom); acylsulfamoyl groups (those including an alkylcarbonylsulfamoyl group, an alkenylcarbonylsulfamoyl group, an arylcarbonylsulfamoyl group, and a heterocyclic carbonylsulfamoyl group, and preferably having 20 or less carbon atoms, for example, acetylsulfamoyl, pivaloylsulfamoyl, acryloylsulfamoyl, methacryloylsulfamoyl, benzoylsulfamoyl, nicotinoylsulfamoyl); alkyl- or aryl-sulfonylsulfamoyl groups (preferably those having from 1 to 20 carbon atoms, for example, methylsulfonylsulfamoyl, ethylsulfonylsulfamoyl, phenylsulfonylsulfamoyl, tolylsulfonylsulfamoyl); cyano group; nitro group; hydroxy group or anions thereof; mercapto group or anions thereof; sulfo group or salts thereof; carboxy group or salts thereof; phosphate group or salts thereof; boronic acid groups or salts thereof; boronic ester groups; and onio groups (for example, sulfonio groups of sulfonium salts, ammonio groups of ammonium salts, iodonio groups of iodonium salts, phosphonio groups of phosphonium salts).

Any of these substituents may be further substituted with a substituent. Examples of such a substituent include those exemplified as the substituent S.

Specific examples include: an aralkyl group in which an alkyl group is substituted with an aryl group (for example, benzyl, phenethyl, and diphenylmethyl); a group in which an alkyl group is substituted with an alkoxycarbonyl group or a cyano group (for example, benzoylmethyl); a perfluoroalkyl group in which an alkyl group is substituted with a fluorine atom, such as trifluoromethyl; and a substituted aryl group in which an aryl group is substituted with the substituent S. Moreover, specific preferable examples also include: a group having an active methine or active methylene structure (an alkyl group substituted with an electron-withdrawing group, a group having a moiety in which methine or methylene is bonded with an electron-withdrawing group, or a group having a methine or methylene moiety sandwiched by electron-withdrawing groups).

<Resin>

The polarizing plate protective film of the present invention is preferably formed with containing a resin, and in a film shape.

As the resin to be used in the polarizing plate protective film, any of resins can be utilized, and is not particularly limited as long as it is not contrary to the spirit of the present invention. Specific examples of the resin include: a cellulose acylate resin, an acrylic resin, and a cycloolefin-based resin. Among these resins, an acrylic resin and a cellulose acylate resin are preferred, and from a viewpoint of excellent compatibility with the compound represented by formula (I), a cellulose acylate resin is further preferred.

One kind of these resins may be used, or two or more kinds thereof may be used in combination, but when two or more kinds are used in combination, a component contained in the highest amount in the resin components is taken as a main component.

(Cellulose Acylate)

In the present invention, a cellulose acylate is used as a main component of the cellulose acylate film. One kind of the cellulose acylate may be used, or alternatively two or more kinds thereof may be used. For example, the cellulose acylate may be a cellulose acetate having only an acetyl group as the acyl substituent thereof, a cellulose acylate having a plurality of different acyl substituents may be used; or alternatively, the cellulose acylate may be a mixture of cellulose acylates that are different from one another. In addition, the main component means one in which the cellulose acylate is contained in 50% by mass or more in the resin components constituting the film or the layer, and the content of the cellulose acylate in the resin components is preferably 60% by mass or more, and more preferably 80% by mass or more.

The cellulose raw material for the cellulose acylate which is used in the present invention includes: cotton linter, and wood pulp (hardwood pulp, softwood pulp). The cellulose (or the cellulose acylate) obtained from any of such cellulose raw materials can be usable herein. Those cellulose materials may be mixed for use herein. The cellulose raw materials are described in detail, for example, by Marusawa & Uda's in "Plastic Material Lecture (17), Cellulose Resin" by Nikkan Kogyo Shinbun (1970) and Hatsumei Kyokai's Research Disclosure Bulletin 2001-1745 (pp. 7-8), and those celluloses described therein may be usable herein.

In the present specification, the acyl group of the cellulose acylate may be one kind, or two or more kinds of acyl groups. It is preferable that the cellulose acylate to be used in the present invention has an acyl group having 2 or greater carbon atoms as a substituent. The acyl group having 2 or greater carbon atoms is not particularly limited such that it may be an aliphatic acyl group or an aromatic acyl group. Examples thereof include: cellulosic alkylcarbonyl groups, alkenylcarbonyl groups, aromatic carbonyl groups, and aromatic alkylcarbonyl groups, each of which may have a substituted group. Preferable examples thereof include: acetyl, propionyl, butanoyl, heptanoyl, hexanoyl, octanoyl, decanoyl, dodecanoyl, tridecanoyl, tetradecanoyl, hexadecanoyl, octadecanoyl, isobutanoyl, tert-butanoyl, cyclohexane-carbonyl, oleoyl, benzoyl, naphthyl-carbonyl, and cinnamoyl. Among these, acetyl, propionyl, butanoyl, dodecanoyl, octadecanoyl, tert-butanoyl, oleoyl, benzoyl, naphthyl-carbonyl, and cinnamoyl are more preferred. Further, acetyl, propionyl, and butanoyl are still more preferred.

It is preferable that the cellulose acylate to be used in the present invention has an acyl group having 2 to 4 carbon atoms as a substituent. When two or more kinds of acyl groups are to be used, it is preferable that one kind of the acyl groups is an acetyl group, and that another kind of the acyl groups having 2 to 4 carbon atoms is a propionyl group or butyryl group. By use of any of these cellulose acylates, a solution with a good solubility can be prepared. Particularly in a non-chlorine-based organic solvent, preparation of a good solution becomes possible. Further, preparation of a solution having a low viscosity and a good filterability becomes possible.

In the present invention, particularly, a cellulose acylate having one acetyl group as the acyl groups is preferably to be used.

Hereinafter, the cellulose acylate preferably to be used in the present invention is described in detail.

The glucose unit having β-1, β-4 bonds, which constitutes the cellulose, has free hydroxy groups at the 2-, 3-, and 6-positions thereof. The cellulose acylate is a polymeric substance (polymer) in which a part of or all of these hydroxy groups is or are acylated.

The acyl substitution degree indicates a degree of acylation of the hydroxy groups located at the 2-, 3-, and 6-positions of cellulose. When each of the hydroxy groups at the 2-, 3-, and 6-positions of all of the glucose units is acylated, the total acyl substitution degree is 3. For example, when each of the hydroxy groups only at the 6-position in all of the glucose units is acylated, the total acyl substitution degree is 1. In the same manner, even if each of the hydroxy groups at either the 6-position or the 2-position in all of the glucose unit is acylated, the total acyl substitution degree is 1.

That is to say, the acyl substitution degree indicates a degree of acylation, provided that when all of the hydroxy groups of the glucose molecule are entirely acylated, the acyl substitution degree is 3.

As the details of the method of measuring the acyl substitution degree, measurement can be performed according to the method described in Tezuka et al., Carbohydrate. Res., 273, 83-91 (1995), or in accordance with the method specified in ASTM-D817-96.

If a total acetyl substitution degree of the cellulose acylate to be used in the present invention is taken as A, A is preferably 1.5 or more and 3.0 or less ($1.5 \leq A \leq 3.0$). In the present invention, A is preferably 2.80 to 2.97, from the viewpoint of compatibility with the compound represented by formula (I) and haze reduction.

Moreover, in the cellulose acetate in which only the acetyl group is used as the acyl group of the cellulose acylate, if a total acetyl substitution degree is taken as B, B is preferably 2.0 or more and 3 or less ($2.0 \leq B \leq 3.0$). In the present invention, B is preferably 2.80 to 2.97, from the viewpoint of compatibility with the compound represented by formula (I) and haze reduction.

In the case where the polarizing plate protective film of the present invention is a laminate (multilayer configuration), the degree of acyl group substitution of the cellulose acylate in each layer may be uniform, or a plurality of cellulose acrylates which have different degrees of acyl group substitution or different acyl groups may be present in one layer in a mixed manner, in the cellulose acylate film.

In the case where an acid anhydride or an acid chloride is used as an acylating agent in acylation of the cellulose, methylene chloride or an organic acid, for example, acetic acid and the like, is used as an organic solvent which acts as a reaction solvent.

As for the catalyst, when the acylating agent is an acid anhydride, a protic catalyst, such as sulfuric acid, is preferably used. When the acylating agent is an acid chloride (for example, $CH_3CH_2COCl$), a basic compound is preferably used.

A most common industrial method for the synthesis of a mixed fatty acid ester of cellulose, is a method of acylating cellulose with a mixed organic acid component that includes: fatty acids corresponding to an acetyl group and to any other acyl group (acetic acid, propionic acid, valeric acid, and the like); or any of acid anhydrides thereof.

The cellulose acylate may be produced, for example, according to the method described in JP-A-H10-45804.

In the polarizing plate protective film of the present invention, particularly in the cellulose acylate film to be preferably used in the present invention, it is the proportion of preferably from 5 to 99% by mass, more preferably from 20 to 99% by mass, and particularly preferably from 50 to 95% by mass, of the cellulose acylate, to the total solid content of the film, from the viewpoint of water-vapor transmission ratio.

<Other Additives>

To the polarizing plate protective film of the present invention, along with the compound represented by formula (I), particularly to the cellulose acylate film, a retardation-controlling agent (a retardation-developing agent and a retardation-reducing agent), a polycondensation ester compound (polymer) as a plasticizer, and a polyvalent ester of a polyvalent alcohol, for example, a phthalic acid ester, a phosphoric acid ester, a sugar ester, and the like, may be added; and, further, any of additives, such as a ultraviolet absorber, an antioxidant, and a matting agent, may be added.

In the present specification, when compound groups are described, they may be described incorporating therein the expression "-based", for example, like a phosphoric acid ester-based compound. However, in this case, this means the same as the phosphoric acid ester compound.

As the retardation-reducing agent, the retardation-developing agent, the plasticizer, a hydrophobizing agent including a polyhydric alcohol ester-based or a polycondensation ester-based, a carbohydrate derivative-based plasticizer, the antioxidant, the ultraviolet absorber, and the matting agent, compounds or materials as described in JP-A-2013-28782, paragraphs 0061 to 0126 and WO 2014/034709, paragraphs 0066 to 0216 are preferred, and the entire descriptions also including the content thereof are preferably incorporated by reference herein.

(Radical Scavenger)

The polarizing plate protective film preferably contains a radical scavenger. Any of a HALS and a reductone is preferably used, as the radical scavenger.

The HALS is particularly preferably a compound having a 2,2,6,6-tetramethyl-piperidine ring, it is preferably a compound in which the 1-position of the piperidine is a hydrogen atom, an alkyl group, an alkoxy group, a hydroxy group, an oxy radical group (—O—), an acyloxy group, or an acyl group, and it is more preferably a compound in which the 4-position thereof is a hydrogen atom, a hydroxy group, an acyloxy group, an amino group which may have a substituent, an alkoxy group, or an aryloxy group. In addition, it is also preferably a compound having from two to five 2,2,6,6-tetramethyl-piperidine rings in the molecule.

Examples of such a compound include: Sunlizer HA-622 (trade name, manufactured by Sort K.K.); CHIMASSORB 2020FDL, TINUVIN 770DF, TINUVIN 152, TINUVIN 123, and FLAMESTAB NOR 116 FF (each trade name, manufactured by BASF Japan Ltd. (the former Chiba Specialty Chemicals)); and CYASORB UV-3346, and CYASORB UV-3529 (each trade name, manufactured by SUN CHEMICAL Company Ltd.).

Examples of the reductones include: compounds exemplified in JP-A-H6-27599, paragraphs 0014 to 0034; compounds exemplified in JP-A-H6-110163, paragraphs 0012 to 0020; and compounds exemplified in JP-A-H8-114899, paragraphs 0022 to 0031.

In addition, it is possible to use preferably an oil-solubilized derivative of ascorbic acid or erythorbic acid, and examples thereof include L-ascorbyl stearate, L-ascorbyl tetraisopalmitate, L-ascorbyl palmitate, erythorbyl palmitate, and erythorbyl tetraisopalmitate. Among them, those having an ascorbic acid skeleton are preferable, and myristate, palmitate, and stearate of L-ascorbic acid esters are particularly preferable.

The content of the radical scavenger in the polarizing plate protective film is preferably from 0.001 to 2.0 parts by mass, and more preferably from 0.01 to 1.0 parts by mass, to 100 parts by mass of the resin constituting the polarizing plate protective film.

(Degradation Inhibitor)

To the polarizing plate protective film, a degradation inhibitor (for example, an antioxidant, a peroxide decomposition agent, a radical inhibitor, a metal deactivator, an acid trapping agent, and an amine) may be added. Moreover, the ultraviolet absorber is also one of the degradation inhibitors. These degradation inhibitor and the like are preferably those described in JP-A-S60-235852, JP-A-H3-199201, JP-A-H5-1907073, JP-A-H5-194789, JP-A-1H5-271471, JP-A-H6-107854, JP-A-H6-118233, JP-A-H6-148430, JP-A-H7-11056, JP-A-H7-11055, JP-A-H7-11056, JP-A-H8-29619, JP-A-H8-239509, JP-A-2000-204173, and JP-A-2006-251746.

The radical scavenger also exhibits the degradation preventing action, but an amine is also known as a degradation inhibitor. Examples thereof include: compounds described in JP-A-H5-194789, paragraphs 0009 to 0080; and an aliphatic amine, such as tri-n-octylamine, triisooctylamine, tris(2-ethylhexyl)amine, and N,N-dimethyldodecylamine.

In addition, it is also preferable to use a polyvalent amine having two or more amino groups, and those having two or more primary or secondary amino groups are preferable, as the polyvalent amine. Examples of the compound having two or more amino groups include: a nitrogen-containing heterocyclic compound (a compound having a pyrazolidine ring, a piperazine ring, or the like); and a polyamine-based compound (a compound which is a chain or cyclic polyamine and contains, for example, diethylenetriamine, tetraethylenepentamine, N,N'-bis(aminoethyl)-1,3-propanediamine, N,N,N',N",N"-pentakis(2-hydroxypropyl)diethylenetriamine, polyethyleneimine, modified polyethyleneimine, or cyclam, as a basic skeleton).

The content of the degradation inhibitor in the polarizing plate protective film is preferably from 1 ppm to 10%, more preferably from 1 ppm to 5.0%, and still more preferably from 10 ppm to 1.0%, on the mass basis.

(Peeling Accelerator)

To the polarizing plate protective film, any of peeling accelerators may be added.

The peeling accelerator is preferably an organic acid, a polyvalent carboxylic acid derivative, a surfactant, or a chelating agent. For example, compounds described in JP-A-2006-45497, paragraphs 0048 to 0081, compounds described in JP-A-2002-322294, paragraphs 0077 to 0086, compounds described in JP-A-2012-72348, paragraphs 0030 to 0056, and compounds described in WO 2014/034709, paragraphs 0206 to 0216, can be preferably used. The content of the peeling accelerator in the polarizing plate protective film is preferably from 1 ppm to 5.0%, more preferably from 1 ppm to 2.0%, on the mass basis.

(Matting Agent)

To the polarizing plate protective film of the present invention, fine particles are preferably added as a matting agent. Examples of the fine particles to be used in the present invention include: silicon dioxide, titanium dioxide, aluminum oxide, zirconium oxide, calcium carbonate, talc, clay, calcined kaolin, calcined calcium silicate, hydrated calcium silicate, aluminum silicate, magnesium silicate, and calcium phosphate. As the fine particles, fine particles containing silicon are preferred, from the viewpoint of lowering of turbidity, and silicon dioxide is particularly preferred. The fine particles of silicon dioxide preferably have an average primary particle size of 20 nm or less, and an apparent specific gravity of 70 g/L or more. The apparent specific gravity is more preferably 90 to 200 g/L, and further preferably 100 to 200 g/L. As the apparent specific gravity is higher, a dispersion of a higher concentration can be produced, and haze and aggregations are improved, which are preferably.

(Barbituric Acid-Based Additive)

In the polarizing plate protective film of the present invention, a compound represented by formula (A) is preferably used. In particular, when the resin constituting the polarizing plate protective film is a cellulose acylate, such a compound is preferably contained. In addition, the compound represented by formula (A) can develop many functions, and for example, the compound is effective in improving durability of the polarizing plate against light, heat or hygrothermal condition, or improving hardness of the polarizing plate protective film, or the like.

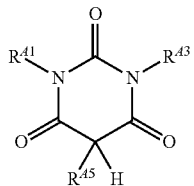

Formula (A)

In formula (A), $R^{41}$ and $R^{43}$ each independently represent a hydrogen atom, an alkyl group, a cycloalkyl group, an alkenyl group, or an aromatic group. Herein, the alkyl group, the cycloalkyl group, the alkenyl group, and the aromatic group may have a substituent. $R^{45}$ represents a hydrogen atom or a substituent.

The compound represented by formula (A) also includes a tautomer or a salt thereof having a structure in which a hydrogen atom in a ring structure is enolized with a carbonyl in the adjacent ring structure, or in which an imidic acid is formed when $R^{41}$ and $R^{43}$ each are a hydrogen atom.

The alkyl group of $R^{41}$, $R^{43}$, and $R^{45}$ is preferably that having from 1 to 20 carbon atoms, more preferably from 1 to 10 carbon atoms, further preferably from 1 to 5 carbon atoms, and particularly preferably from 1 to 3 carbon atoms. Among these, a methyl group or an ethyl group is preferred. When the alkyl group is an alkyl group in which a group having a ring structure is substituted, the alkyl group is preferably that having from 7 to 20 carbon atoms, more preferably from 7 to 12 carbon atoms, further preferably from 7 to 10 carbon atoms. The ring structure of the alkyl group having a ring structure may be an aromatic ring (including a heteroaromatic ring) or an aliphatic ring, and is preferably an aromatic hydrocarbon ring or an aliphatic ring. Examples of the alkyl group having a ring structure include: a benzyl group and a phenethyl group. Of these, a benzyl group is particularly preferable.

The cycloalkyl group of $R^{41}$ and $R^{43}$ is preferably that having from 3 to 20 carbon atoms, more preferably from 3 to 10 carbon atoms, further preferably from 4 to 8 carbon atoms, and particularly preferably 5 or 6 carbon atoms. Examples of the cycloalkyl group include cyclopropyl, cyclopentyl, and cyclohexyl. Of these, cyclohexyl is particularly preferable.

The alkenyl group of $R^{41}$ and $R^{43}$ is preferably that having from 2 to 20 carbon atoms, more preferably from 2 to 10 carbon atoms, and further preferably from 2 to 5 carbon atoms. Examples include vinyl and allyl.

The aromatic group of $R^{41}$ and $R^{43}$ may be an aromatic hydrocarbon group or an aromatic heterocyclic group, and is preferably an aromatic hydrocarbon group.

The aromatic hydrocarbon group is preferably that having from 6 to 20 carbon atoms, more preferably from 6 to 16 carbon atoms, and further preferably from 6 to 12 carbon atoms. As the aromatic hydrocarbon group, phenyl or naphtyl is preferred, and phenyl is more preferred.

The aromatic heterocyclic group is preferably a 5- or 6-membered hetero ring, and may be condensed with a benzene ring or a hetero ring. The heteroatom for constituting the hetero ring of the aromatic heterocyclic group is preferably a nitrogen atom, an oxygen atom, or a sulfur atom. The aromatic heterocyclic group is preferably that having from 0 to 20 carbon atoms, more preferably from 1 to 16 carbon atoms, and further preferably from 3 to 12 carbon atoms. Examples of such a hetero ring include: a pyrrole ring, a thiophene ring, a furan ring, a pyrazole ring, an oxazole ring, a thiazole ring, a pyridine ring, and an indole ring.

Examples of the substituent of $R^{45}$ include those exemplified as the substituent S. Among these, an alkyl group, a cycloalkyl group, an alkenyl group, an aromatic group, a halogen atom, a formyl group, an acyl group, a cyano group, and a water-soluble group are preferred.

Herein, the water-soluble group is a group that increases solubility of the compound in water, and is a group of an anion or a cation or is a group that is dissociated to be anionized (for example, pKa being preferably 10 or less).

Specific examples of such a group include: a sulfo group or a salt thereof, a carboxy group or a salt thereof, a phosphate group or a salt thereof, a hydroxy group, a mercapto group, an amino group, an onio group (preferably, an ammonio group), a sulfonamide group, an acylsulfamoyl group, an alkyl- or aryl-sulfonylsulfamoyl group, and a group having an active methine or active methylene structure.

In addition, the hydroxy group, the mercapto group, the amino group, the sulfonamide group, the acylsulfamoyl group, the alkyl- or aryl-sulfonylsulfamoyl group, and the group having an active methine or active methylene structure include any of those groups in a salt state.

$R^{45}$ is preferably a hydrogen atom, an alkyl group, a cycloalkyl group, an alkenyl group, an aromatic group, a formyl group, or an acyl group.

When $R^{41}$, $R^{43}$ and $R^{45}$ each are an alkyl group, a cycloalkyl group, an alkenyl group, or an aromatic group, examples of the substituent which they may have, include those exemplified as the substituent S. Among those, an alkyl group, a cycloalkyl group, an alkenyl group, an aromatic group, a heterocyclic group, an alkoxy group, an alkylthio group, an alkylsulfonyl group, a halogen atom, a formyl group, an acyl group, a silyl group, or a water-soluble group is preferred; an alkyl group, a cycloalkyl group, an aryl group, a heterocyclic group, an alkoxy group, an alkylthio group, an alkylsulfonyl group, a halogen atom, a formyl group, an acyl group, a silyl group, or a water-soluble group is more preferred; and an alkyl group, a cycloalkyl group, an aryl group, a heterocyclic group, an alkoxy group, an alkylthio group, an alkylsulfonyl group, a halogen atom, a formyl group, an acyl group, a hydroxy group, a sulfo group or a salt thereof, a carboxy group or a salt thereof, a boronic acid group or a salt thereof, a carbamoyl group, a sulfamoyl group, or an onio group (preferably an ammonio group including a quaternary ammonio group) is further preferred.

The compound represented by formula (A) is generally classified into two kinds described below as the respective preferred range, although the compound depends on the purpose of use.

A preferred first aspect is a compound in combination with the following substituents.

The aspect refers to the compound in which $R^{41}$, $R^{43}$ and $R^{45}$ are each independently a hydrogen atom, an alkyl group, a cycloalkyl group, an alkenyl group, or an aromatic group; the alkyl group, the cycloalkyl group, the alkenyl group, and the aromatic group may have a substituent; and as a preferred substituent, the compound has a substituent other than the water-soluble group, in the substituent S.

The substituent which each of those groups may have, is preferably an alkyl group, a cycloalkyl group, an alkenyl group, an aromatic group, a heterocyclic group, an alkoxy group, an alkylthio group, an acyl group, a silyl group, or a halogen atom.

Any of $R^{41}$, $R^{43}$ and $R^{45}$ is preferably a group having a ring structure, and the number of ring structures is preferably 1 to 6, more preferably 2 to 6, further preferably 2 to 5, and particularly preferably 3 to 5.

Examples of such a ring are preferably an aliphatic hydrocarbon ring and an aromatic hydrocarbon ring; more preferably a cyclopentane ring, a cyclohexane ring, a benzene ring, and a naphthalene ring; and further preferably a cyclohexane ring and a benzene ring.

When any of $R^{41}$, $R^{43}$ and $R^{45}$ is a cyclic group, a cycloalkyl group or an aryl group is preferred; and when any of $R^{41}$, $R^{43}$ and $R^{45}$ is a group having a ring structure, specific examples of the substituent include: a group having a cycloalkyl moiety or an aryl moiety, among those exemplified as the substituent S; and the group having a cycloalkyl group or an aryl group as a substituent is preferred, and a cycloalkyl-substituted alkyl group or an aralkyl group is particularly preferred, and a benzyl group is most preferred.

As the cyclic group or the group having a ring structure, among above, a cycloalkyl group, an aryl group, or an aralkyl group is preferred.

The molecular weight of the compound of the first aspect is preferably 250 to 1,200, more preferably 300 to 800, and particularly preferably 350 to 600.

The compound represented by formula (A) becomes hard to volatilize from the polarizing plate protective film, by combining the substituents and setting the molecular weight to such a preferred range, to become retaining in the polarizing plate protective film, thereby for giving a film high in transparency.

A preferred second aspect is a compound in combination with the following substituents.

This aspect utilizes a polar effect, and in a manner contrary to the first aspect, diffusibility is also taken into consideration.

$R^{41}$ and $R^{43}$ are each independently a hydrogen atom, an alkyl group, a cycloalkyl group, an alkenyl group, or an aromatic group; and $R^{45}$ is a hydrogen atom or a substituent; and it is: 1) a compound in which any of $R^{41}$, $R^{43}$ and $R^{45}$ is a water-soluble group or a group containing a water-soluble group; 2) a compound the molecular weight of which is 128 or more and less than 250; or/and 3) a compound in which any one or any two of $R^{41}$, $R^{43}$ and $R^{45}$ is a hydrogen atom.

The molecular weight of the compound of the second aspect is preferably 128 to 1,200, and more preferably 150 to 800.

Specific examples of the compound represented by formula (A) are shown below, but the present invention is not limited to these.

Moreover, the compounds described in JP-A-2011-118135, particularly in paragraphs 0030 to 0033, the compounds described in JP-A-2011-126968, particularly in paragraphs 0017 to 0025, the compounds described in WO 2014/034709, particularly in paragraphs 0024 to 0050, and the compounds described in JP-A-2014-194529, particularly in paragraphs 0014 to 0037 are preferably used, in combination with the compound represented by formula (I) according to the present invention.

As shown below, Ph represents a phenyl group, cHex represents a cyclohexyl group, $cC_5H_{11}$ represents a cyclopentyl group, $C_6H_4$ represents a phenylene group, a group within a parenthesis ( ), such as $C_6H_4$(p-$CH_3$), represents a substituent attached to the phenyl group, and "p-" represents a p-position.

Moreover, an asterisk (*) represents a bonding hand.

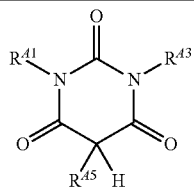

| Compound No. | $R^{41}$ | $R^{43}$ | $R^{45}$ |
|---|---|---|---|
| A-1 | Ph | $CH_2Ph$ | Ph |
| A-2 | Ph | Ph | $CH_2Ph$ |
| A-3 | Ph | $CH_2Ph$ | $CH_2Ph$ |
| A-4 | $CH_2Ph$ | $CH_2Ph$ | Ph |
| A-5 | $CH_2Ph$ | $CH_2Ph$ | $CH_2Ph$ |
| A-6 | Ph | $CH_2CH_2Ph$ | Ph |
| A-7 | Ph | $CH_2CH_2Ph$ | $CH_2Ph$ |
| A-8 | $C_6H_4$(m-$CH_3$) | $C_6H_4$(m-$CH_3$) | $CH_2Ph$ |
| A-9 | Ph | $CH_2Ph$ | $CH_2C_6H_4$(p-$OCH_3$) |
| A-10 | Ph | $CH_2C_6H_4$(p-$CH_3$) | Ph |
| A-11 | Ph | $CH_2C_6H_4$(p-t-Bu) | Ph |
| A-12 | Ph | $CH_2C_6H_4$(p-$CF_3$) | $CH_2C_6H_4$(p-$CH_3$) |
| A-13 | Ph | cHex | Ph |
| A-14 | Ph | cHex | $CH_2Ph$ |
| A-15 | $CH_2Ph$ | cHex | Ph |
| A-16 | $CH_2CH_2Ph$ | cHex | $CH_2Ph$ |
| A-17 | $CH_2Ph$ | cHex | $CH_2C_6H_4$(p-$CH_3$) |
| A-18 | cHex | cHex | Ph |
| A-19 | cHex | cHex | $CH_2Ph$ |
| A-20 | $CH_2Ph$ | Ph | cHex |
| A-21 | H | $CHPh_2$ | $CH_2Ph$ |
| A-22 | H | $CHPh_2$ | $CH_2C_6H_4$(p-$OCH_3$) |
| A-23 | H | $CH_2Ph$ | $CHPh_2$ |

-continued

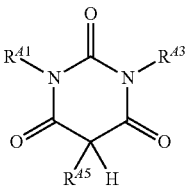

| Compound No. | $R^{A1}$ | $R^{A3}$ | $R^{A5}$ |
|---|---|---|---|
| A-24 | H | Ph | 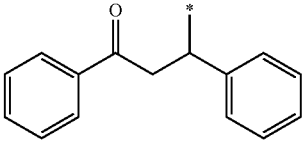 [SMILES: *C(CC(=O)c1ccccc1)c1ccccc1] |
| A-25 | H | cHex | $CHPh_2$ |
| A-26 | H | cHex |  |
| A-27 | H | $CHPh_2$ | $CHPh_2$ |
| A-28 | Ph | Ph | $CHPh_2$ |
| A-29 | Ph | Ph | 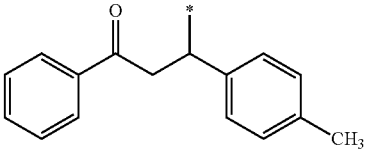 [SMILES: *C(CC(=O)c1ccccc1)c1ccc(C)cc1] |
| A-30 | $CH_2Ph$ | $CH_2Ph$ | cHex |
| A-31 | cHex | cHex | cHex |
| A-32 | $CH_2C_6H_4(p\text{-}CH_3)$ | $CH_2C_6H_4(p\text{-}CH_3)$ | $CH_2C_6H_4(p\text{-}CH_3)$ |
| A-33 | $C_6H_4(p\text{-}CH_3)$ | $CH_2C_6H_4(p\text{-}CH_3)$ | $CH_2C_6H_4(p\text{-}CH_3)$ |
| A-34 | $C_6H_4(p\text{-}CH_3)$ | $CH_2C_6H_4(p\text{-}CH_3)$ | $CH_2Ph$ |
| A-35 | $C_6H_4(p\text{-}Cl)$ | $CH_2Ph$ | $CH_2Ph$ |
| A-36 | $C_6H_4(p\text{-}SCH_3)$ | $CH_2Ph$ | $CH_2Ph$ |
| A-37 | $C_6H_4(p\text{-}SO_2CH_3)$ | $CH_2Ph$ | $CH_2Ph$ |
| A-38 | $C_6H_4(p\text{-}C_6H_5)$ | $CH_2Ph$ | $CH_2Ph$ |
| A-39 | $cC_5H_{11}$ | $CH_2Ph$ | $CH_2Ph$ |
| A-40 | $cC_5H_{11}$ | $cC_5H_{11}$ | $CH_2Ph$ |
| A-41 | Ph | 4-pyridyl | $CH_2Ph$ |
| A-42 | 2-pyridyl | $CH_2Ph$ | $CH_2Ph$ |
| A-43 | Ph | $CH_2Ph$ | 2-pyridyl |
| A-44 | $CH_2Ph$ | $CH_2Ph$ | 4-pyridyl |
| A-45 | Ph | $CH_2Ph$ | $CH_2\text{-}(3\text{-indorenyl})$ |
| A-46 | Ph | $CH_2Ph$ | $CH_2\text{-}(2\text{-naphtyl})$ |
| A-47 | Ph | $CH_2CH_2Ph$ | $CH_2\text{-}(2\text{-naphtyl})$ |
| A-48 | $CH_2Ph$ | $CH_2Ph$ | $CH_2\text{-}(2\text{-naphtyl})$ |
| A-49 | $CH_2Ph$ | H | $CH_2C_6H_4(p\text{-}Cl)$ |
| A-50 | Ph | H | $CH_2Ph$ |
| A-51 | $CH_2Ph$ | H | Ph |
| A-52 | $C_6H_4(p\text{-}CH_3)$ | H | $CH_2Ph$ |
| A-53 | Ph | H | Ph |
| A-54 | $CH_2Ph$ | H | $CH_2C_6H_4(p\text{-}CH_3)$ |
| A-55 | Ph | $CH_2Ph$ | $n\text{-}C_4H_9$ |
| A-56 | $n\text{-}C_4H_9$ | H | $CH_2Ph$ |
| A-57 | H | H | $CH_2Ph$ |
| A-58 | $CH_3$ | H | $CH_2Ph$ |
| A-59 | $CH_3$ | $CH_3$ | $CH_2Ph$ |
| A-60 | H | H | Ph |
| A-61 | $CH_3$ | H | Ph |
| A-62 | $CH_3$ | $CH_3$ | Ph |
| A-63 | H | H | $CH_3$ |
| A-64 | H | H | $n\text{-}C_4H_9$ |
| A-65 | Ph | $CH_2Ph$ | Cl |

-continued

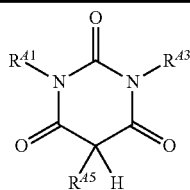

| Compound No. | $R^{A1}$ | $R^{A3}$ | $R^{A5}$ |
|---|---|---|---|
| A-66 | Ph | Ph | OH |
| A-67 | H | H | $CH_2C_6H_4$(p-OH) |
| A-68 | $CH_3$ | $CH_3$ | $CH_2C_6H_4$(p-OH) |
| A-69 | H | H | $CH_2C_6H_3$(3,4-OH) |
| A-70 | H | H | $CH_2C_6H_4$(p-$SO_3$Na) |
| A-71 | H | H | $CH_2C_6H_3$(2,4-$SO_3$Na) |
| A-72 | H | H | $CH_2C_6H_4$(p-COOH) |
| A-73 | H | H | $CH_2C_6H_4$(p-COONa) |
| A-74 | H | H | $CH_2C_6H_4$(p-$SO_2NH_2$) |
| A-75 | H | H | *-CH₂-C₆H₃(3-$NH_4Cl$, 4-Cl) |
| A-76 | H | H | *-CH₂-C₆H₃(3-$N(CH_3)_4Cl$, 4-$OCH_3$) |
| A-77 | H | H | *-CH₂-C₆H₄(4-$CON(CH_2CH_2OH)_2$) |
| A-78 | H | H | *-CH₂-C₆H₄(4-$SO_2NHCH_2CH_2SO_3Na$) |
| A-79 | H | H | *-CH₂-C₆H₄(4-$SO_2NHCH_2CH_2OCH_2CH_2OH$) |
| A-80 | H | H | *-CH₂-C₆H₃(3,4-$OCH_2CH_2OCH_3$) |
| A-81 | H | $C_6H_4$(m-$SO_2NH_2$) | $CH_2C_6H_4$(p-$SO_2NH_2$) |
| A-82 | $CH_2CH_2OCH_2CH_2OCH_3$ | $CH_2CH_2OCH_2CH_2OCH_3$ | $CH_2$Ph |
| A-83 | H | $CH_2SO_3Na$ | $CH_2$Ph |
| A-84 | H | H | $CH_2C_6H_3$(3,4-F) |
| A-85 | H | $C_6H_3$(3,4-F) | $CH_2C_6H_3$(2,4-$SO_3$Na) |
| A-86 | H | *-CH₂CH₂-O-C(O)-NH-CH₂CH₂CH₂-$Si(OC_2H_5)_3$ | $CH_2$Ph |
| A-87 | H | *-CH₂CH₂-O-C(O)-NH-CH₂CH₂CH₂-$Si(OC_2H_5)_3$ | $CH_2C_6H_3$(2,4-$SO_3$Na) |
| A-88 | H | $CH_2CH_2CH_2SO_3Na$ | $CH_2C_6H_4$(p-CHO) |
| A-89 | H | $CH_2CH_2CH_2SO_3Na$ | $CH_2C_6H_4$(p-$COCH_3$) |
| A-90 | H | $CH_2C_6H_4$(p-CHO) | $CH_2C_6H_3$(2,4-$SO_3$Na) |
| A-91 | H | $CH_2C_6H_4$(p-$B(OH)_2$) | $CH_2C_6H_3$(2,4-$SO_3$Na) |

-continued

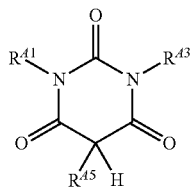

| Compound No. | $R^{A1}$ | $R^{A3}$ | $R^{A5}$ |
|---|---|---|---|
| A-92 | H | H | $CH_2C_6H_3(3,4\text{-}F)$ |
| A-93 | H | $CH_2Ph$ | ![structure: *-CH2-C6H4-O-C(=O)-NH-CH2CH2CH2-Si(OC2H5)3] |
| A-94 | Ph | $CH_2Ph$ | $CH_2C_6H_4(p\text{-}CHO)$ |
| A-95 | Ph | $CH_2Ph$ | $CH_2C_6H_4(p\text{-}COCH_3)$ |
| A-96 | Ph | $CH_2Ph$ | $CH_2C_6H_4(p\text{-}CH(OCH_3)_2)$ |
| A-97 | Ph | $CH_2Ph$ | $CH_2C_6H_4(p\text{-}B(OH)_2)$ |
| A-98 | Ph | $CH_2Ph$ | ![structure: *-CH2-C6H4-Bpin (pinacol boronate)] |
| A-99 | Ph | $CH_2Ph$ | ![structure: *-CH2-isobenzofuran with 1,1-di(OC2H5)] |
| A-100 | H | $CH_2C_6H_4(p\text{-}CHO)$ | $CH_3$ |
| A-101 | H | $CH_2C_6H_4(p\text{-}B(OH)_2)$ | $CH_3$ |
| A-102 | H | $CH_2C_6H_3(3,4\text{-}F)$ | $CH_3$ |
| A-103 | H | H | CHO |
| A-104 | H | $CH_2C_6H_4(p\text{-}SO_3Na)$ | CHO |
| A-105 | H | $CH_2C_6H_4(p\text{-}CHO)$ | CHO |
| A-106 | $CH_3$ | $CH_3$ | $n\text{-}C_4H_9$ |
| A-107 | $CH_2CH_2SO_3Na$ | $CH_2CH_2SO_3Na$ | $n\text{-}C_4H_9$ |
| A-108 | H | $CH_2Ph$ | $CH_2Ph$ |
| A-109 | cHex | cHex | $n\text{-}C_4H_9$ |
| A-110 | cHex | cHex | $cC_5H_{11}$ |
| A-111 | Ph | Ph | $i\text{-}C_3H_7$ |
| A-112 | Ph | Ph | $C_2H_5$ |
| A-113 | Ph | $CH_2Ph$ | $CH_3$ |
| A-114 | H | $CH_2CH_2OCONHPh$ | $CH_2Ph$ |
| A-115 | $CH_2COOCH_3$ | $CH_2COOCH_3$ | $CH_2Ph$ |

A-201
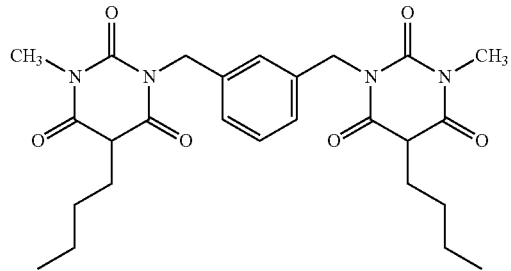
A-202
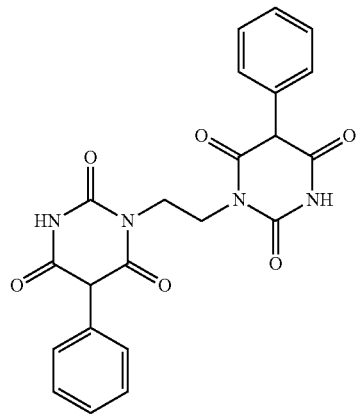
A-203
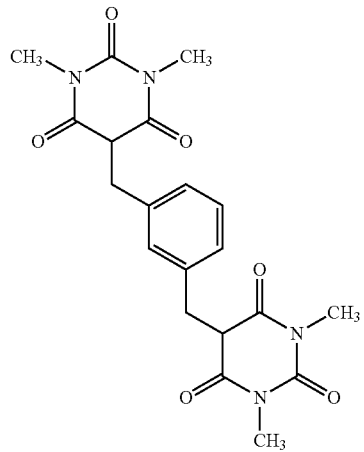
A-204
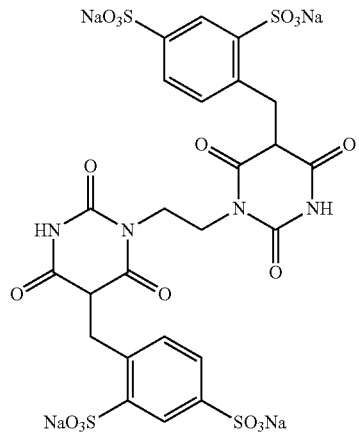

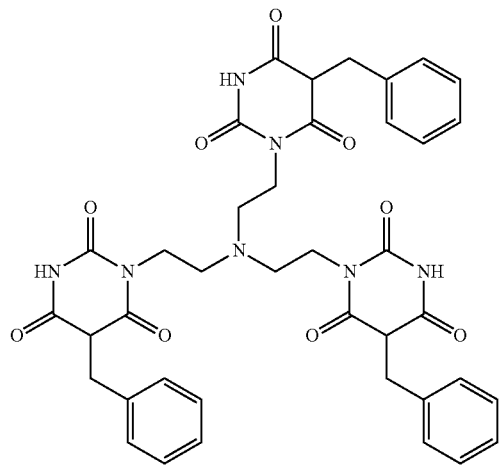
A-205
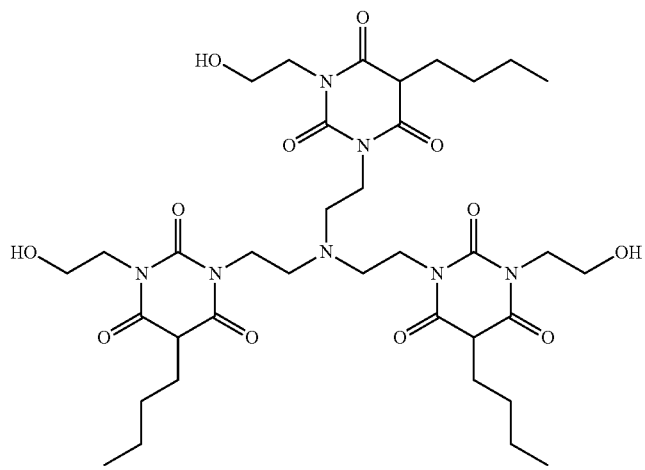
A-206
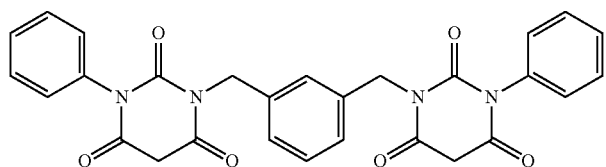
A-207
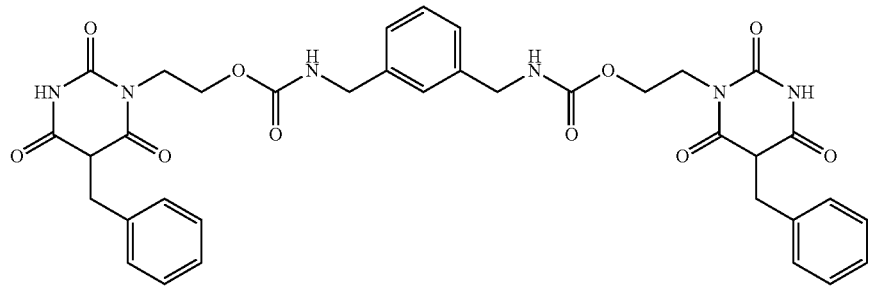
A-208

-continued

A-209
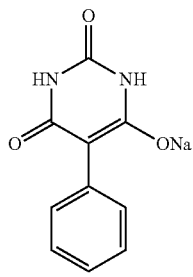

A-210
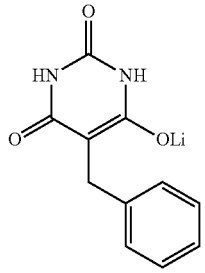

A-211
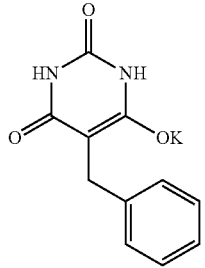

A-212
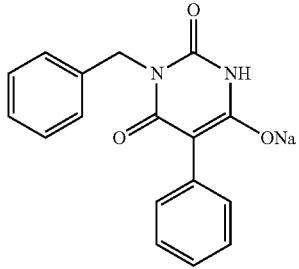

A-213
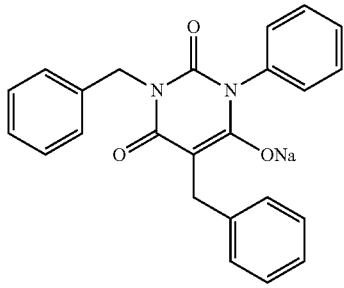

The compound represented by formula (A) is known to be able to synthesize by a method of synthesizing barbituric acid, based on condensation of a urea derivative with a malonic acid derivative. The barbituric acid having two substituents on the N atom may be obtained, by heating a N,N'-disubstituted urea with malonyl chloride, or by heating with a combination of malonic acid and an activator, such as acetic anhydride. For example, methods described, for example, in: Journal of the American Chemical Society. vol. 61, p. 1015 (1939), Journal of Medicinal Chemistry, vol. 54, p. 2409 (2011), Tetrahedron Letters, vol. 40, p. 8029 (1999), and WO2007/150011, can be preferably used.

In addition, both unsubstituted and substituted malonic acids are acceptable for use in the condensation. By using malonic acid having any of correspondent substituents for $R^{45}$ so as to configure barbituric acid, the compounds represented by formula (A) can be synthesized. Moreover, if unsubstituted malonic acid and a urea derivative are condensed, a barbituric acid in which the 5-position is unsubstituted can be obtained. Thus, by modifying the resultant compound, the compound represented by formula (A) may be synthesized.

As a method of modification on the 5-position, a nucleophilic substitution reaction with alkyl halide or the like, or an addition reaction such as a Michael addition reaction can be applied to. Moreover, a method can also be preferably applied to, in which an alkylidene or arylidene compound is formed by allowing dehydrating condensation with an aldehyde or ketone, and then a double bond is reduced. For example, the method of reduction with zinc is described in "Tetrahedron Letters, vol. 44, p. 2203 (2003)", the reduction method by catalytic reduction is described in "Tetrahedron Letters, vol. 42, p. 4103 (2001)" and "Journal of the American Chemical Society, vol. 119, p. 12849 (1997)," and the method of reduction with $NaBH_4$ is described in "Tetrahedron Letters, vol. 28, p. 4173 (1987)", or the like, respectively. All of these are synthetic methods that can be preferably applied thereto when the compound has the aralkyl group or the cycloalkyl group at the 5-position.

The synthetic method of the compound represented by formula (A) is not limited to the above.

The content of the compound represented by formula (A) in the polarizing plate protective film is not particularly limited, and it is preferably 0.1 to 20 parts by mass, more preferably 0.2 to 15 parts by mass, and particularly preferably 0.3 to 10 parts by mass, to 100 parts by mass of the resin constituting the polarizing plate protective film.

The water vapor transmission rate can be effectively lowered, and occurrence of haze can be inhibited, by setting the addition amount of the compound represented by formula (A) to the above range.

(Amide-, Urethane-, Ureide-Based Additives)

In the polarizing plate protective film of the present invention, a compound represented by formula (B-I) or a compound represented by formula (B-II) as mentioned later is also preferably used. The compound represented by formula (B-I) and/or the compound represented by formula (B-II) are/is effective in enhancing hardness of the film and effective in inhibiting deterioration of performance of the polarizer in hygrothermal condition aging, which are preferred. In particular, when the resin constituting the polarizing plate protective film is a cellulose acylate, such a compound is preferably used.

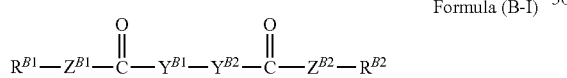

Formula (B-I)

In formula (B-I), $R^{B1}$ and $R^{B2}$ each independently represent an alkyl group having 1 to 20 carbon atoms, or an aryl group having 6 to 20 carbon atoms. $Z^{B1}$ and $Z^{B2}$ each independently represent a single bond, —O—, or —N($R^{Ba}$)—. Herein, $R^{Ba}$ represents a hydrogen atom, or an alkyl group having 1 to 20 carbon atoms. $R^{Ba}$ and $R^{B1}$ or $R^{B2}$ may bond to each other, to form a ring. $X^{B1}$ represents a divalent linking group, and preferable examples include: an alkylene group having 1 to 6 carbon atoms, a cycloalkylene group having 5 to 20 carbon atoms, an arylene group having 6 to 20 carbon atoms, s-triazine-2,4,6-trione-1,3-diyl, or a group in combination therewith. $Y^{B1}$ and $Y^{B2}$ each independently represent —NH— or —O—.

As the alkyl group or the aryl group in $R^{B1}$ and $R^{B2}$, the alkyl group or the aryl group in $R^{A1}$, $R^{A3}$ or $R^{A5}$ in formula (A) is preferred.

Each group of $R^{B1}$, $R^{B2}$, $X^{B1}$, and $R^{Ba}$ may further have a substituent, and specific examples of such a substituent include, in addition to a group of substitutes with which each group of $R^{A1}$, $R^{A3}$ and $R^{A5}$ in formula (A) may be further substituted, a carbamoyloxy group (including an alkylcarbamoyloxy group and an arylcarbamoyloxy group, the number of carbon atoms being preferably 2 to 20, such as N-methylcarbamoyloxy, N,N-dimethylcarbamoyloxy, N-phenylcarbamoyloxy, and N-methyl-N-phenylcarbamoyloxy), a carbamoylamino group (including an alkylcarbamoylamino group and an arylcarbamoylamino group, the number of carbon atoms being preferably 2 to 20, such as N-methylcarbamoylamino, N,N-dimethylcarbamoylamino, N-phenylcarbamoylamino, and N-methyl-N-phenylcarbamoylamino), an alkoxycarbonylamino group (the number of carbon atoms being preferably 2 to 20, such as methoxycarbonylamino, ethoxycarbonylamino, and 2-ethylhexyloxycarbonylamino), and an aryloxycarbonylamino group (the number of carbon atoms being preferably 7 to 20, such as phenoxycarbonylamino and naphthoxycarbonylamino).

As the substituent with which each group of $R^{B1}$, $R^{B2}$, $X^{B1}$, and $R^{Ba}$ may be substituted, among these, preference is given to an alkyl group, a cycloalkyl group, an aryl group, an alkoxy group, an aryloxy group, a hydroxy group, a cyano group, a carbamoyl group, an acylamino group, an acyl group, an acyloxy group, a carbamoyloxy group, a carbamoylamino group, an alkoxycarbonylamino group, or an aryloxycarbonylamino group.

In particular, when $R^{B1}$ or $R^{B2}$ is an alkyl group, preference is given to an alkyl group substituted with a carbamoyl group, an acylamino group, an acyl group, an acyloxy group, a carbamoyloxy group, a carbamoylamino group, an alkoxycarbonylamino group, or an aryloxycarbonylamino group.

$X^{B1}$ is preferably a group represented by any one of formulae X-1 to X-8.

In the formulae, an asterisk (*) represents a position in which bonding with $Y^{B1}$ or $Y^{B2}$ in —$Y^{B2}$—C(=O)— or —$Y^{B1}$—C(=O)— is formed.

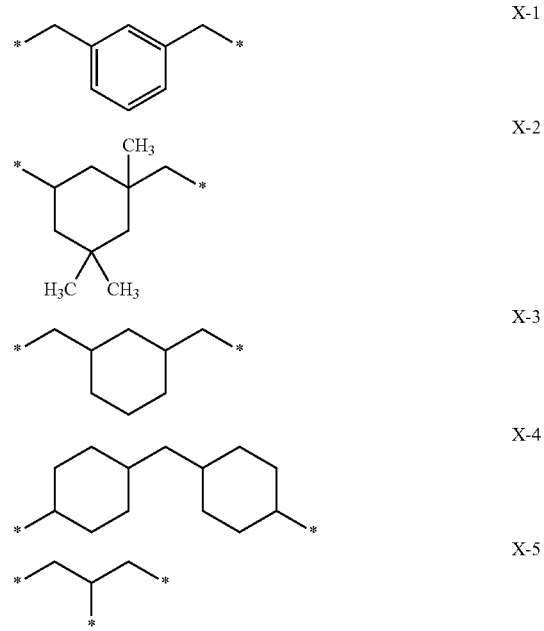

-continued

X-6 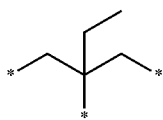

X-7

X-8

$R^{Ba}$ is preferably a hydrogen atom, or an alkyl group having 1 to 8 carbon atoms, more preferably a hydrogen atom, or an alkyl group having 1 to 3 carbon atoms, and further preferably a hydrogen atom.

As the ring to be formed by bonding of $R^{Ba}$ and $R^{B1}$ or $R^{B2}$ to each other, a 5- or 6-membered ring is preferred, and specific examples include a pyrrolidine ring, a piperidine ring, a piperazine ring, a morpholine ring, and a thiomorpholine ring.

$Y^{B1}$ and $Y^{B2}$ each are preferably —NH—.

$Z^{B1}$ and $Z^{B2}$ each are preferably —O—.

Specific examples of the compound represented by formula (B-I) are shown below, but the present invention is not limited to these.

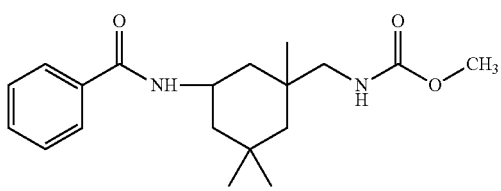
B-1

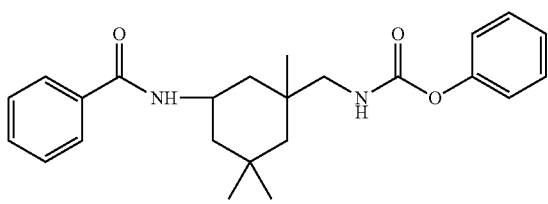
B-2

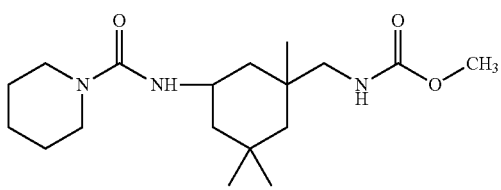
B-3

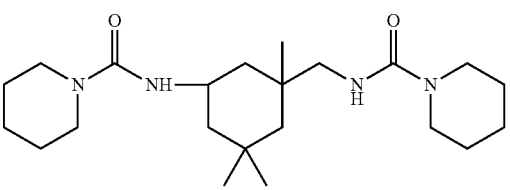
B-4

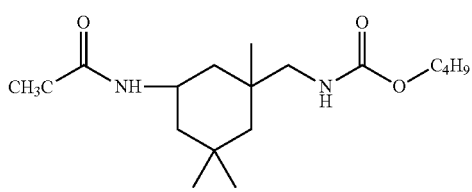
B-5

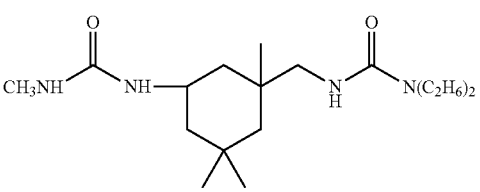
B-6

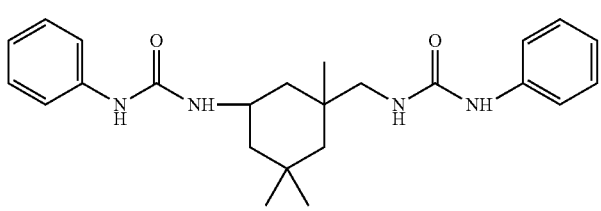
B-7

B-8
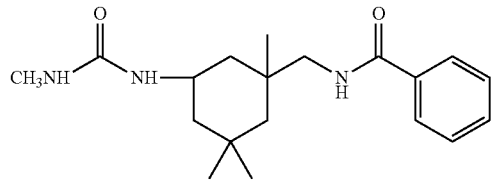
B-9
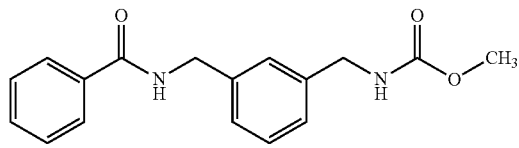
B-10
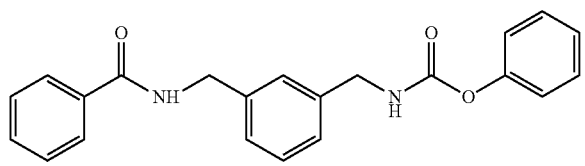
B-11
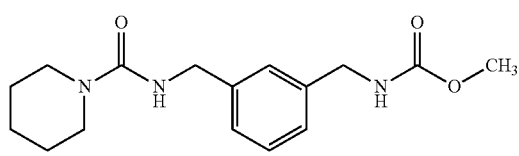
B-12
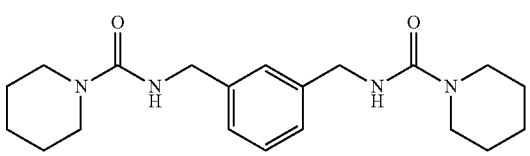
B-13
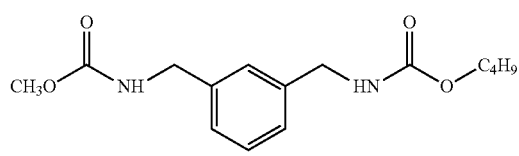
B-14
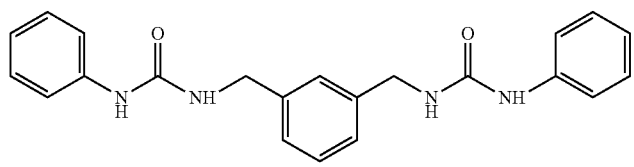
B-15
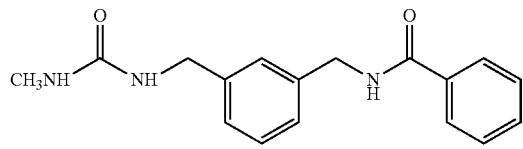
B-16
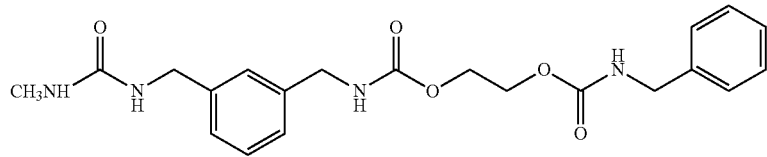
B-17
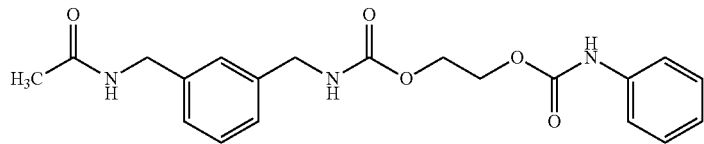

-continued
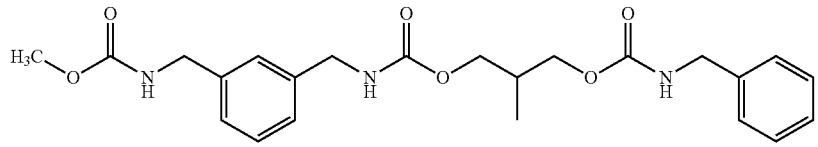
B-19
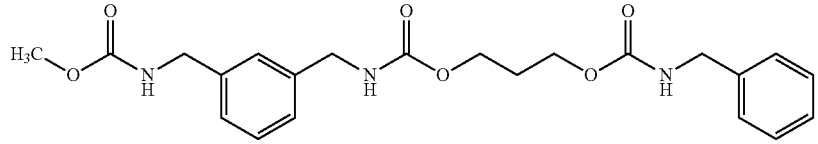
B-20
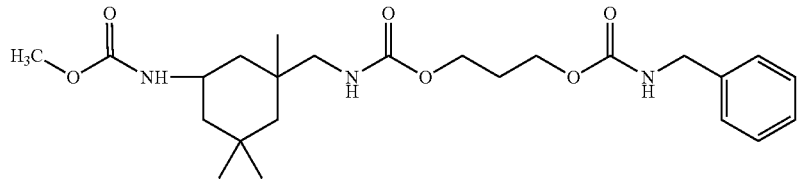
B-21
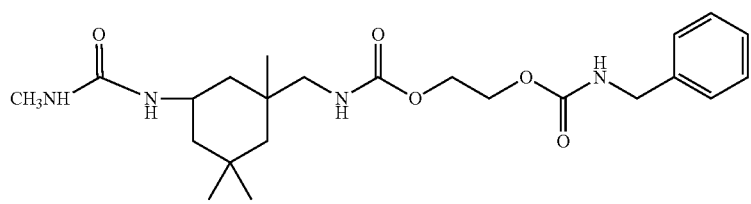
B-22
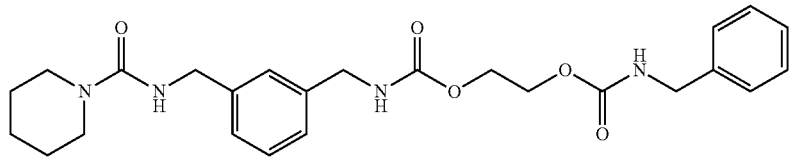
B-23
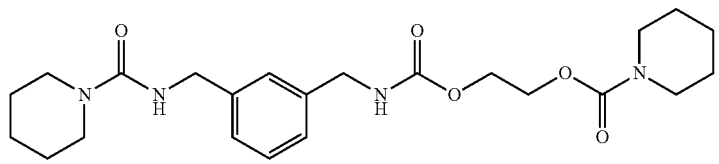
B-24
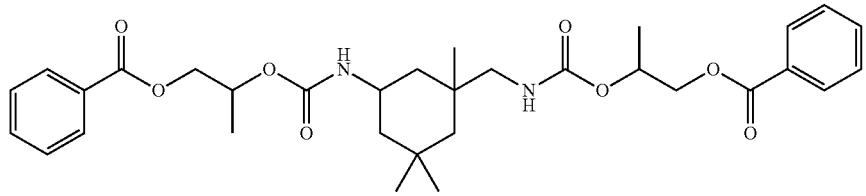
B-25
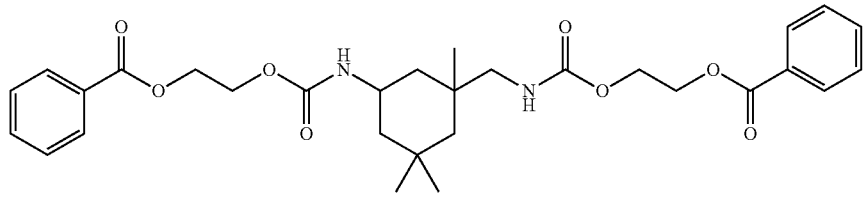
B-26

-continued
B-27
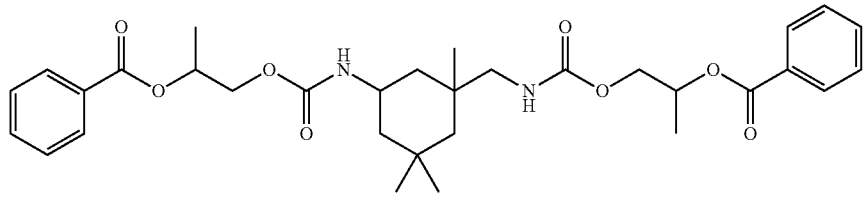
B-28
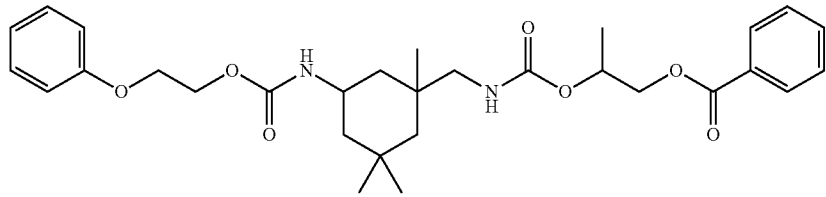
B-29
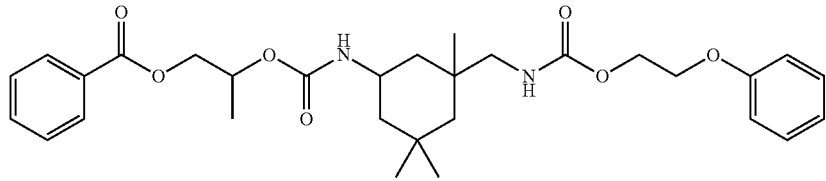
B-30
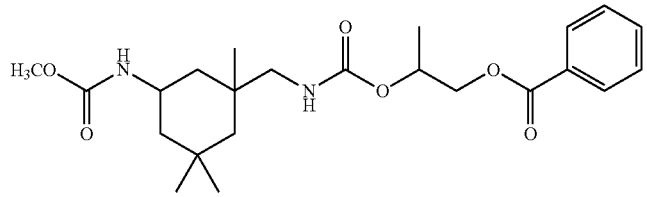
B-31
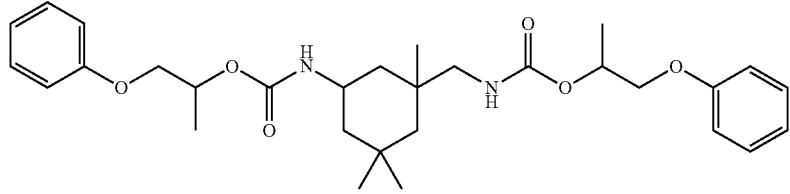
B-32
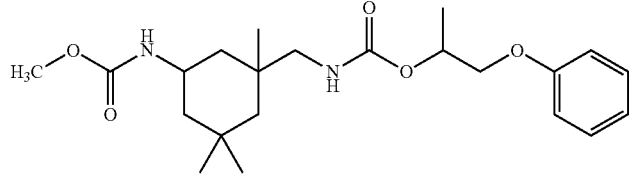
B-33
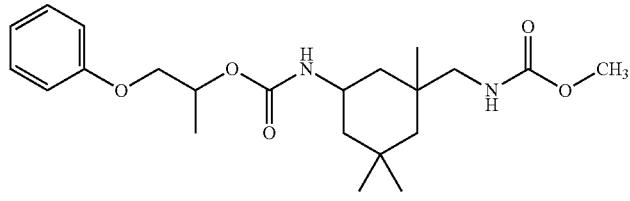
B-34
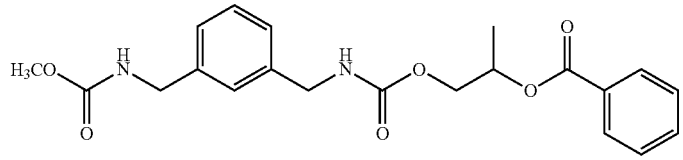

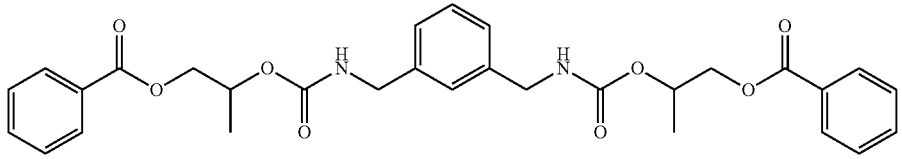
B-35
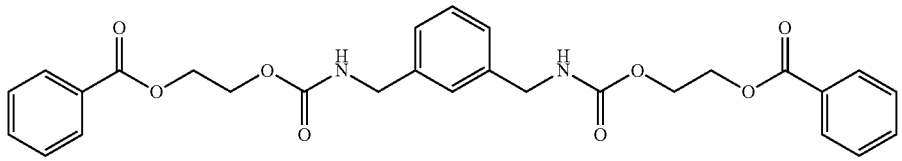
B-36
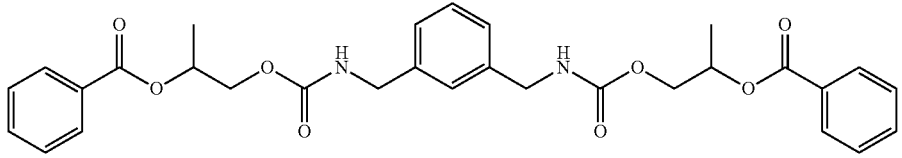
B-37
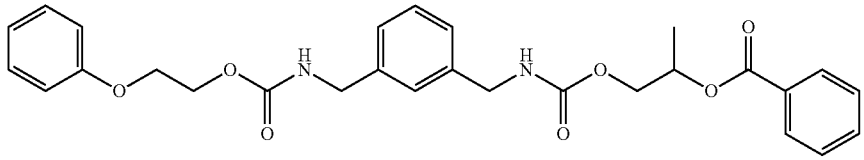
B-38
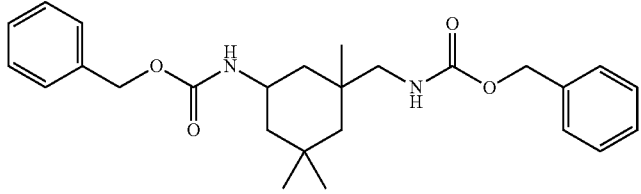
B-39
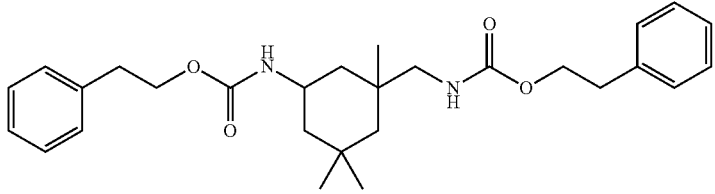
B-40
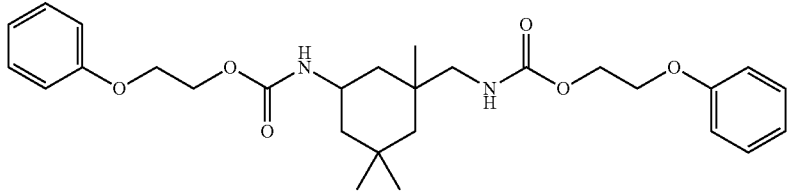
B-41
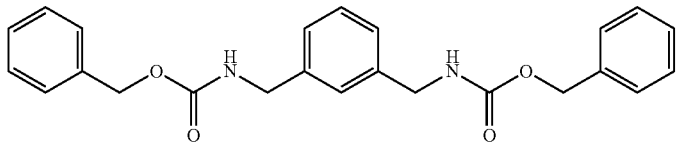
B-42
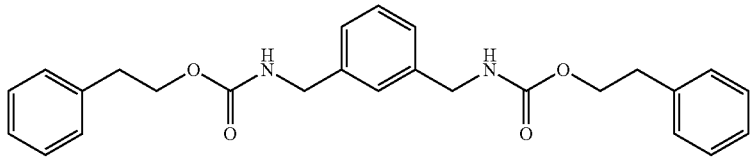
B-43

B-44
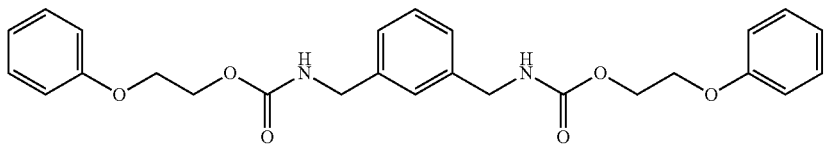
B-45
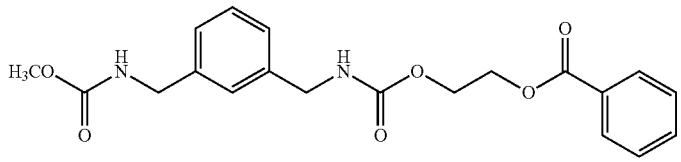
B-46
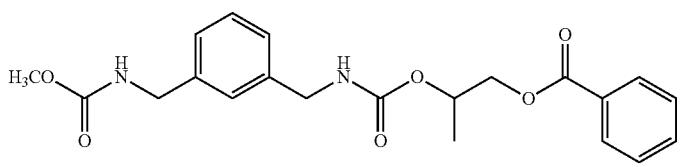
B-47
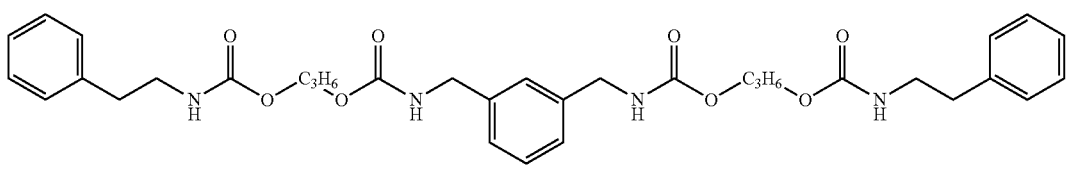
B-48
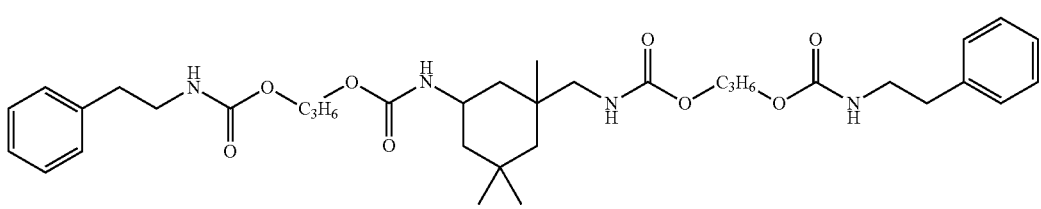
B-49
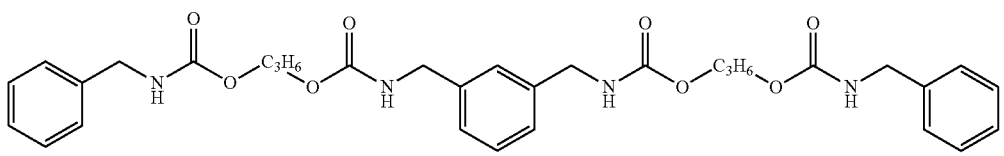
B-50
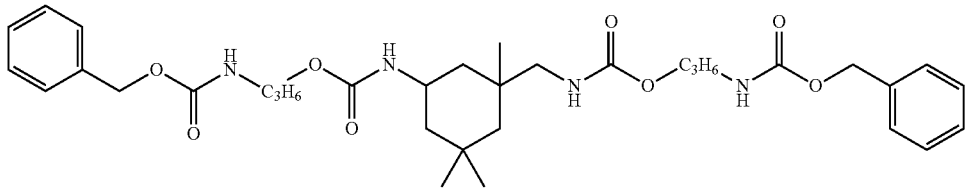
B-51
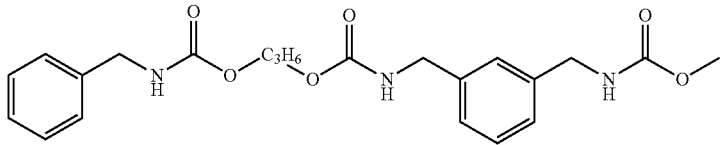
B-52
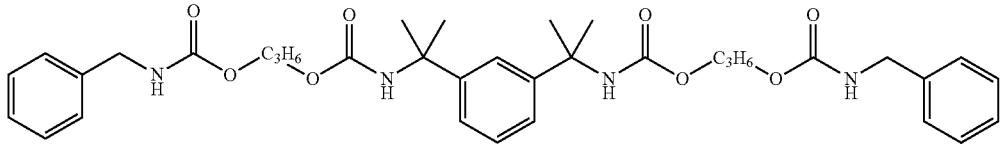

-continued
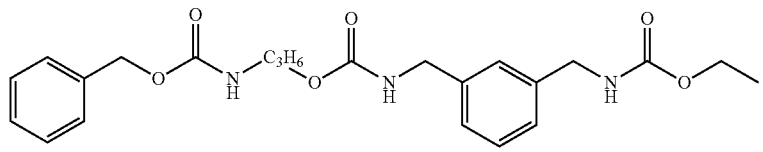
B-53
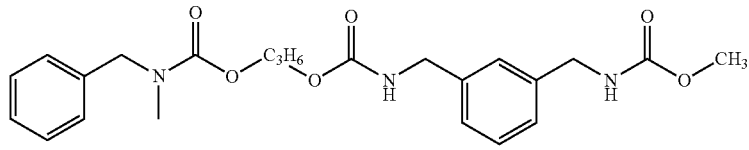
B-54
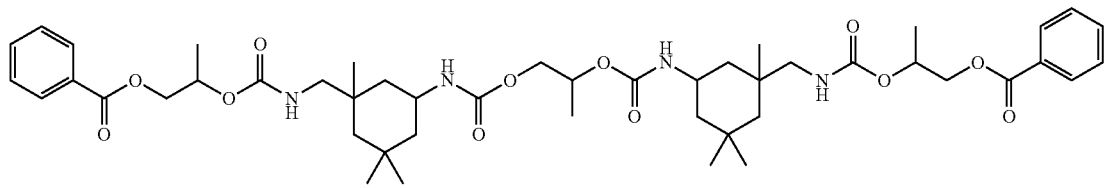
B-55
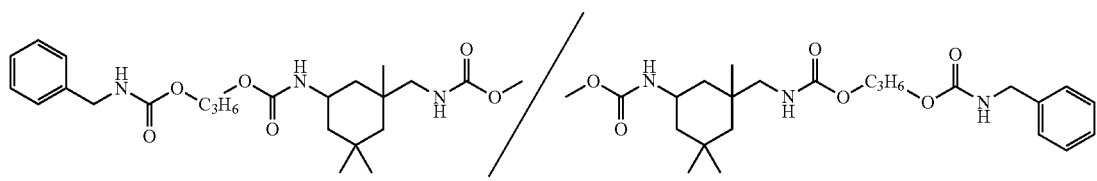
B-56 (Mixture)
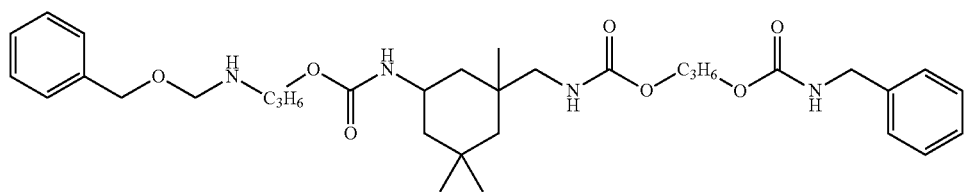
B-57 (Mixture)
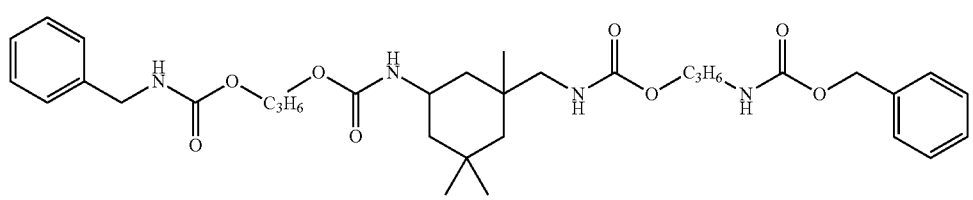
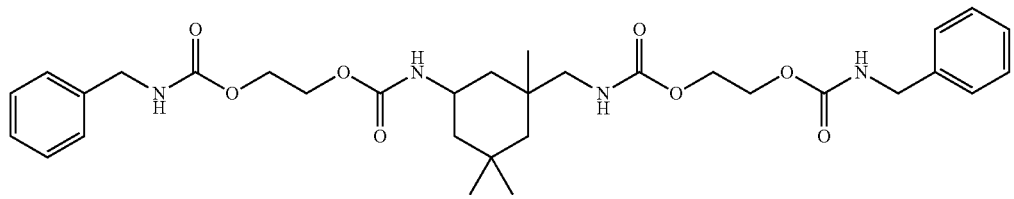
B-58
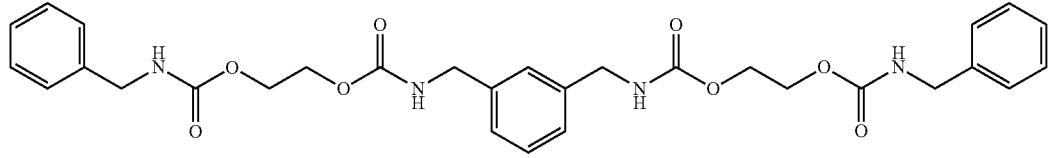
B-59

-continued
B-60
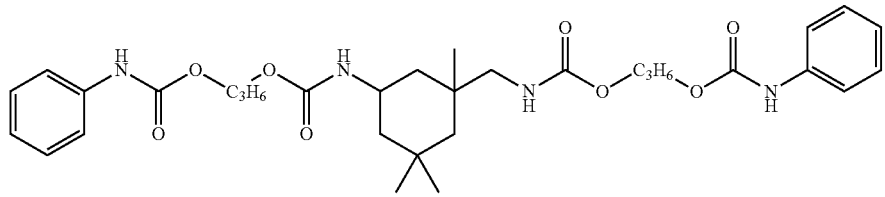
B-61
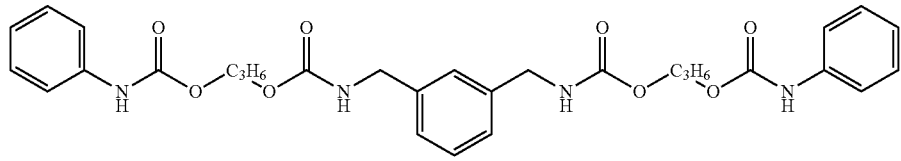
B-62
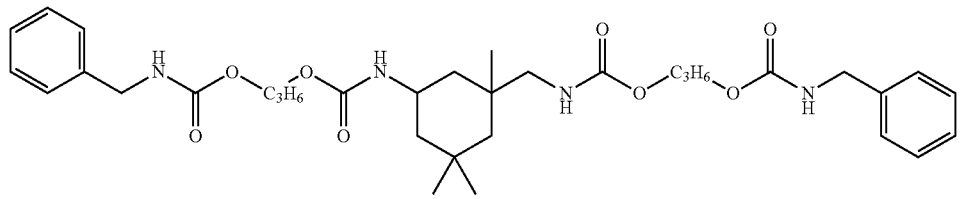
B-63
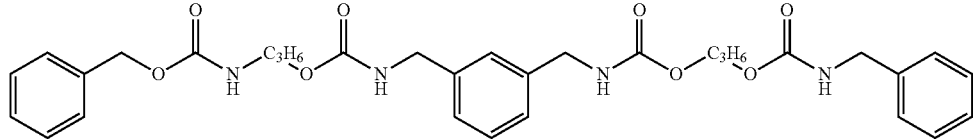
B-64
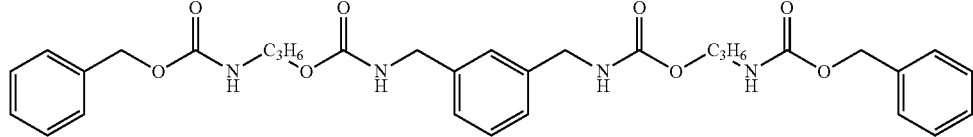
B-65
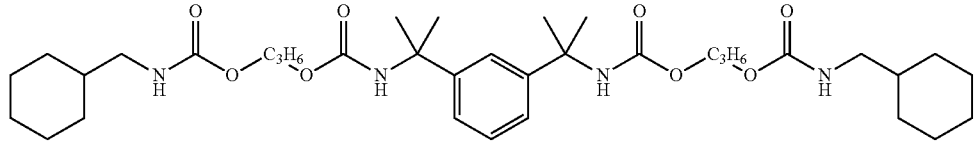
B-66
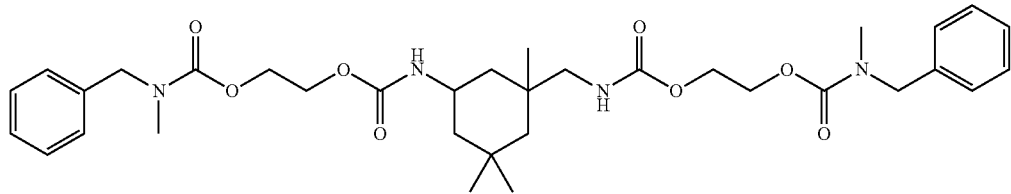
B-67
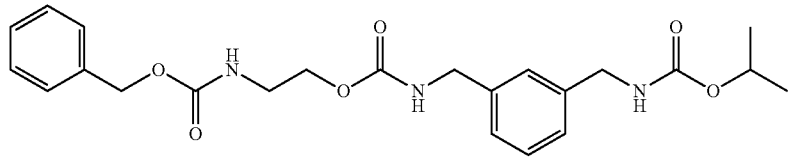
B-68
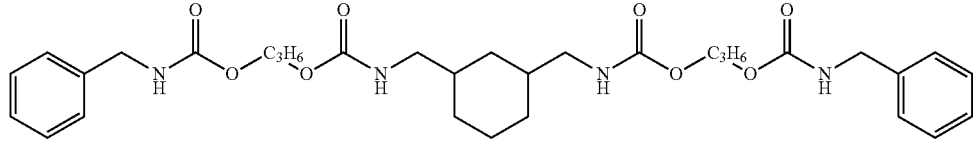

B-69
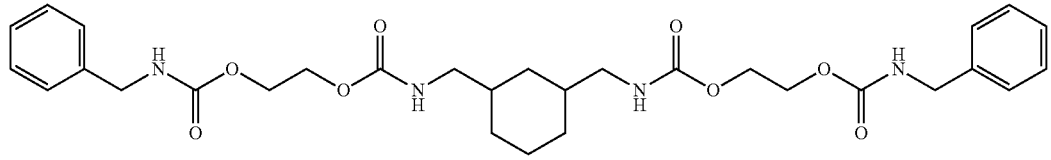
B-70
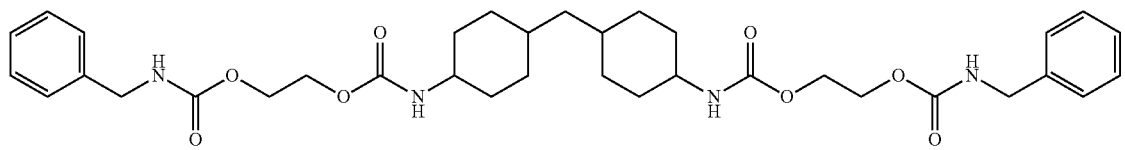
B-71
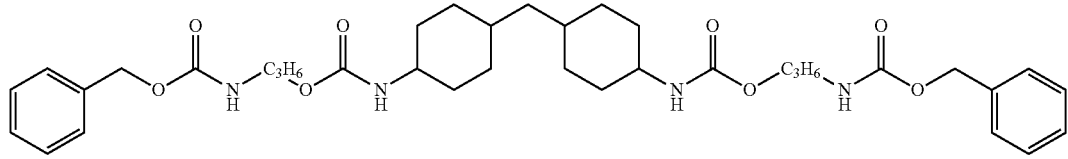
B-72
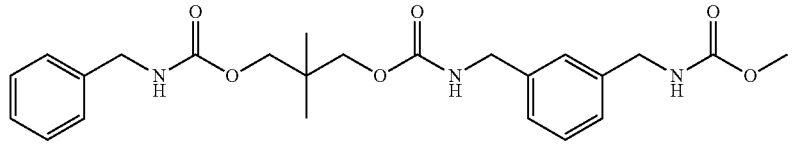
B-73
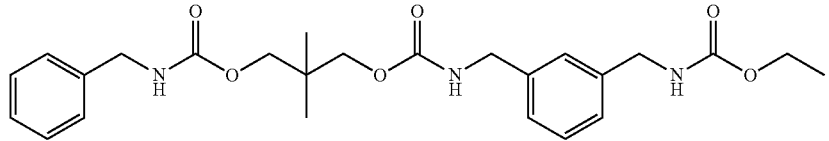
B-74
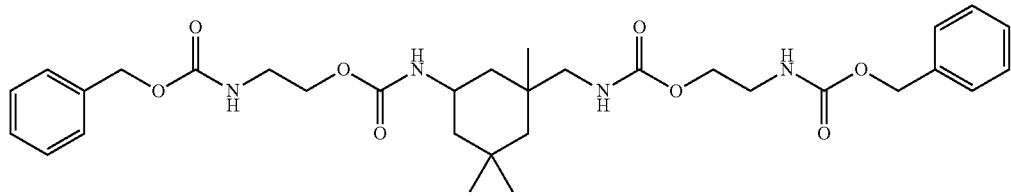
B-75
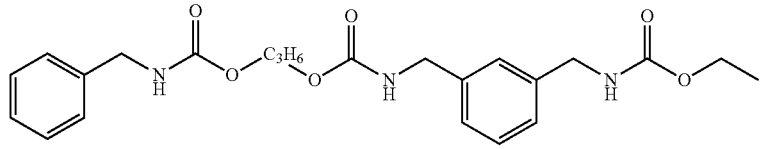
B-76
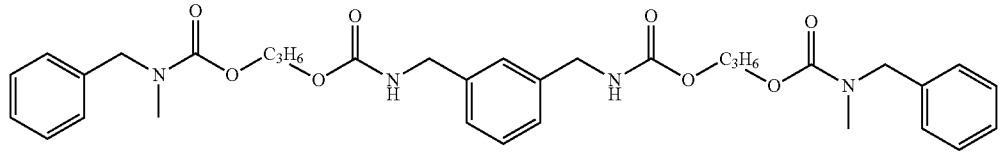
B-77 (Mixture)
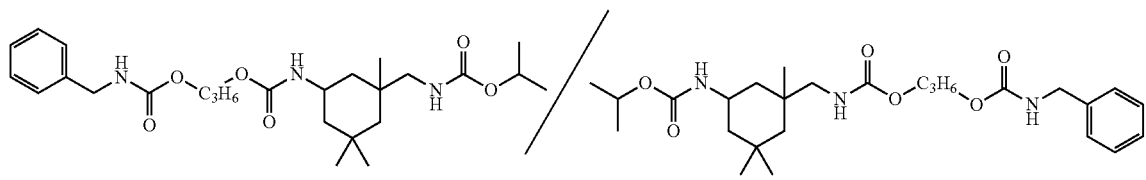

B-78 (Mixture)
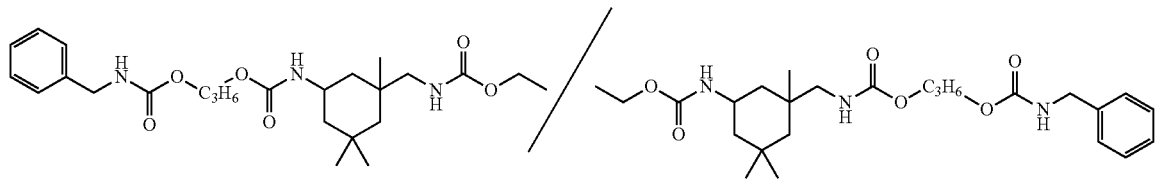
B-79 (Mixture)
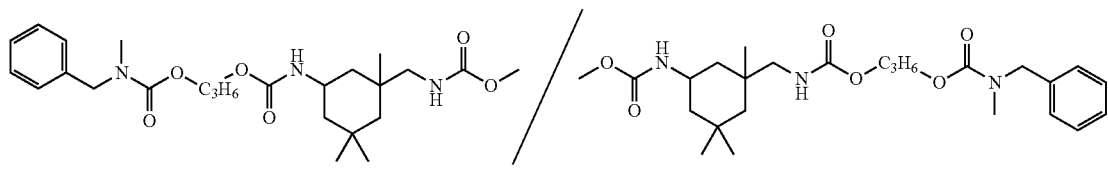
B-80 (Mixture)
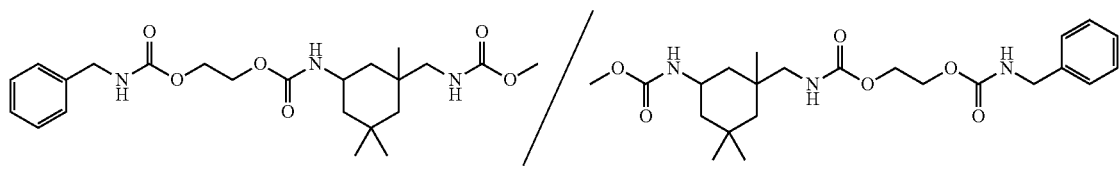
B-81
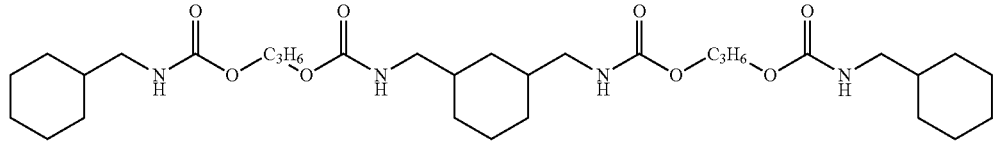
B-82
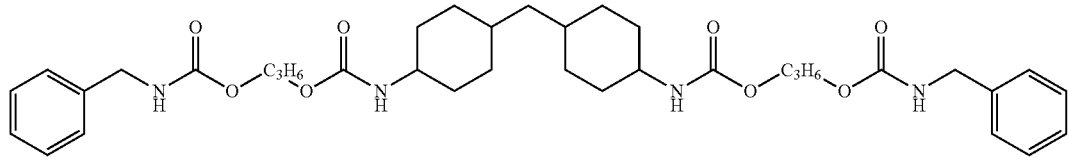
B-83
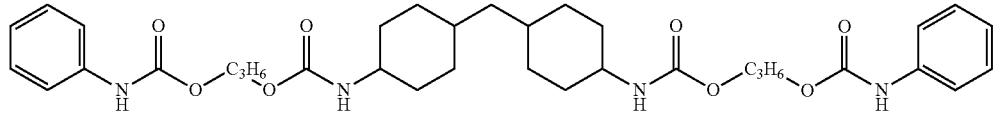
B-84
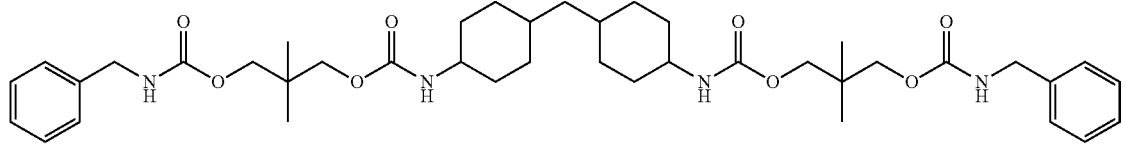
B-85
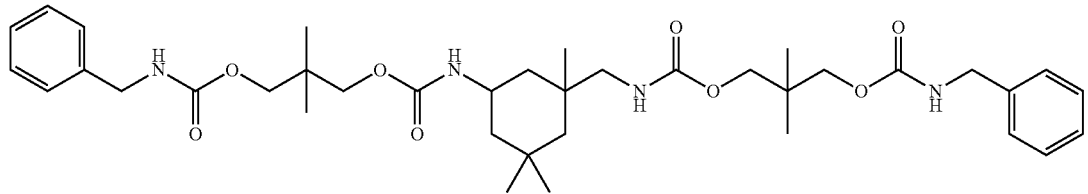
B-86
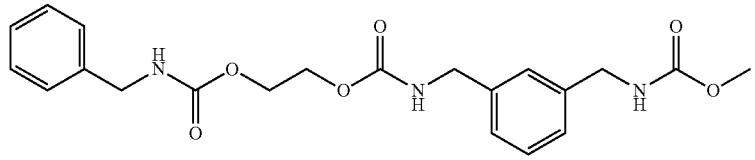

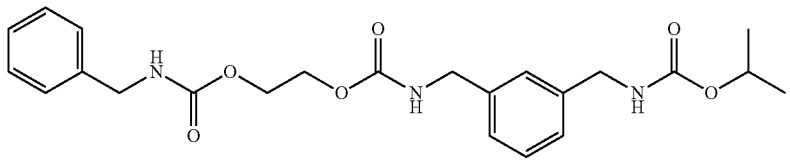
B-87
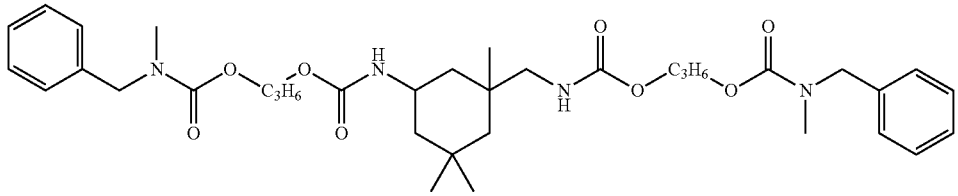
B-88
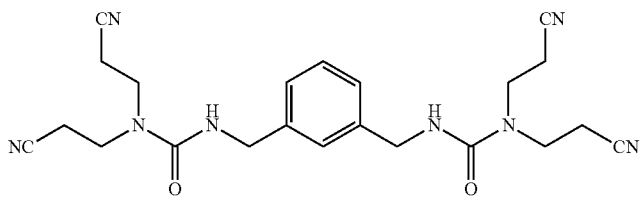
B-89
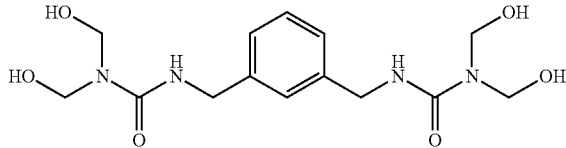
B-90
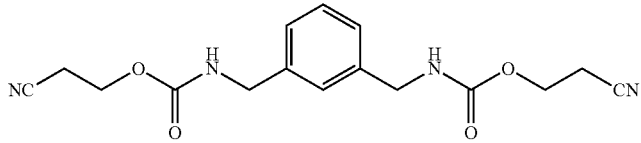
B-91
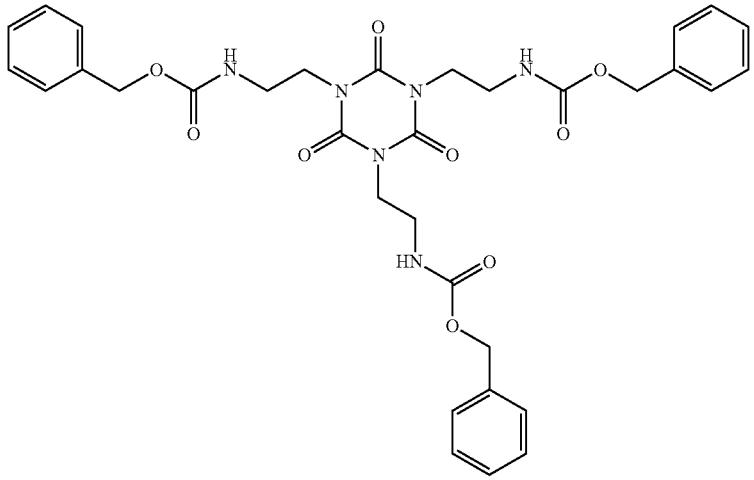
B-92
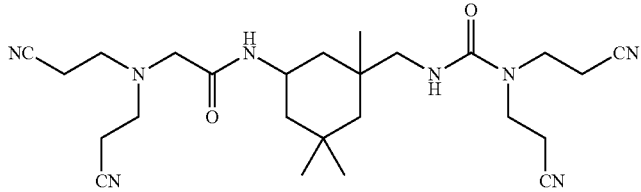
B-93

B-94
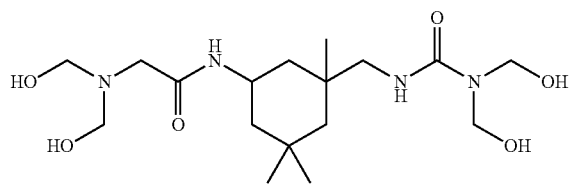
B-95
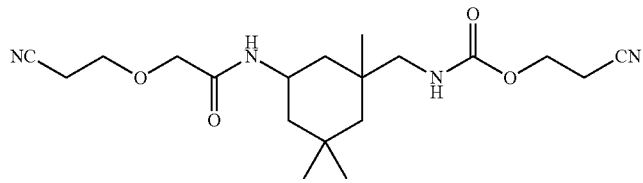
B-96
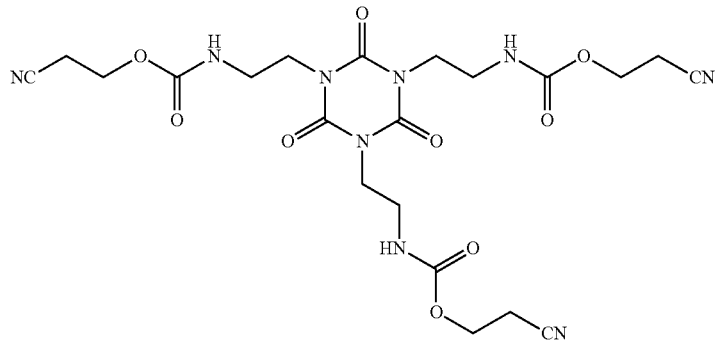
B-97
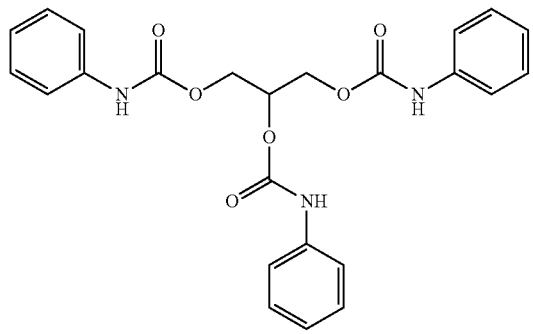
B-98
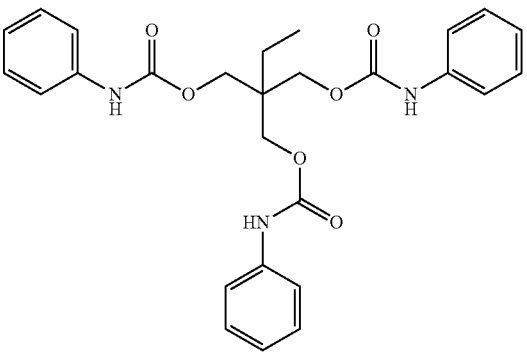
B-100
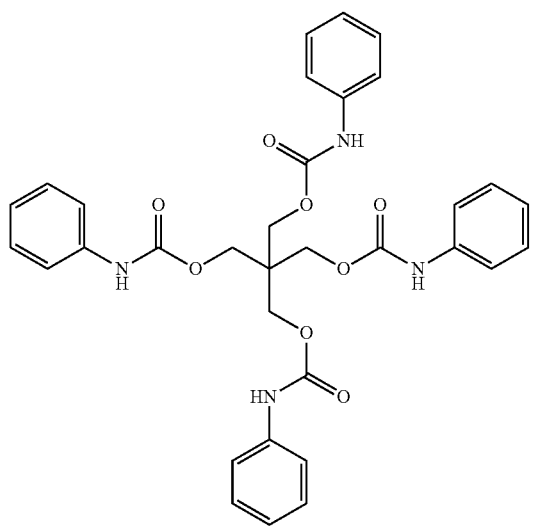
B-99
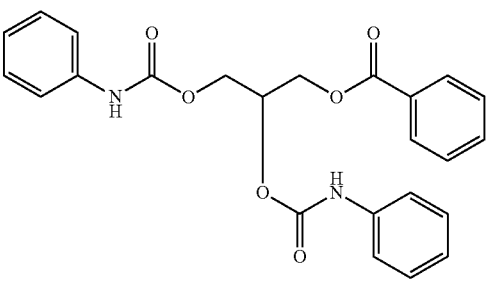

B-101
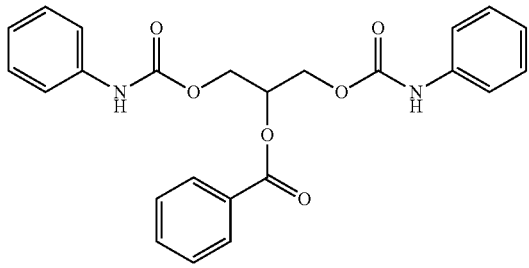
B-102
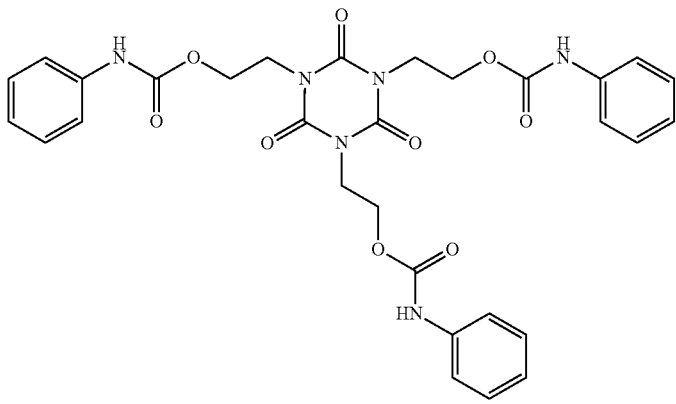
B-103
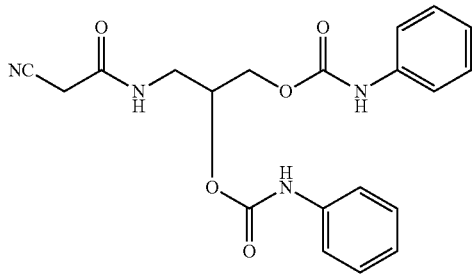
B-104
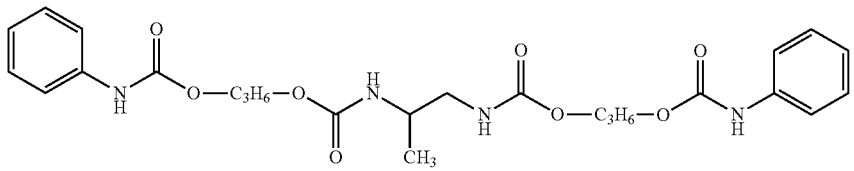
B-105
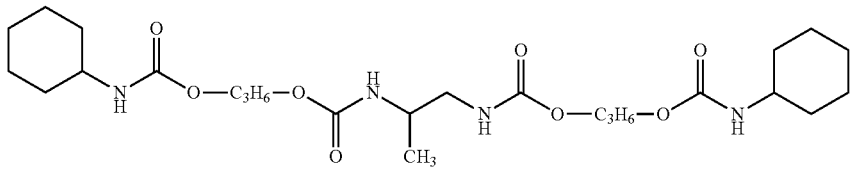
B-106
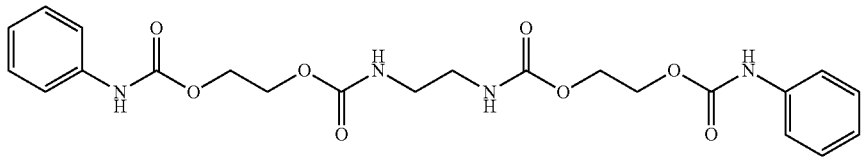

-continued

B-107
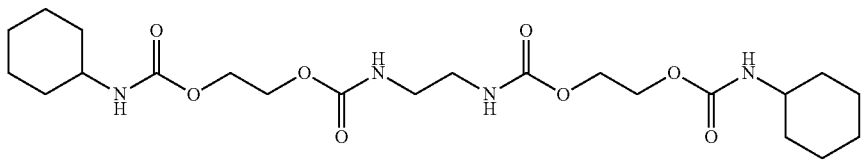

B-108
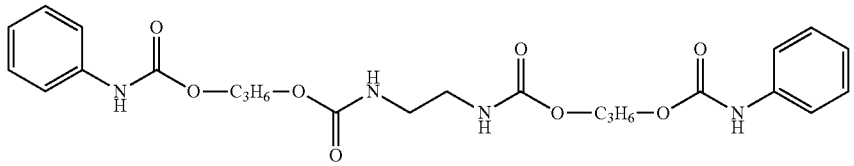

B-109
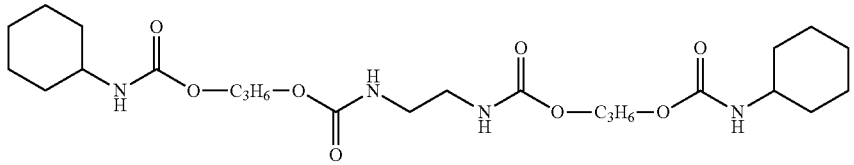

B-110
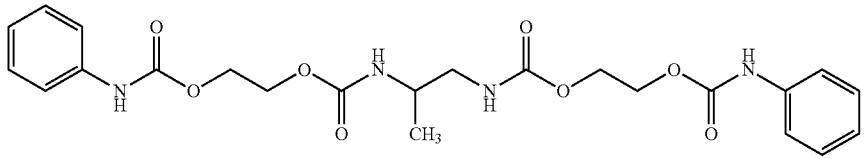

B-111
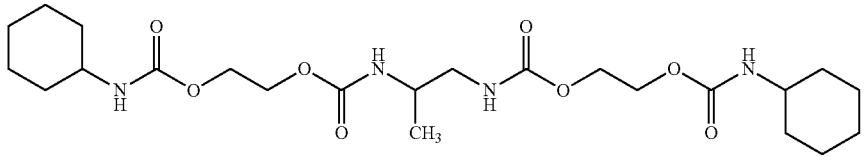

B-112
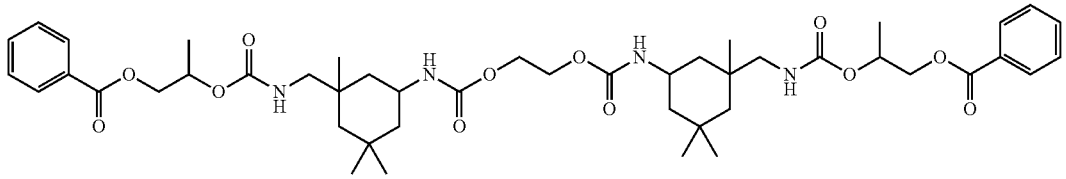

The compound represented by formula (B-I) can be produced via known methods.

For example, the compound can be obtained, for example, via: an addition reaction of an alcohol to an alkyl- or aryl-isocyanate; or a condensation reaction between an amine and a carbonate.

Upon the addition reaction of an alcohol to an alkyl- or aryl-isocyanate, a catalyst is also preferably used. As such a catalyst, any of conventional urethanization catalyst can be used, such as an amine; an organometallic acid salt or a metal chelate compound of zinc, tin or the like; and an organometallic compound of zinc, tin, bismuth or the like. As the urethanization catalyst, for example, dibutyl-tin dilaurate, dibutyl-tin diacetate or the like is preferably used.

Moreover, the compound can also be synthesized via acylation of a dihydric alcohol or a divalent amine compound.

In the present invention, in addition to the compound represented by formula (B-I), a compound represented by formula (B-II) is also preferred.

Formula (B-II)
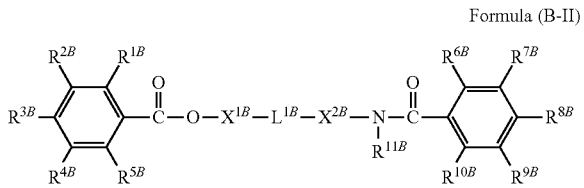

In formula (B-II), $R^{1B}$ to $R^{7B}$ and $R^{9B}$ to $R^{11B}$ each independently represent a hydrogen atom or a substituent, $R^{8B}$ represents a hydrogen atom or a non-conjugated substituent, $X^{1B}$ and $X^{2B}$ each independently represent a single bond or an aliphatic linking group, and $L^{1B}$ represents a single bond, —N($R^{12B}$)— or —C($R^{13B}$)($R^{14B}$)—. Herein, $R^{12B}$ to $R^{14B}$ each independently represent a hydrogen atom or a substituent.

The compound represented by formula (B-II) is the compound represented by formula (I) described in JP-A-2013-127058, and reference to $R^{1B}$ to $R^{14B}$, $X^{1B}$, $X^{2B}$, and $L^{1B}$ as described above can be replaced by reference to $R^1$ to $R^{14}$, $X^1$, $X^2$, and L corresponding thereto. After performing this replacement of reading, JP-A-2013-127058, paragraphs 0094 to 0116, can be preferably incorporated by reference herein.

In a manner similar to JP-A-2013-127058, exemplified compounds 1 to 31 described in paragraphs 0112 to 0115 are preferred compounds also in the present invention.

The content of the compound represented by formula (B-I) or (B-II) in the polarizing plate protective film is not particularly limited, and the content is preferably 2 to 20 parts by mass, and more preferably 5 to 15 parts by mass, to 100 parts by mass of the resin constituting the polarizing plate protective film.

(Phthalate Ester Oligomer-Based Additive)

In the polarizing plate protective film of the present invention, a compound represented by formula (E) is also preferably used. The compound represented by formula (E) is effective in enhancing hardness of the film, or effective in inhibiting deterioration of performance of the polarizer in hygrothermal aging, and is preferred. In particular, when the resin constituting the polarizing plate protective film is a cellulose acylate, such a compound is preferably used.

Formula (E)

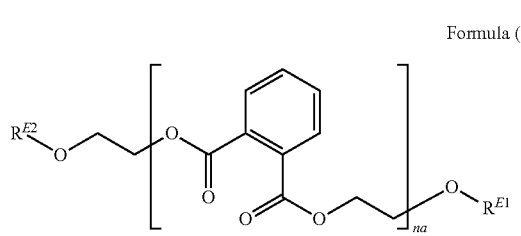

In formula (E), $R^{E1}$ and $R^{E2}$ each independently represent a hydrogen atom, an alkyl group, a cycloalkyl group, an aryl group, or an acyl group. na represents the number of 2 or more.

The alkyl group, the cycloalkyl group, and the aryl group have the same meanings as the alkyl group, the cycloalkyl group, and the aryl group in $R^{41}$ and $R^{43}$ in formula (A), and preferable ranges are also the same.

The acyl group represents a formyl group, an alkylcarbonyl group, an alkenylcarbonyl group, a cycloalkylcarbonyl group, an arylcarbonyl group, or a heterocyclic carbonyl group. The alkylcarbonyl group is preferably that having 2 to 20 carbon atoms. The alkenylcarbonyl group is preferably that having 3 to 20 carbon atoms. The cycloalkylcarbonyl group is preferably that having 4 to 20 carbon atoms. The arylcarbonyl group is preferably that having 7 to 20 carbon atoms. The heterocyclic carbonyl group is preferably that having 1 to 20 carbon atoms.

Examples of these groups include acetyl, propionyl, pivaloyl, myristoyl, acryloyl, methacryloyl, cyclopropylcarbonyl, cyclopentylcarbonyl, cyclohexylcarbonyl, benzoyl, naphthoyl, and nicotinoyl.

$R^{E1}$ and $R^{E2}$ each are preferably an acyl group, and more preferably an alkoxycarbonyl group.

Then, na represents the number of 2 or more, and preferably the number of 2 to 15, more preferably the number of 2 to 10, further preferably the number of 3 to 10, and still further preferably the number of 3 to 8. The compound covers a mixture in which integers as na are different, and in that case, na ordinarily becomes the number having a decimal point in place of the integer.

Specific examples of the compound represented by formula (E) are shown below, but the present invention is not limited to these.

E-1
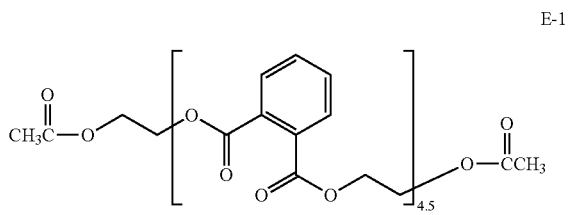

E-2
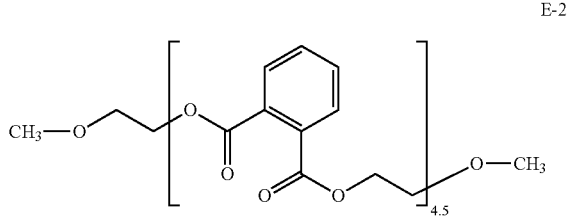

E-3
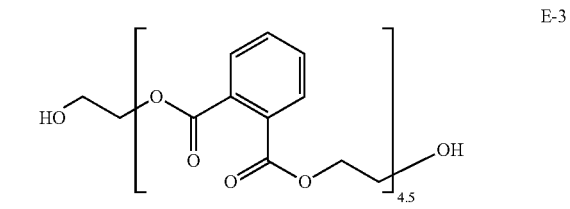

E-4
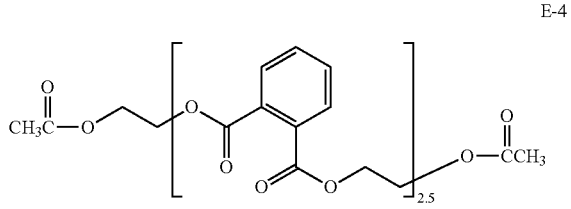

E-5
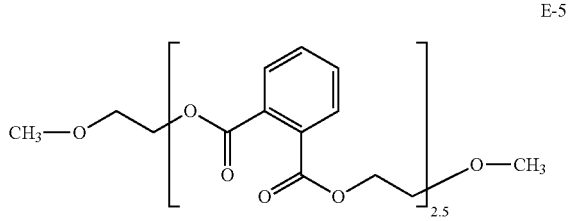

E-6
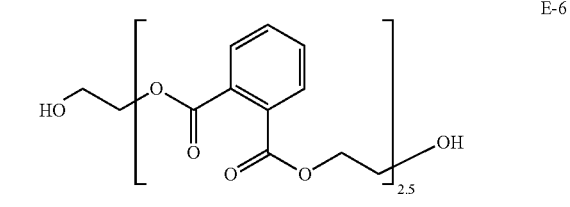

E-7
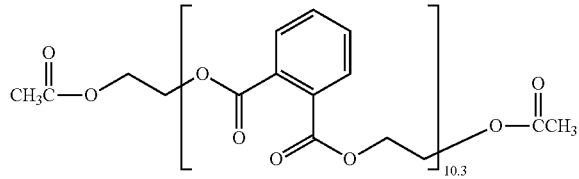

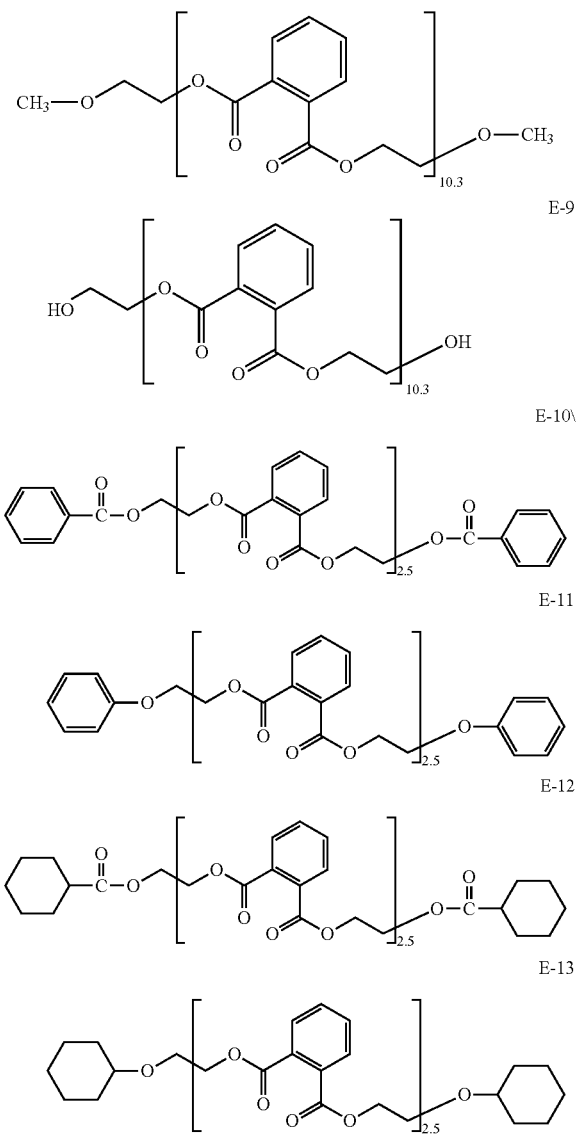

The content of the compound represented by formula (E) in the polarizing plate protective film is not particularly limited, and the content is preferably 2 to 20 parts by mass, and more preferably 5 to 15 parts by mass, to 100 parts by mass of the resin constituting the polarizing plate protective film.

<Method of Producing Polarizing Plate Protective Film>

The polarizing plate protective film of the present invention can be produced via a solution casting method. Hereinafter, the method of producing the polarizing plate protective film is described by taking as an example of an aspect in which a cellulose acylate is utilized as a resin of a main component, but the polarizing plate protective film can also be produced in a similar manner when any other resin is utilized.

In the solution casting method, the film is produced, by using a solution (a dope) in which a cellulose acylate is dissolved into an organic solvent.

The organic solvent preferably contains a solvent selected from an ether having 3 to 12 carbon atoms, a ketone having 3 to 12 carbon atom, an ester having 3 to 12 carbon atoms, and a halogenated hydrocarbon having 1 to 6 carbon atoms.

The ether, the ketone, and the ester each may have a cyclic structure. Moreover, a compound having two or more of any functional groups (namely, —O—, —CO—, and —COO—) of the ether, the ketone, and the ester, can also be used as the organic solvent.

The organic solvent may have any other functional group, such as an alcoholic hydroxy group. In the case of the organic solvent having two or more kinds of functional groups, the number of carbon atoms is preferably 1 to 12, and more preferably 3 to 12.

An amount of the cellulose acylate in a cellulose acylate solution is preferably set such that the cellulose acylate is contained in 10 to 40 mass % in the resultant solution. The amount of the cellulose acylate is more preferably 10 to 30 mass %. An arbitrary additive may be added to the organic solvent (main solvent).

In the solution casting method, the method of drying is described in U.S. Pat. Nos. 2,336,310, 2,367,603, 2,492,078, 2,492,977, 2,492,978, 2,607,704, 2,739,069, 2,739,070. British Patent No. 640731, British Patent No. 736892, JP-B-S45-4554 ("JP-B" means examined Japanese patent publication), JP-B-S49-5614, JP-A-S60-176834, JP-A-S60-203430, and JP-A-S62-115035. Drying on a band or a drum can be performed by blowing the air or an inert gas, such as nitrogen thereonto.

Film formation can also be achieved, by using the prepared cellulose acylate solution (dope), to perform casting of the solution in two or more layers. In this case, the cellulose acylate film is preferably prepared, by the solution casting method. The dope is preferably cast onto the drum or the band, followed by evaporating the solvent, to form the film. A concentration of the dope before casting is preferably set to be in the range of 10 to 40 mass % in an amount of solids. A surface of the drum or the band is preferably finished into a mirror surface state.

When a plurality of cellulose acylate solutions in two or more layers are cast, the plurality of cellulose acylate solutions can be cast, and the film may be produced while lamination is made by casting the solutions each containing the cellulose acylate from a plurality of casting openings provided at an interval in a direction of forwarding the support. For these, for example, the methods can be applied thereto, as described in JP-A-S61-158414, JP-A-H1-122419, and JP-A-H11-198285. Moreover, film formation can also be achieved, by casting the cellulose acylate solution from two casting openings. For this, for example, the methods can be applied thereto, as described in JP-B-S60-27562, JP-A-S61-94724, JP-A-S61-947245, JP-A-S61-104813, JP-A-S61-158413, and JP-A-H6-134933. Further, the casting method for the cellulose acylate film as described in JP-A-S56-162617 can also be applied to, in which flow of a cellulose acylate solution with high viscosity is enveloped with a cellulose acylate solution with low viscosity, and the cellulose acylate solution with high viscosity and the cellulose acylate solution with low viscosity are simultaneously extruded.

Moreover, the film can also be produced, by using two casting openings, to strip off a film formed on the support from a first casting opening, and performing the second casting on a side in contact with the support surface. Specific examples include the method described in JP-B-S44-20235.

As the cellulose acylate solution to be cast, an identical solution may be used, or two or more kinds of different cellulose acylate solutions may be used. In order to provide a plurality of cellulose acylate layers with functions, the cellulose acylate solutions according to the functions may be extruded from each casting opening. Further, the cellulose acylate solution in the present invention can also be cast simultaneously with any other functional layer (for example, an adhesion layer, a dye layer, an antistatic layer, an antihalation layer, an ultraviolet absorption layer, or a polarizing layer).

(Addition of Additive)

Timing of adding the additive, such as the compound represented by formula (I), to the cellulose acylate solution being one example of a resin raw material of the polarizing plate protective film, is not particularly limited as long as the additive is added thereto at a time point at which the film is to be formed. For example, the additive may be added at the time when the cellulose acylate is synthesized, or alternatively the additive may be mixed with the cellulose acylate at the time of preparing the dope.

The steps from casting to post-drying may be performed under the air atmosphere or an atmosphere of an inert gas, such as a nitrogen gas. In the present invention, a winder to be used for production of the polarizing plate protective film may be one that is generally used, and the film can be wound according to a winding method, such as a constant tension control method, a constant torque control method, a taper tension control method, and a programed tension control method in which the internal stress is constant.

(Stretching Process)

The polarizing plate protective film of the present invention can also be subjected to stretching process. By the stretching process, the polarizing plate protective film can be provided with a desired retardation. A direction of stretching of the cellulose acylate film may be preferably any of the transverse direction or a longitudinal direction.

A method of stretching the film in the transverse direction is described in, for example, JP-A-S62-115035, JP-A-H4-152125, JP-A-H4-284211, JP-A-H4-298310, and JP-A-H11-48271.

The film is stretched under heating conditions. The film can be stretched in processing of drying, and stretching is particularly effective when the solvent remains. In the case of stretching in the longitudinal direction, for example, the film is stretched, by adjusting a speed of a transport roller of the film, to increase a film winding speed in comparison with a film stripping-off speed. In the case of stretching in the transverse direction, the film can also be stretched, by transporting the film while retaining a width thereof with a tenter, to gradually expand a width of the tenter. The film can also be stretched after the film is dried, by using a stretching machine (preferably, uniaxial stretching using a Long stretching machine).

(Saponification Treatment)

The polarizing plate protective film or the laminate thereof is subjected to alkali saponification treatment, to be provided with adhesion with a material of the polarizer, such as PVA (polyvinyl alcohol), and the resultant material can be used as the polarizing plate protective film.

With regard to the method of saponification, the method can be applied to, as described in JP-A-2007-86748, paragraph 0211 and paragraph 0212.

For example, the alkali saponification treatment to the polarizing plate protective film or the laminate thereof is preferably performed in a cycle in which a film surface is immersed into an alkaline solution, and then the solution is neutralized with an acidic solution, and the film is washed with water and dried. Specific examples of the alkaline solution include a potassium hydroxide solution and a sodium hydroxide solution. A concentration of a hydroxide ion is preferably in the range of 0.1 to 5.0 mol/L, and more preferable 0.5 to 4.0 mol/L. A temperature of the alkaline solution is preferably in the range of the room temperature (25° C.) to 90° C., and more preferably 40 to 70° C.

In place of the alkali saponification treatment, an easy adhesion processing may be conducted, as described in JP-A-H6-94915 and JP-A-H6-118232.

<Thickness of Polarizing Plate Protective Film>

A thickness of a resin film being the polarizing plate protective film of the present invention is preferably 1 µm or more and 40 µm or less, more preferably 1 µm or more and 30 µm or less, and still more preferably 3 µm or more and 25 µm or less.

By setting the thickness of the polarizing plate protective film to 1 µm or more and 40 µm or less, the film or the polarizing plate can be stably transported in a transport step in the producing of the film and the polarizing plate.

Furthermore, in the present invention, the advantageous effects of the present invention can be effectively exhibited, when the film thickness is thin as above.

«Functional Layer»

In the polarizing plate protective film of the present invention, the functional layer according to the intended purpose can be provided on the polarizing plate protective film, if desired.

Specific examples of the functional layer include a hard coat layer, an antireflection layer, a light-scattering layer, a stain-proofing layer, an antistatic layer, an adhesion layer, a dye layer, an antihalation layer, an antiglare (antidazzle) layer, a gas-barrier layer, a slipping layer, an ultraviolet absorption layer, and a polarizing layer, and these may serve as a plurality of functions in one layer.

For example, the hard coat layer is a layer for imparting hardness or scratch resistance to the polarizing plate protective film. It is possible to form the hard coat layer exhibiting high adhesive property with respect to the polarizing plate protective film, especially the cellulose acylate film, in cooperation with the compound represented by formula (I), for example, by applying a coating composition on the cellulose acylate film and curing it. A filler and/or an additive may be added to the hard coat layer, thereby to make the hard coat layer itself have mechanical, electrical or optical physical performance or chemical performance, such as water repellency or oil repellency. The thickness of the hard coat layer is preferably 0.1 to 6 µm, more preferably from 3 to 6 µm. Having such a thin hard coat layer of which the thickness falls within the range, the resultant polarizing plate protective film containing the hard coat layer can have improved physical preferably in point of brittleness reduction and curling prevention, and can attain other advantages of weight saving and production cost cutting.

Preferably, the hard coat layer is formed by curing a curable composition. Preferably, the curable composition is prepared as a liquid coating composition. One example of the coating composition contains a monomer or an oligomer for a matrix formation binder, a polymer, and an organic solvent. Curing the coating composition applied to the substrate film can form the intended hard coat layer. The curing reaction includes crosslinking or polymerization.

<Characteristics of Polarizing Plate Protective Film>

The polarizing plate protective film is required to be low in the water vapor transmission rate, high in hardness, such as Knoop hardness and pencil hardness, and low in ultraviolet transmittance and haze.

(Water-Vapor Transmission Ratio)

In the polarizing plate protective film of the present invention, the water vapor transmission rate after aging for 24 hours at 40° C. and at 90% relative humidity is preferably 1,050 g/m² or less, and more preferably 990 g/m² or less. By setting the water vapor transmission rate within those range, polarization performance deterioration of the polarizer can be made small, into which the polarizing plate protective film of the present invention is assembled, under an environment of hygrothermal condition.

A value of the water vapor transmission rate herein refers to a value obtained by measuring mass (g) of water vapor passing through a sample for 24 hours in an atmosphere of a temperature of 40° C. and a relative humidity of 90%, and converting the mass into the value per m² of a sample area, in accordance with the testing of the water vapor transmission rate (dish method) of JIS Z 0208.

(Hardness)

(1) Knoop Hardness

In the polarizing plate protective film of the present invention, the surface hardness measured at an indentation load of 50 mN by using a Knoop indenter is preferably 185 N/mm² or more. A minimum value of Knoop hardness is more preferably 210 N/mm² or more, in which measurement is performed by rotating the Knoop indenter in the same indentation position at the indentation load of 50 mN, in accordance with the method of JIS Z 2251. The surface hardness (Knoop hardness) is measured according to a nanoindentation method. JIS Z 2251 is one of the Japan Industrial Standards created based on ISO 4545. For example, a minimum value of the Knoop hardness in 18 directions in total is 210 N/mm² or more, in which measurement is performed by rotating the Knoop indenter each time by 10° in the same indentation position. The surface hardness of the polarizing plate protective film is preferably 220 N/mm² or more, and more preferably 230 N/mm² or more.

The surface hardness of the polarizing plate protective film can be adjusted, depending, for example, on a kind and an addition amount of the respective additive, a polymerization degree of the resin, a composition of the dope solvent, and stretching process of the film.

(2) Pencil Hardness

The polarizing plate protective film of the present invention preferably is also high in a pencil hardness.

The pencil hardness is determined based on the pencil hardness evaluation described in JIS K 5400. Specifically, the polarizing plate protective film is conditioned for 2 hours at a temperature of 25° C. and at a relative humidity of 60%, and then evaluated by repeating evaluations 20 times at a load of 500 g, by using a 3H pencil for testing, as specified in JIS S 6006.

With respect to the pencil hardness, the results of 3H or harder are required for practical use.

(Ultraviolet Transmittance)

The polarizing plate protective film of the present invention preferably has high capacity of shielding ultraviolet ray, in order to prevent degradation of the polarizer or a driving liquid crystal in a liquid crystal cell, as caused by the ultraviolet ray. Thus, ultraviolet transmittance in the region of wavelengths of 290 to 300 nm is preferably 10% or less, and more preferably 5% or less. The polarization performance deterioration caused by a light can be efficiently inhibited, by adjusting the transmittance of ultraviolet ray in the region of the wavelengths of 290 to 300 nm to 10% or less, to inhibit optical excitation of $I_3^-$ or the like having an absorption maximum near the wavelengths of 290 to 300 nm.

(Haze)

The haze of the polarizing plate protective film of the present invention is preferably 0.01 to 1.00%, and more preferably 0.05 to 0.80%. If the haze is 1.00% or less, contrast of the liquid crystal display is made favorably high, which is preferred.

The haze can be measured and determined, by using a haze meter, for example, Haze Meter (HGM-2DP, Suga Test Instruments Co., Ltd.), in accordance with JIS K-7136.

The polarizing plate protective film or the laminate thereof to be measured is cut into a size of 40 mm×80 mm, and the haze is measured under the conditions of 60% relative humidity at 25° C.

«Polarizing Plate»

The polarizing plate of the present invention contains a polarizer, and at least one polarizing plate protective film of the present invention.

The polarizing plate of the present invention is formed in which the polarizer and at least one polarizing plate protective film of the present invention are arranged only on one side of the polarizer. In general, the polarizing plate is widely used in which each surface is protected by sandwiching each surface of the polarizer with the polarizing plate protective films.

In addition, when the polarizing plate has the polarizing plate protective films on both surfaces of the polarizer, on a surface opposite to the surface having the polarizing plate protective film of the present invention, a polarizing plate protective film different from the polarizing plate protective film of the present invention, or alternatively any of known polarizing plate protective films may be applied thereto.

Specific examples of the polarizing plate protective film different from the polarizing plate protective film of the present invention include: one in which an additive to be contained therein is different in a kind or a content; one having different characteristics; and one with or without the functional layer or one having different functional layer.

<Phase Difference Film>

The polarizing plate of the present invention preferably has, on a surface opposite to the surface having the polarizing plate protective film of the present invention, a phase difference film in which in-plane retardation ($Re_{590}$) with a wavelength of 590 nm under an environment of 60% relative humidity at 25° C. is −5 to 5 nm, and retardation ($Rth_{590}$) in a thickness direction is −30 to 30 nm. By forming such a configuration, when the polarizing plate is assembled into a liquid crystal display for an IPS (in-place-switching) mode, the advantageous effects of the present invention are more effectively exhibited. The $Re_{590}$ is preferably in the range of 0 to 3 nm, and more preferably in the range of 0 to 2 nm. Moreover, the $Rth_{590}$ is preferably in the range of −20 to 20 nm, and more preferably in the range of −10 to 10 nm.

Specific examples of such a phase difference film include the film described in JP-A-2014-41371, paragraphs 0066 to 0068.

Moreover, also for other driving modes, the polarizing plate may have a phase difference film having optical compensation capability in which the driving mode or the retardation of the liquid crystal cell are taken into consideration.

In this specification, Re ($\lambda$) and Rth ($\lambda$) indicate the in-plane retardation and the retardation in the thickness direction, respectively, at a wavelength of $\lambda$. The Re ($\lambda$) is measured by making light at a wavelength of $\lambda$ nm to be incident in the film normal direction, in KOBRA 21ADH or WR (trade names, manufactured by Oji Scientific Instruments). The measurement wavelength ($\lambda$ nm) can be selected, by manual exchange of wavelength selection filters or the retardation can be calculated from observed values by conversion, for example, using a suitable program. In the case where the film measured is a film expressed by a uniaxial or biaxial refractive index ellipsoid, the Rth ($\lambda$) is calculated by the following method.

The Re ($\lambda$) is measured at 6 points in total by making light at a wavelength of $\lambda$ nm to be incident from directions inclined with respect to the film normal direction in the 10° steps up to 50° on one side from the normal direction with the in-plane slow axis (which is judged by KOBRA 21ADH or WR) being used as the inclination axis (rotation axis) (when the slow axis is not present, an arbitrary direction in the film plane is used as the rotation axis). Based on the retardation values thus measured, the assumed value of the average refractive index, and the film thickness value input, the Rth ($\lambda$) is calculated by KOBRA 21ADH or WR. In the above, when the film has a direction where the retardation value becomes zero at a certain inclination angle from the normal direction with the rotation axis being the in-plane slow axis, the retardation value at an inclination angle larger than that inclination angle is calculated by KOBRA 21ADH or WR after converting its sign into a negative sign. Alternatively, after measuring the retardation values from two arbitrary inclined directions by using the slow axis as the inclination axis (rotation axis) (when the slow axis is not present, an arbitrary direction in the film plane is used as the rotation axis), based on the values thus obtained, the assumed value of the average refractive index, and the film thickness value input, Re and Rth can also be calculated according to formulae (A) and ($\beta$).

$$Re(\theta) = \left[ nx - \frac{ny \times nz}{\sqrt{\left(ny\sin\left(\sin^{-1}\left(\frac{\sin(-\theta)}{nx}\right)\right)\right)^2 + \left(nz\cos\left(\sin^{-1}\left(\frac{\sin(-\theta)}{nx}\right)\right)\right)^2}} \right] \times \frac{d}{\cos\left(\sin^{-1}\left(\frac{\sin(-\theta)}{nx}\right)\right)} \quad \text{Formula (A)}$$

In formula (A), Re ($\theta$) represents the retardation value in the direction inclined at an angle of $\theta$ from the normal direction. Further, nx represents the refractive index in the in-plane slow axis direction, ny represents the refractive index in the direction crossing with nx at right angles in the plane, and nz represents the refractive index in the direction crossing with nx and ny at right angles.

Rth={(nx+ny)/2−nz}×d    Formula ($\beta$)

In the case where the film measured is a film incapable of being expressed by a uniaxial or biaxial refractive index ellipsoid or a film not having a so-called optic axis. Rth ($\lambda$) is calculated by the following method. The Re ($\lambda$) is measured at 11 points by making light at a wavelength of $\lambda$ nm to be incident from directions inclined with respect the film normal direction in the 10° steps from −50° to +50° with the in-plane slow axis (which is judged by KOBRA 21ADH or WR) being used as the inclination axis (rotation axis). Based on the retardation values thus measured, the assumed value of the average refractive index, and the film thickness value input, the Rth ($\lambda$) is calculated by KOBRA 21ADH or WR.

In the measurement above, as for the assumed value of the average refractive index, those described in Polymer Handbook (John Wiley & Sons, Inc.) and catalogues of various optical films can be used. The average refractive index of which value is unknown can be measured by an Abbe refractometer. The values of the average refractive index of main phase difference films are as follows: cellulose acylate (1.48), cycloolefin polymer (1.52), polycarbonate (1.59), poly(methyl methacrylate) (1.49), and polystyrene (1.59). When such an assumed value of the average refractive index and the film thickness are input, KOBRA 21ADH or WR calculates nx, ny and nz, and from these calculated nx, ny and nz, Nz=(nx−nz)/(nx−ny) is further calculated.

A wavelength for measuring Re or Rth has a value of $\lambda$=590 nm in a visible region, unless otherwise specified.

<Polarizer>

A polarizer contains at least a dichroic dye and a resin.

(Resin)

In the polarizer according to the present invention, a polyvinyl alcohol-based resin is preferably used. The polarizer according to the present invention contains as a main component the polyvinyl alcohol resin, and the resin generally occupies 80 mass % or more in the polarizer. The polyvinyl alcohol is generally a material obtained by saponifying polyvinyl acetate, and is allowed to contain a component copolymerizable with vinyl acetate, for example, as unsaturated carboxylic acid, unsaturated sulfonic acid, olefins, and vinyl ethers. Moreover, use can also be made of a modified polyvinyl alcohol-based resin containing, for example, an acetoacetyl group, a sulfo group, a carboxy group, an oxyalkylene group.

A saponification degree of the polyvinyl alcohol-based resin is not particularly limited, but from the viewpoint of solubility or the like, it is preferably 80 to 100 mol %, and particularly preferably 90 to 100 mol %. A polymerization degree of the polyvinyl alcohol-based resin is not particularly limited, but it is preferably 1,000 to 10,000, and particularly preferably 1,500 to 5,000.

An elastic modulus of the polyvinyl alcohol-based resin film before stretching is preferably 0.1 MPa or more and 500 MPa or less, and more preferably 1 MPa or more and 100 MPa or less in terms of a Young's modulus.

By setting the modulus to such a range, the polyvinyl alcohol-based resin film can be produced, which is excellent in an effect on inhibiting occurrence of wrinkles after stretching, and which has sufficient mechanical strength.

A thickness of the polyvinyl alcohol-based resin film before stretching is not particularly limited, but from the viewpoints of stability of film retention, and homogeneity of stretching, it is preferably 1 μm to 1 mm, and particularly preferably 20 to 200 μm. Moreover, a thickness of the polyvinyl alcohol-based resin film after stretching is preferably 2 to 100 μm, and for improving light leakage, it is preferably 7 to 25 μm. According to those thicknesses, a thickness of the film in the polarizer is determined.

(Dichroic Dye)

The polarizer according to the present invention contains a dichroic dye. Herein, the dichroic dye means a dye absorbance of which is different depending on directions.

Examples thereof include an iodide ion, a diazo dye, a quinone dye, and any of other dichroic dyes. As the dichroic dye, use can be preferably made of a high-order iodide ion, such as $I_3^-$ and $I_5^-$, or a dichroic dye.

In the present invention, the high-order iodide ion is particularly preferably used. With regard to the high-order iodide ion, as described in "Application of polarizing plates," edited by Ryo Nagata, CMC Publishing Co., Ltd., or Industrial Materials, vol. 28, No. 7, pp. 39 to 45, a polyvinyl alcohol is immersed into a liquid in which iodine is dissolved in an aqueous potassium iodide solution and/or an aqueous boric acid solution, and the high-order iodide ion is formed in a state in which iodine is adsorbed and oriented on the polyvinyl alcohol.

The content of the dichroic dye is preferably 0.1 to 50 parts by mass, more preferably 0.5 to 20 parts by mass, and further preferably 1.0 to 5.0 parts by mass, to the polyvinyl alcohol-based resin.

In addition to the polyvinyl alcohol-based resin and the dichroic dye, a plasticizer and/or a surfactant may be added, when necessary, to the polarizer according to the present invention.

<Method of Producing Polarizer>

As a method of producing the polarizer according to the present invention, for example, the polarizer is preferably formed, by achieving film formation of the polyvinyl alcohol-based resin, and then introducing iodine thereinto. Production of the polyvinyl alcohol-based resin film can be made, for example, with reference to the method described in JP-A-2007-86748, paragraphs 0213 to 0237, Japanese Patent No. 3342516, JP-A-H09-328593, JP-A-2001-302817, and JP-A-2002-144401.

In particular, the present invention preferably includes: a step of forming the polyvinyl alcohol-based resin solution having the polyvinyl alcohol-based resin, into a film shape; a step of stretching the polyvinyl alcohol-based resin film; a step of dyeing, with the dichroic dye, the polyvinyl alcohol-based resin film after stretching; and a step of crosslinking, with boric acid, the polyvinyl alcohol-based resin film after dyeing.

In the step of forming the polyvinyl alcohol-based resin solution into the film shape, the polyvinyl alcohol-based resin is preferably added to water while stirring, to prepare a stock (undiluted) solution in which the polyvinyl alcohol-based resin is dissolved into water or the organic solvent. A concentration of the polyvinyl alcohol-based resin in the stock solution is preferably 5 to 20% by mass. Moreover, the resultant slurry may be dehydrated, to once prepare a polyvinyl alcohol-based resin wet cake having a moisture content of about 40%. When the additive is further added thereafter, for example, a method is preferred in which the wet cake of the polyvinyl alcohol is put in a dissolver, and the plasticizer and/or water are/is added thereto, and the resultant mixture is stirred while water vapor is blown from a bottom of the tank. As a temperature of the resin therein, the resin is preferably heated to 50 to 150° C., and an inside of the system may be pressurized.

In the present invention, a method is preferably applied to in which the stock solution of the polyvinyl alcohol-based resin solution prepared as above is cast, to form the film. The casting method is not particularly limited. However, a heated stock solution of the polyvinyl alcohol-based resin solution is preferably supplied to a twin-screw extruder, and cast from a discharging means (preferably a die, and more preferably a T-shaped slit die) onto the support by means of a gear pump, to form the film. Moreover, a temperature of the resin solution discharged from the die is not particularly limited.

As the support, a casting drum is preferred, and a diameter, a width, a rotational speed, and a surface temperature of the drum is not particularly limited. Among these, the diameter of the casting drum is preferably 2,000 to 5,000 mm, more preferably 2,500 to 4,500 mm, and particularly preferably 3,000 to 3,500 mm.

The width of the casting drum is preferably 2 to 6 m, more preferably 3 to 5 m, and particularly preferably 4 to 5 m.

The rotational speed of the casting drum is preferably 2 to 20 m/min, more preferably 4 to 12 m/min, and particularly preferably 5 to 10 m/min.

The surface temperature of the casting drum is preferably 40 to 140° C., more preferably 60 to 120° C., and particularly preferably 80 to 100° C.

The resin temperature at an outlet of the T-shaped slit die is preferably 40 to 140° C., more preferably 60 to 120° C., and particularly preferably 80 to 100° C.

Then, drying is preferably performed, by allowing a back surface and a front surface of the resultant roll to alternately pass through a drying roller. A diameter, a width, a rotational speed, and a surface temperature of the drying roller are not particularly limited. Among these, the diameter of the drying drum is preferably 200 to 450 mm, more preferably 250 to 400 mm, and particularly preferably 300 to 350 mm.

Moreover, a length of the obtained film is not particularly limited, and the film can be formed into a long film of generally 2,000 m or more, and preferably 4,000 m or more. A width of the film is also not particularly limited, but is preferably 2 to 6 m, and more preferably 3 to 5 m.

The polyvinyl alcohol-based resin solution is formed into the film shape, and then the film is stretched. To stretching, use can be preferably made of: the longitudinally uniaxial stretching manner as described in U.S. Pat. No. 2,454,515; or the tenter manner as described in JP-A-2002-86554. A preferred stretching ratio is preferably 2 times to 12 times, and more preferably 3 times to 10 times. Moreover, a relationship among the stretching ratio, a master roll thickness, and a polarizer thickness can be preferably adjusted to an expression: {(polarizer film thickness after sticking polarizing plate protective film)/(master roll thickness)}×(total stretching ratio)>0.17, as described in JP-A-2002-040256; and a relationship between a width of the polarizer in leaving a final bath, and a polarizer width in sticking the polarizing plate protective film can also be preferably adjusted to an expression: 0.80≤{(polarizer width in sticking polarizing plate protective film)/(width of polarizer in leaving final bath)}≤0.95, as described in JP-A-2002-040247.

After stretching, the polyvinyl alcohol-based resin film is dyed with the dichroic dye. Dyeing is performed by adsorption in a gas-phase or a liquid-phase. When iodine is used as the dichroic dye as an example in which dyeing is performed in the liquid phase, the polymer film for the polarizer is immersed into an aqueous iodine/potassium iodide solution, for dying. Iodine is preferably in 0.1 to 20 g/L, potassium iodide is preferably in 1 to 200 g/L, and a mass ratio of potassium iodide to iodine is preferably 1 to 200. A dyeing time is preferably 10 to 5,000 seconds, and a liquid temperature is preferably 5 to 60° C. As a dyeing method, not only immersion but also arbitrary means, such as application (coating) and spraying of iodine or a dye solution, can be applied to. A dyeing step may be placed in any of steps before and after the stretching step. However, the film is particularly preferably dyed in the liquid phase before the stretching step, because the film is properly swollen and stretching is become readily.

Moreover, to dyeing, the method described in JP-A-2002-86554 can be applied to. Moreover, as described in JP-A-2002-290025, the method may also be applied to, in which dyeing is performed while controlling a concentration of iodine, a dyeing bath temperature, a stretching ratio in the bath, or/and stirring a bath liquid in the bath.

In addition, as described in Japanese Patent No. 3145747, a boron-based compound, such as boric acid and sodium tetraborate decahydrate (borax), may be added to the dyeing solution.

As other steps, a swelling step, a film-hardening step, and a drying step may be performed. These steps are described in JP-A-2011-237580, paragraphs 0039 to 0050, and the content is incorporated by reference herein.

<Shape and Configuration>

The shape of the polarizing plate of the present invention includes: a film piece that is cut to a size capable of being mounted as it is in a liquid crystal display, as well as a film that is manufactured in a long shape by continuous production and wound in a roll shape (for example, an aspect having the roll length of 2,500 m or longer and an aspect having the roll length of 3,900 m or longer). When it is intended for use in the large-screen liquid crystal display, the width of the polarizing plate is preferably set to 1,470 mm or larger.

The polarizing plate of the present invention is formed of the polarizer and at least one sheet of the polarizing plate protective film of the present invention, but it is also preferably formed by further sticking: a protect film (outside the polarizing plate protective film of the present invention) onto one surface of the polarizing plate; and a separate film onto an opposite surface thereof.

The protect film and the separate film are used for the purpose of protecting the polarizing plate, for example, in shipping and product inspection of the polarizing plate. In that case, the protect film is stuck for the purpose of protecting the surface of the polarizing plate, and used on a side opposite to the surface on which the polarizing plate is stuck onto a liquid crystal cell. Moreover, the separate film is used for the purpose of covering an adhesion layer to be stuck onto the liquid crystal cell, and used on each side of the surface onto which the polarizing plate is stuck onto the liquid crystal cell.

<Method of Laminating Polarizer and Polarizing Plate Protective Film>

With regard to a method of producing the polarizing plate of the present invention, at least one sheet of the polarizing plate protective film of the present invention is laminated on at least one surface of the polarizer obtained as above.

In the method of producing the polarizing plate of the present invention, the polarizing plate is preferably prepared according to a method in which a surface of the polarizing plate protective film is subjected to alkali treatment, and the resultant film is stuck, by using a completely saponified aqueous polyvinyl alcohol solution, onto at least one surface, preferably each surface, of the polarizer, prepared by immersing the PVA film into an iodine solution followed by stretching the resultant film.

Examples of the adhesive that is used for sticking the processed surface of the polarizing plate protective film and the polarize, include: polyvinyl alcohol-based adhesives, such as PVA and polyvinyl butyral; and vinyl-based latexes derived from butyl acrylate or the like.

Upon sticking the polarizing plate protective film of the present invention onto the polarizer, both are preferably stuck such that a transmission axis of the polarizer and the slow axis of the polarizing plate protective film are bisected at right angles, or are parallel or crossed at 45°.

Herein, with regard to being parallel and bisected at right angles, the angle includes a range of an allowable difference in the technical field to which the present invention belongs. For example, it means that it is within a range of less than ±10° from the exact angle to be parallel or to be bisected at right angles, and the difference from the exact angle is preferably 5° or less and more preferably 3° or less.

That the transmission axis of the polarizer and the slow axis of the polarizing plate protective film are parallel means that the direction of principal refractive index ax of the polarizing plate protective film and the direction of the transmission axis of the polarizing plate are crossed at the angle of ±10°. This angle is preferably within 5°, more preferably within 3°, further preferably within 1°, and most preferably within 0.5°.

Further, that the transmission axis of the polarizer and the slow axis of the polarizing plate protective film are bisected at right angles, means that the direction of the principal refractive index nx of the polarizing plate protective film and the direction of the transmission axis of the polarizer are crossed at the angle of 90°±10°. This angle, in which they are crossed, is preferably 90°±5°, more preferably 90°±3°, further preferably 90°±1°, and most preferably 90°±0.1°. If the angle is within the range as mentioned above, reduction of polarization degree performance under polarizing plate crossed Nicols is inhibited, and light leakage is reduced, which are preferred.

<Functionalization of Polarizing Plate>

The polarizing plate of the present invention can also be preferably used as a functionalized polarizing plate conjugated with: an antireflection film or a brightness enhancement film, for improving visibility of a display; or a polarizing plate protective film having a functional layer, such as a forward-scattering layer and an antiglare (antidazzle) layer. The antireflection film, the brightness enhancement film for functionalization, any other functional optical film, the forward-scattering layer, and the antiglare layer are described in JP-A-2007-86748, paragraphs 0257 to 0276, and the functionalized polarizing plate can be prepared based on these descriptions.

<Performance of Polarizing Plate>

(Polarization Degree)

With regard to the polarizing plate of the present invention, a polarization degree is preferably 95.0% or more, more preferably 98.0% or more, and most preferably 99.5% or more.

In the present invention, the polarization degree of the polarizing plate can be determined by calculating, according to the following formula, a spectrum of the polarization degree from orthogonal transmittance and parallel transmittance measured at wavelengths of 380 nm to 700 nm by using an automatic polarization film measuring apparatus VAP-7070 manufactured by JASCO Corporation, and further calculating a weighed average of a light source (auxiliary illuminant C) and CIE visual sensitivity (Y).

$$\text{Polarization degree (\%)} = [\{(\text{parallel transmittance}) - (\text{orthogonal transmittance})\}/\{(\text{parallel transmittance}) + (\text{orthogonal transmittance})\}]^{1/2} \times 100$$

(Change of the Polarization Degree)

The polarizing plate of the present invention is excellent in durability under hygrothermal aging conditions. Thus, a changed amount of the polarization degree before and after polarizing plate durability testing as described later is small.

In the polarizing plate of the present invention, the orthogonal transmittance and the parallel transmittance are measured using the automatic polarization film measuring apparatus VAP-7070 manufactured by JASCO Corporation, and the polarization degree is calculated according to the above formula, and particularly, a change of the polarization degree when the polarizing plate is stored for 144 hours under an environment of 90% relative humidity at 80° C. is preferably less than 3.0%.

Two samples (5 cm×5 cm) are prepared, each of which is prepared by sticking the polarizing plate of the present invention onto glass through a pressure sensitive adhesive.

On this occasion, the polarizing plate is stuck such that the polarizing plate protective film of the present invention is placed on a glass side. The orthogonal transmittance is measured by setting the assembly by directing the glass side of this sample toward the light source. Measurement is performed on two samples, respectively, and average values thereof are taken as the orthogonal transmittance and the parallel transmittance. Specifically, the measurement is as described in the Examples section.

(Crystallization Index of Polyvinyl Alcohol in Polarizer)

In the present invention, the resin constituting the polarizer is preferably a polyvinyl alcohol, and a crystallization index of the polyvinyl alcohol is preferably 0.05 or less, which is after the polarizing plate of the polarizer composed of the polyvinyl alcohol is aged for 144 hours at a temperature of 80° C. and a relative humidity of 90%.

Herein, the crystallization index of the polyvinyl alcohol means an indication of a degree of crystallization of the polyvinyl alcohol. In the present invention, a method is applied to in which the degree is determined by using absorbance at a wave number of 1,141 $cm^{-1}$ known as a crystallization-sensitive band in an infrared absorption spectrum.

In the present invention, the index is calculated based on the absorbance at a wave number of 1,134 $cm^{-1}$, according to the following formula ($\alpha$).

Crystallization index of polyvinyl alcohol={$A$(1,141 $cm^{-1}$)−$A$(1,134 $cm^{-1}$)}/$A$(1,134 $cm^{-1}$)    Formula ($\alpha$)

In formula ($\alpha$), A (1,141 $cm^{-1}$) represents the absorbance at the wave number of 1,141 $cm^{-1}$, and A (1,134 $cm^{-1}$) represents the absorbance at the wave number of 1,134 $cm^{-1}$.

Herein, a peak at the wave number of 1,141 $cm^{-1}$ corresponds to a crystalline band of the polyvinyl alcohol, namely a skeletal vibration of an elongated carbon zigzag chain in a crystalline region, and a peak area (a skirt of C—O stretching vibration in an amorphous portion) at the wave number of 1,134 $cm^{-1}$ corresponds to an area taken as a reference, relative to the absorbance of the crystalline band of the polyvinyl alcohol.

In the present invention, it is assumed that the compound represented by formula (I) in the polarizing plate protective film diffusively moves into the polarizer, to inhibit crystallization of the polyvinyl alcohol, under hygrothermal condition.

Thus, the infrared absorption spectrum on the surface of the polarizer after storage under hygrothermal condition is measured, to determine the crystallization index, for examining the effect.

Specifically, an ATR-IR spectrum is measured, by an attenuated total reflection infrared absorption spectroscopy (ATR method), for example, an infrared spectroscope (Nicolet 6700, manufactured by Thermo Scientific, Inc.) according to which FT-IR ATR can be made.

More specifically, the measurement is made as described in Examples section.

(Other Characteristics)

Other preferred optical characteristics and so forth of the polarizing plate of the present invention are described in JP-A-2007-086748, paragraphs 0238 to 0255, and the polarizing plate preferably satisfies these characteristics.

«Display»

The present invention is preferably applied to as an application of a display using the polarizer.

Specific examples of such a display include: an antireflection application of a liquid crystal display or an organic electroluminescence display.

When described by taking the liquid crystal display as an example, the liquid crystal display of the present invention has at least the liquid crystal cell and the polarizing plate of the present invention. In the liquid crystal display, a configuration is taken in which the liquid crystal cell is arranged between two polarizing plates, such as a first polarizing plate and a second polarizing plate. A mode of driving the liquid crystal cell is not particularly limited, but each driving mode, such as TN, OCB, VA and IPS, is generally used. Further, an optically anisotropic layer for performing optical compensation is preferably used, according to the mode of driving the liquid crystal cell, and is arranged between the liquid crystal cell and the polarizing plate. In addition, the polarizing plate protective film may have a function of the optically anisotropic layer.

FIG. 1 is one example of a schematic diagram showing an example of a display of the present invention, as a liquid crystal display. In FIG. 1, a liquid crystal display 10 is formed of: a liquid crystal cell having a liquid crystal layer 5, and a liquid crystal cell upper electrode substrate 3 and a liquid crystal cell lower electrode substrate 6 that are vertically arranged on the liquid crystal layer 5; and an upper polarizing plate 1 and a lower polarizing plate 8 that are arranged on the each side of the liquid crystal cell. A color filter may be arranged between the liquid crystal cell and each polarizing plate. When the liquid crystal display 10 is used as a transmissive-type, a back light is arranged on the back face, using, as the light source, a cold cathode or hot cathode fluorescent tube, a light-emitting diode, a field emission element, or an electroluminescent element.

The upper polarizing plate 1 and the lower polarizing plate 8 have a configuration of lamination such that the polarizer sandwiched with two polarizing plate protective films, respectively. In the liquid crystal display 10 of the present invention, at least one polarizing plate is preferably the polarizing plate of the present invention. In the liquid crystal display 10 of the present invention, the polarizing plate protective film of the present invention, the polarizer, and a general transparent protective film are preferably laminated in this order, from an outer side of the display (the side far from the liquid crystal cell).

EXAMPLES

The present invention will be described in more detail based on examples given below, but the invention is not limited to these.

Materials, reagents, amounts of substances and ratios thereof, operation or the like as shown in Examples below can be appropriately changed as long as they are not departed from the spirit of the present invention. Thus, the scope of the present invention should not be restrictively interpreted by the Examples shown below.

Example 1

As described below, a polarizing plate protective film was prepared, and a polarizing plate was prepared using this polarizing plate protective film.

A. Preparation of Polarizing Plate Protective Film (1) Preparation of Polarizing Plate Protective Film 101

(Preparation of Cellulose Acylate Solution 101)

The composition described below was charged into a mixing tank, stirred to dissolve each component thereinto, for thereby preparing a cellulose acylate solution 101.

| Formulation of the cellulose acylate solution 101 | |
|---|---|
| Cellulose acetate having a degree of acetyl substitution of 2.87 | 100.0 parts by mass |
| Additive D-1 | 10.0 parts by mass |
| Methylene chloride (first solvent) | 389.0 parts by mass |
| Methanol (second solvent) | 58.2 parts by mass |

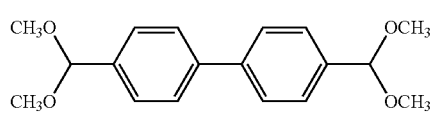

D-1

(Preparation of Matting Agent Solution 102)

The composition described below was charged into a disperser, and stirred to dissolve each component thereinto, for thereby preparing a matting agent solution 102.

| Formulation of the matting agent solution 102 | |
|---|---|
| Silica particles having an average particle size of 120 nm (AEROSIL R972, manufactured by Nippon Aerosil Co., Ltd.) | 2.0 parts by mass |
| Methylene chloride (first solvent) | 75.5 parts by mass |
| Methanol (second solvent) | 11.3 parts by mass |
| Cellulose acylate solution 101 | 0.9 parts by mass |

<Casting>

1.3 parts by mass of the matting agent solution 102 and 98.7 parts by mass of the cellulose acylate solution 101 were added and mixed, using the inline mixer, for preparing a resin solution (dope). The thus-prepared dope was cast onto a casting support made of stainless steel (support temperature: 22° C.), by using a band casting apparatus. The thus-formed film was stripped off, when an amount of remaining solvent in the dope was about 20 mass %. Each end in the transverse direction of the thus-stripped-off film was gripped with a tenter, the film in the state of 5 to 10 mass % in the amount of the remaining solvent was dried while the film was stretched 1.10 times (10%) in the transverse direction under a temperature of 120° C. Then, transported between rolls of a heat treatment apparatus, followed by further drying, a polarizing plate protective film 101 of the present invention was obtained. A thickness of the resultant polarizing plate protective film 101 was 25 μm, a width thereof was 1,480 mm, and a winding length thereof was 2,700 m.

(2) Preparation of Polarizing Plate Protective Films 102 to 114, c01, and c02

Polarizing plate protective films 102 to 114 of the present invention and polarizing plate protective films c01 and c02 for comparison were prepared in the same manner as in the preparation of the polarizing plate protective film 101, except that kinds and addition amounts of additives were changed as described in Table 3 below.

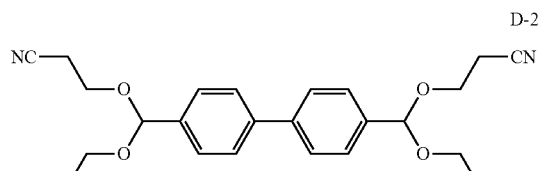

D-2

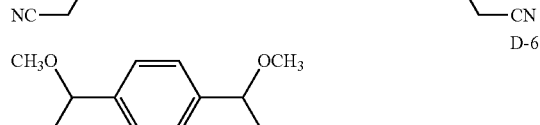

D-6

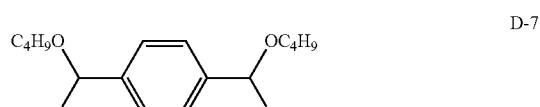

D-7

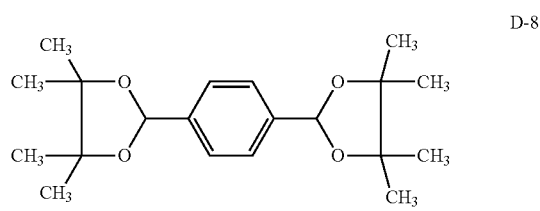

D-8

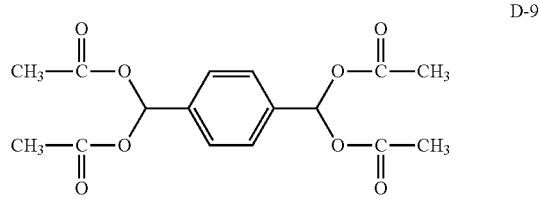

D-9

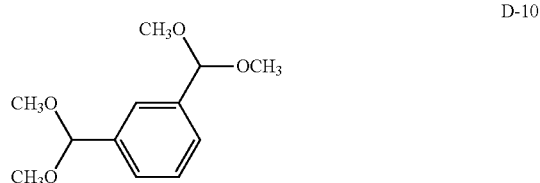

D-10

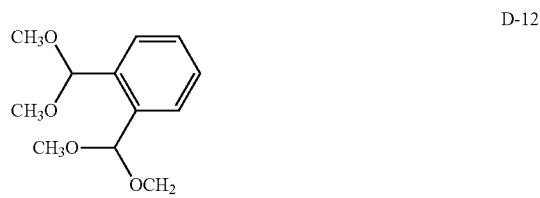

D-12

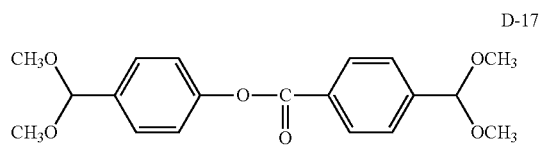

D-17

D-33

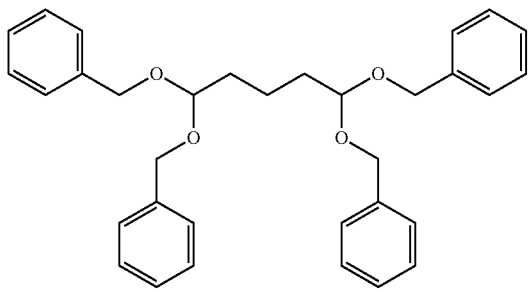

D-42

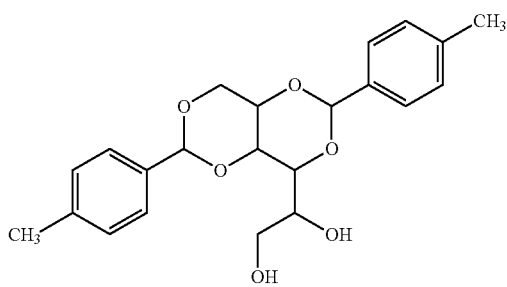

Compound for comparison (1)

Note that, the compound for comparison (1) is a compound described in JP-A-2011-22567.

(3) Preparation of Cellulose Acylate Film S01

(Preparation of Cellulose Acylate Solution 301)

The composition described below was charged into a mixing tank, stirred to dissolve each component thereinto, thereby for preparing a cellulose acylate solution 301.

| Formulation of the cellulose acylate solution 301 | |
|---|---|
| Cellulose acetate having a degree of acetyl substitution of 2.87 | 100.0 parts by mass |
| Additive E-1 | 8.0 parts by mass |
| SEESORB706 (trade name) manufactured by Shipro Kasei Kaisha, Ltd. | 4.0 parts by mass |
| Methylene chloride (first solvent) | 389.0 parts by mass |
| Methanol (second solvent) | 58.2 parts by mass |

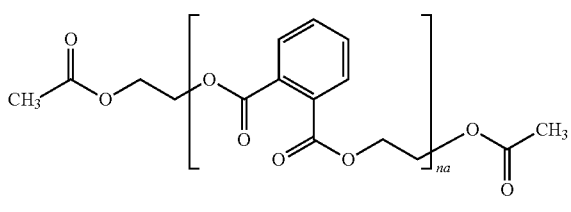

Additive E-1 weight average MW 1,000 na: about 4.5

(Preparation of Matting Agent Solution 302)

The composition described below was charged into a mixing tank, stirred to dissolve each component thereinto, thereby for preparing a matting agent solution 302.

| Formulation of the matting agent solution 302 | |
|---|---|
| Silica particles having an average particle size of 20 nm (AEROSIL R972, manufactured by Nippon Aerosil Co., Ltd.) | 2.0 parts by mass |
| Methylene chloride (first solvent) | 75.5 parts by mass |
| Methanol (second solvent) | 11.3 parts by mass |
| Cellulose acylate solution 301 | 0.9 parts by mass |

(Preparation of Barbituric Acid-Based Additive Solution 303)

The composition described below was charged into a mixing tank, stirred under heating, to dissolve each component thereinto, thereby for preparing a barbituric acid-based additive solution 303.

| Formulation of the barbituric acid-based additive solution 303 | |
|---|---|
| Additive A-3 | 20.0 parts by mass |
| Methylene chloride (first solvent) | 69.6 parts by mass |
| Methanol (second solvent) | 10.4 parts by mass |

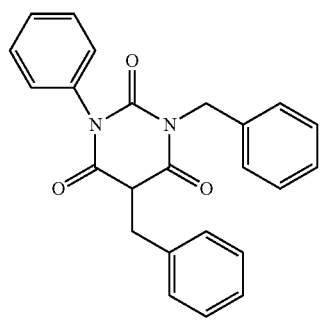

Additive A-3

<Casting>

1.3 parts by mass of the matting agent solution 302, and 3.4 parts by mass of the barbituric acid-based additive solution 303 were subjected to filtration, respectively, and mixed using an inline mixer, and 95.3 parts by mass of the cellulose acylate solution 301 were further added thereto, and mixed using the inline mixer, thereby for preparing a resin solution (dope). The thus-prepared dope was cast onto a casting support made of stainless steel (support temperature: 22° C.), by using a band casting apparatus. The thus-formed film was stripped off, when an amount of remaining solvent in the dope was become a state of about 20 mass %. Each end in the transverse direction of the thus-stripped-off film was gripped with a tenter, the film in the state of 5 to 10 mass % in the amount of the remaining solvent was dried while the film was stretched 1.15 times (15%) in the transverse direction under a temperature of 120° C. Then, transported between rolls of a heat treatment apparatus, followed by further drying, a cellulose acylate film S01 was obtained. A thickness of the cellulose acylate film S01 obtained was 25 μm, a width thereof was 1,480 mm and a winding length thereof was 2,700 m.

(4) Preparation of Cellulose Acylate Film S02

A cellulose acylate film S02 was prepared in the same manner as in the preparation of the cellulose acylate film S01, except that an additive B-97 was used in place of the additive E-1.

Additive B-97

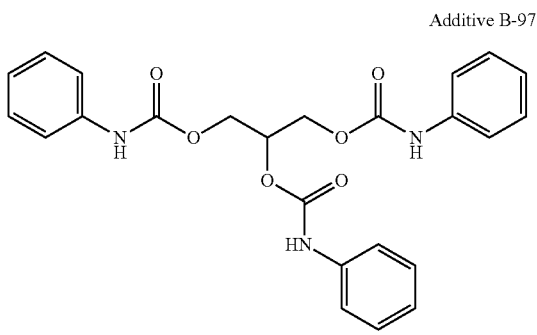 [SMILES: O=C(Nc1ccccc1)OCC(COC(=O)Nc1ccccc1)OC(=O)Nc1ccccc1]

(5) Preparation of Cellulose Acylate Film S03

A cellulose acylate film S03 was prepared in the same manner as in the preparation of the cellulose acylate film S01, except that no additive A-3 was added thereto.

B. Preparation of Polarizing Plate

<Preparation of Polarizer A>

An aqueous solution prepared by dissolving a polyvinyl alcohol (PVA) powder having an average polymerization degree of 2,400 and a saponification degree of 99.9% or more into pure water, such that adjusted to 10 mass %, was applied onto a polyester film, followed by drying at 40° C. for 3 hours, and further drying at 110° C. for 60 minutes, thereby for obtaining a 32 μm PVA film. The resultant film was swollen for 1 minute with water at 30° C., followed by immersing into an aqueous potassium iodide/iodine (mass ratio 10:1) solution at 30° C., and then longitudinally uniaxially stretching 1.5 times. A concentration of the aqueous potassium iodide/iodine (mass ratio 10:1) solution was adjusted to 0.38 mass % in an iodine concentration. Then, the film was longitudinally uniaxiallly stretched to be 7 times in a total stretching ratio, in a 4.25 mass % aqueous boric acid solution at 50° C., followed by immersing into a water bath at 30° C., washing with water, and drying at 50° C. for 4 minutes, thereby for obtaining an 8 μm polarizer A.

<Saponification Treatment of Polarizing Plate Protective Film (Cellulose Acylate Film)>

The thus-prepared polarizing plate protective films 101 to 114, c01, and c02, and cellulose acylate films S01 to S03 were immersed into a 2.3 mol/L aqueous sodium hydroxide solution for 3 minutes at 55° C., respectively. Then, the films each were washed in a water-washing bath at room temperature (25° C.), followed by neutralization at 30° C. by using 0.05 mol/L sulfuric acid. The films each were, again, washed in the water-washing bath at room temperature (25° C.), followed by further drying with hot air at 100° C. Thus, saponification treatment on a film surface was applied onto the polarizing plate protective films 101 to 114, c01, and c02, and cellulose acylate films S01 to S03, respectively.

(1) Preparation of Polarizing Plate H01

The thus-saponification-treated polarizing plate protective film 101 was stuck, by using a polyvinyl alcohol-based adhesive, onto one side of the polarizer A produced in the above. Further, the thus-saponification-treated cellulose acylate film S01 was stuck on the side opposite to the polarizing plate protective film 101 by sandwiching the polarizer. On this occasion, arrangement was made such that a transmission axis of the polarizer, and the transverse direction of the thus-prepared polarizing plate protective film or cellulose acylate film would become parallel.

Thus, a polarizing plate H01 of the present invention was prepared.

(2) Preparation of Polarizing Plates H02 to H14, Hc1, and Hc2

Polarizing plates H02 to H14 of the present invention and polarizing plates Hc1 and Hc2 for comparison were prepared in the same manner as in the preparation of the polarizing plate H01, except that the polarizing plate protective films and cellulose acylate films were changed to those described in 3 below.

C. Evaluation of Polarizing Plate Protective Film and Polarizing Plate

As described below, the polarizing plate durability, and the crystallization index of the PVA in the polarizer were evaluated on the polarizing plate into which the polarizing plate protective film was assembled, and performance of the polarizing plate protective film was examined.

(Evaluation of Polarizing Plate Durability)

With respect to each of the thus-prepared polarizing plates, the orthogonal transmittance and the parallel transmittance were measured, by using an automatic polarization film measuring apparatus VAP-7070, manufactured by JASCO Corporation, and a polarization degree was calculated according to the following formula.

Polarization degree (%)=[{(parallel transmittance)−(orthogonal transmittance)}/{(parallel transmittance)+(orthogonal transmittance)}]$^{1/2}$×100

Two samples (5 cm×5 cm) each were prepared, by sticking the respective polarizing plate onto a glass through a pressure sensitive adhesive. On that occasion, the respective polarizing plate was stuck such that any of the cellulose acylate films S01 to S03 was placed on the side (the air interface side) opposite to the glass. The orthogonal transmittance was measured by setting this assembly by directing the glass side of this sample toward a light source. Measurement was performed on two samples, respectively, and the average values thereof were taken as the orthogonal transmittance and the parallel transmittance.

Then, a polarization degree was measured in a similar manner after the respective sample was stored for 144 hours under an environment of 90% relative humidity at 80° C. Changed amounts of the polarization degrees before and after aging were determined, and the sample was evaluated based on the following criteria.

In Table 3 below, the results are shown as polarizing plate durability.

As the polarizing plate durability, a change of the polarization degree is preferably as low as possible, and ranks B to A+ each are a practically usable level.

A+: Less than 0.5% in change of the polarization degree

A: 0.5% or more and less than 1.5% in change of the polarization degree

B: 1.5% or more and less than 3.0% in change of the polarization degree

C: 3.0% or more in change of the polarization degree (Crystallization Index of PVA in Polarizer)

Each of the polarizing plates after being aged for 144 hours at a temperature of 80° C. and a relative humidity of 90% was immersed into methylene chloride for 30 minutes at room temperature (25° C.), to dissolve the polarizing plate protective film and each of the cellulose acylate films S01 to S03, and each of the polarizers was removed as a film. An ATR-IR spectrum on a surface on the side in contact with each of the cellulose acylate films S01 to S03 of the respective polarizer was measured by attenuated total reflection infrared absorption spectrometry (ATR method) by the following method, and a crystallization index of the PVA was determined by the following formula. The crystallization index of the PVA is preferably as low as possible, and more preferably 0.05 or less. The case where the crystallization index is a negative value is particularly preferred.
Measuring apparatus: Nicolet 6700, manufactured by Thermo Scientific Inc.
Prism: germanium
Wave number range: 400 cm$^{-1}$ to 4,000 cm$^{-1}$ Crystallization index of PVA={$A$(1,141 cm$^{-1}$)-$A$(1,134 cm$^{-1}$)}/$A$(1,134 cm$^{-1}$)  Formula (α)

In formula (α), A (1,141 cm$^{-1}$) represents the absorbance at the wave number of 1,141 cm$^{-1}$, and A (1,134 cm$^{-1}$) represents the absorbance at the wave number of 1,134 cm$^{-1}$.
The obtained results are shown together in Table 3.

hygrothermal conditions, thereby for inhibiting crystallization of the PVA in the polarizer.

The compound represented by formula (I) has two or more acetal groups, and acetal exchange is caused in the PVA, to allow crosslinking of the PVA. Thus, a possibility is assumed in which the compound represented by formula (I) contributes to crosslinking or re-crosslinking of the PVA.

From the above-described results, the liquid crystal display that is excellent in the polarizing plate durability can be prepared, by using the polarizing plate of the present invention.

Having described our invention as related to the present embodiments, it is our intention that the invention not be limited by any of the details of the description, unless

TABLE 3

| | | Polarizing plate protective film on the glass side | | Polarizing plate protective film on the air side | | | | | | |
|---|---|---|---|---|---|---|---|---|---|---|
| Polarizing plate No. | Polarizing plate protective film No. | Additive Kind | Addition amount[1] | Cellulose acylate film No | Additive B or E Kind | Addition amount[1] | Barbituric acid-based additive Kind | Addition amount[1] | Polarizing plate durability | Crystallization index of PVA 80° C. 90% RH 144 hours | Remarks |
| H01 | 101 | D-1 | 10.0 | S01 | E-1 | 8.0 | A-3 | 4.0 | A+ | -0.06 | This invention |
| H02 | 102 | D-2 | 12.0 | S01 | E-1 | 8.0 | A-3 | 4.0 | B | 0.03 | This invention |
| H03 | 103 | D-6 | 8.0 | S01 | E-1 | 8.0 | A-3 | 4.0 | A+ | -0.05 | This invention |
| H04 | 104 | D-7 | 8.0 | S01 | E-1 | 8.0 | A-3 | 4.0 | A+ | -0.04 | This invention |
| H05 | 105 | D-8 | 10.0 | S01 | E-1 | 8.0 | A-3 | 4.0 | A | -0.02 | This invention |
| H06 | 106 | D-9 | 7.0 | S01 | E-1 | 8.0 | A-3 | 4.0 | A | -0.02 | This invention |
| H07 | 107 | D-10 | 3.5 | S01 | E-1 | 8.0 | A-3 | 4.0 | A | -0.01 | This invention |
| H08 | 108 | D-12 | 3.5 | S01 | E-1 | 8.0 | A-3 | 4.0 | A | -0.07 | This invention |
| H09 | 109 | D-17 | 8.0 | S01 | E-1 | 8.0 | A-3 | 4.0 | A+ | -0.02 | This invention |
| H10 | 110 | D-33 | 8.0 | S01 | E-1 | 8.0 | A-3 | 4.0 | A+ | -0.02 | This invention |
| H11 | 111 | D-42 | 8.0 | S01 | E-1 | 8.0 | A-3 | 4.0 | B | 0.04 | This invention |
| H12 | 112 | D-6 | 1.5 | S02 | B-97 | 8.0 | A-3 | 4.0 | A | 0 | This invention |
| H13 | 113 | D-1 | 5.0 | S01 | E-1 | 8.0 | A-3 | 4.0 | A | -0.03 | This invention |
| H14 | 114 | D-1 | 2.5 | S03 | E-1 | 8.0 | Nothing | 0.0 | B | 0.02 | This invention |
| Hc1 | c01 | — | 0.0 | S01 | E-1 | 8.0 | A-3 | 4.0 | C | 0.07 | Comparative example |
| Hc2 | c02 | Compound for comparison (1) | 3.5 | S01 | E-1 | 8.0 | A-3 | 4.0 | — | — | Comparative example |

Note:
[1]Addition amount (parts by mass), to 100 parts by mass of the cellulose acylate
'—' means not added or not determined.

Herein, with regard to the polarizing plate protective film c02, the additive was slightly soluble in the preparation of the film, and a film with high haze was obtained. Thus, no evaluation was conducted From the results shown in Table 3, relative to the polarizing plate Hc1 into which the polarizing plate protective film for comparison, prepared without adding the compound (described as the additive in the table) represented by formula (I), was assembled, it can be understood that all of the polarizing plates into which the polarizing plate protective films prepared with adding the compounds represented by formula (I) were assembled, are excellent in the polarizing plate durability, and low in the crystallization index of the PVA in the polarizer after hygrothermal aging (aging by heating under hygrothermal condition).

In addition, in the polarizing plate into which the polarizing plate protective film prepared with adding the compound represented by formula (I) was assembled, the crystallization index of the PVA in the polarizer after hygrothermal aging has a low value. Thus, it is thought that the compound represented by formula (I) in the polarizing plate protective film is diffused into the polarizer under otherwise specified, but rather be construed broadly within its spirit and scope as set out in the accompanying claims.

REFERENCE SIGNS LIST

1 Upper polarizing plate
2 Direction of the upper polarizing plate absorption axis
3 Liquid crystal cell upper electrode substrate
4 Orientational control direction of the upper electrode substrate
5 Liquid crystal layer
6 Liquid crystal cell lower electrode substrate
7 Orientational control direction of the lower electrode substrate
8 Lower polarizing plate
9 Direction of the lower polarizing plate absorption axis
10 Liquid crystal display

The invention claimed is:
1. A polarizing plate protective film containing a compound represented by any one of formulae (II-1) to (II-5):

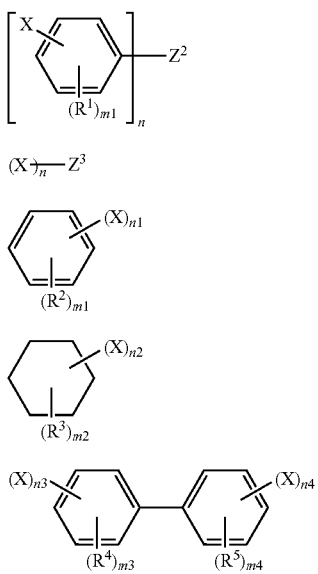

Formula (II-1)

Formula (II-2)

Formula (II-3)

Formula (II-4)

Formula (II-5)

wherein, in formula (II-1) or (II-5), X represents a group represented by any of formula (I-A-1) or (I-A-2); in formulae (II-2) to (II-4), X represents a group represented by formula (I-A-1); and wherein, in formula (II-1) to (II-5), n represents an integer of 2 or more; when n is 2, $Z^2$ represents a divalent linking group; when n is 3 or more, $Z^2$ represents an n-valent chain hydrocarbon group; when n is 2, $Z^3$ represents a divalent alkylene group; when n is 3 or more, $Z^3$ represents an n-valent chain hydrocarbon group; however, the case where $Z^3$ has a ring structure is excluded; $R^1$ to $R^5$ each independently represent a substituent; n1 and n2 each independently represent an integer of 2 to 6; n3 and n4 each independently represent an integer of 1 to 5; m1, m3, and m4 each independently represent an integer of 0 to 4; m2 represents an integer of 0 to 10,

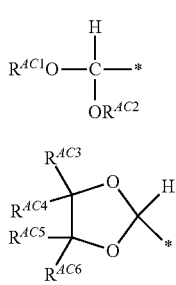

Formula (I-A-1)

Formula (I-A-2)

wherein, in formulae (I-A-1) and (I-A-2), $R^{AC1}$ and $R^{AC2}$ each independently represent an alkyl group, a cycloalkyl group, an aryl group, or an acyl group; however, the case where $R^{AC1}$ and $R^{AC2}$ bond to each other to form a ring is excluded; $R^{AC3}$ to $R^{AC6}$ each independently represent a hydrogen atom, an alkyl group, a cycloalkyl group, an aryl group, an acyl group, an alkoxy group, or an alkoxycarbonyl group; at least two of $R^{AC3}$ to $R^{AC6}$ may bond to each other, to form a ring.

2. The polarizing plate protective film according to claim 1, wherein the compound represented by any one of formulae (II-1) to (II-5) has at least one benzene ring.

3. The polarizing plate protective film according to claim 1, wherein the compound has 2 to 4 pieces of X, and wherein the total number of carbon atoms in component parts other than X in the compound is 40 or less.

4. The polarizing plate protective film according to claim 1, wherein when counted in terms of a minimal length, the number of atoms comprised in the linking group between any two of X's is 20 or less.

5. The polarizing plate protective film according to claim 1, wherein $Z^2$ or $Z^3$ is any one or combination of —O—, —S—, —SO—, —SO$_2$—, —C(=O)—, —OC(=O)—, —C($R^{11}$)($R^{12}$)—, >C<, (—OCH$_2$CH$_2$)$_2$C(CH$_2$CH$_2$O—)$_2$, >C($R^{13}$)—, >N—, or —N(Ra)—, in which $R^{11}$ to $R^{13}$ each independently represent a hydrogen atom, an alkyl group, or an aryl group, and in which Ra represents a hydrogen atom, an alkyl group, an aryl group, or an acyl group.

6. The polarizing plate protective film according to claim 1, wherein the polarizing plate protective film contains a cellulose acylate.

7. A polarizing plate, comprising:
a polarizing plate protective film on each side of a polarizer,
wherein the polarizing plate protective film comprises a compound represented by any one of formulae (II-1) to (II-5):

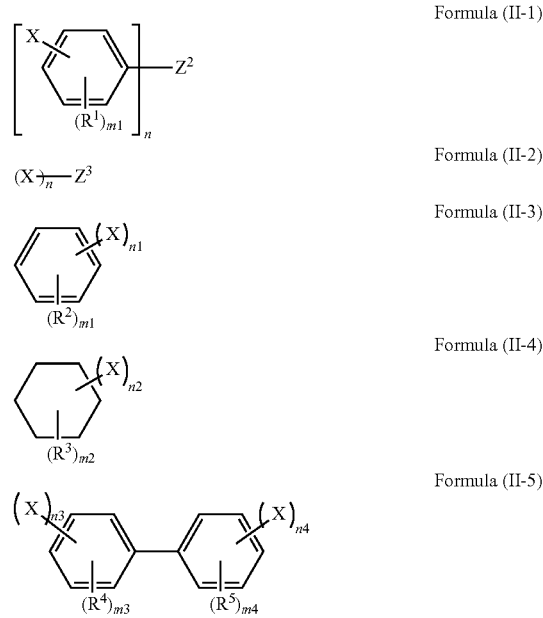

Formula (II-1)

Formula (II-2)

Formula (II-3)

Formula (II-4)

Formula (II-5)

wherein, in formula (II-1) or (II-5), X represents a group represented by any of formulae (I-A-1) and (I-A-2); in formulae (II-3) or (II-4), X represents a group represented by any of formulae (I-A-1); and wherein, in formula (II-1) and (II-3) to (11-5), n represents an integer of 2 or more; when n is 2, $Z^2$ represents a divalent linking group; when n is 3 or more, $Z^2$ represents an n-valent chain hydrocarbon group; $R^1$ to $R^5$ each independently represent a substituent; n1 and n2 each independently represent an integer of 2 to 6; n3 and n4 each independently represent an integer of 1 to 5; m1, m3, and m4 each independently represent an integer of 0 to 4; m2 represents an integer of 0 to 10, Formula (I-A-1)

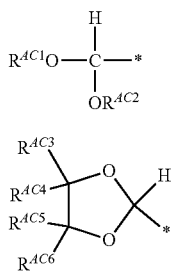

Formula (I-A-2)

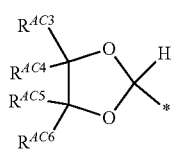

wherein, in formulae (I-A-1) and (I-A-2), $R^{AC1}$ and $R^{AC2}$ each independently represent an alkyl group, a cycloalkyl group, an aryl group, or an acyl group; however, the case where $R^{AC1}$ and $R^{AC2}$ bond to each other to form a ring is excluded; $R^{AC3}$ to $R^{AC6}$ each independently represent a hydrogen atom, an alkyl group, a cycloalkyl group, an aryl group, an acyl group, an alkoxy group, or an alkoxycarbonyl group; at least two of $R^{AC3}$ to $R^{AC6}$ may bond to each other, to form a ring; and wherein, in formula (II-2), X represents a group represented by formula (I-A-1); and n represents an integer of 2 or more; when n is 2, $Z^3$ represents a divalent alkylene group; when n is 3 or more, $Z^3$ represents an n-valent chain hydrocarbon group; however, the case where $Z^3$ has a ring structure is excluded.

8. The polarizing plate according to claim 7, containing a compound represented by formula (A) in at least one polarizing plate protective film, with the polarizing plate protective films being provided on each side or one side of the polarizer:

Formula (A)

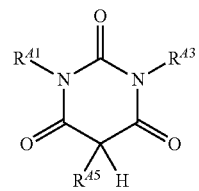

wherein, in formula (A), $R^{A1}$ and $R^{A3}$ each independently represent a hydrogen atom, an alkyl group, a cycloalkyl group, an alkenyl group, or an aromatic group; the alkyl group, the cycloalkyl group, the alkenyl group, and the aromatic group may have a substituent; and $R^{A5}$ represents a hydrogen atom or a substituent.

9. A display containing at least one polarizing plate according to claim 7.

* * * * *